(12) United States Patent
Nozaki

(10) Patent No.: US 9,210,093 B2
(45) Date of Patent: Dec. 8, 2015

(54) ALIGNMENT CIRCUIT AND RECEIVING APPARATUS

(71) Applicant: Renesas Electronics Corporation, Kawasaki-shi, Kanagawa (JP)

(72) Inventor: Akihiro Nozaki, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 14/506,660

(22) Filed: Oct. 5, 2014

(65) Prior Publication Data

US 2015/0023356 A1 Jan. 22, 2015

Related U.S. Application Data

(63) Continuation of application No. 13/726,074, filed on Dec. 22, 2012, now Pat. No. 8,879,548.

(30) Foreign Application Priority Data

Dec. 22, 2011 (JP) .................................. 2011-281916

(51) Int. Cl.
*H04L 12/801* (2013.01)
*H04L 12/863* (2013.01)
*H04L 12/861* (2013.01)

(52) U.S. Cl.
CPC ................ *H04L 47/34* (2013.01); *H04L 47/62* (2013.01); *H04L 47/624* (2013.01); *H04L 49/9057* (2013.01)

(58) Field of Classification Search
None
See application file for complete search history.

(56) References Cited

U.S. PATENT DOCUMENTS

| | | | | |
|---|---|---|---|---|
| 6,434,606 | B1* | 8/2002 | Borella et al. | 709/214 |
| 7,269,172 | B2* | 9/2007 | Kurth | 370/392 |
| 8,208,380 | B1* | 6/2012 | Nachum et al. | 370/236 |
| 2002/0031125 | A1 | 3/2002 | Sato | |
| 2002/0165973 | A1* | 11/2002 | Ben-Yehezkel et al. | 709/230 |
| 2009/0080300 | A1* | 3/2009 | Hirayama | 369/47.23 |
| 2009/0248891 | A1* | 10/2009 | Tanaka | 709/234 |
| 2012/0096105 | A1* | 4/2012 | Oved | 709/212 |

FOREIGN PATENT DOCUMENTS

| | | |
|---|---|---|
| JP | 2001-111608 A | 4/2001 |
| JP | 2001-189755 A | 7/2001 |

* cited by examiner

*Primary Examiner* — Hong Cho
(74) *Attorney, Agent, or Firm* — Miles & Stockbridge P.C.

(57) ABSTRACT

A control circuit generates a selection signal indicating a head area of an alignment buffer when the area is an unwritten area, and when the head area is a written area, successively performs comparison between a sequence number stored in the area and a sequence number of a target packet from a head to a tail to search a boundary area and generates a selection signal indicating the detected boundary area. When the boundary area could not be detected even when the search reaches the last written area, the control circuit generates a selection signal indicating the next area of the last written area. The writing circuit shifts data stored in each area by one area from the area indicated by the selection signal in a direction of the tail of the alignment buffer, and writes packet information of the target packet into the area indicated by the selection signal.

4 Claims, 36 Drawing Sheets

| BIT / ADDRESS | 31-28 | 27-24 | 23-20 | 19-16 | 15-12 | 11-8 | 7-4 | 3-0 |
|---|---|---|---|---|---|---|---|---|
| 0x0 | STORE FLAG | | | CONSECUTIVE BIT CB | ADDED VALUE W | | | |
| 0x4 | PACKET STORAGE AREA ADDRESS | | | | | | | |
| 0x8 | SEQUENCE NUMBER SN | | | | | | | |
| 0xC | FUNCTION EXTENSION AREA | | | | | | | |

← PACKET INFORMATION PIA

Fig. 26

ALIGNMENT CIRCUIT AND RECEIVING APPARATUS

CROSS-REFERENCE TO RELATED APPLICATIONS

This application is based upon and claims the benefit of priority from Japanese patent application No. 2011-281916, filed on Dec. 22, 2011, the disclosure of which is incorporated herein in its entirety by reference.

BACKGROUND

The present invention relates to a technique of rearranging packets in an apparatus that receives packets, in particular packets transmitted by a transmission path in which an order of transmission is not guaranteed.

In recent years, due to the development of application software (hereinafter may be simply referred to as an "application") such as WWW (World Wide Web), IP (Internet Protocol)-based packet communication has become popular.

Since the transfer paths of the packets are not necessarily fixed in the IP-based packet communication, the arrival order of the packets at the receiving apparatus does not necessarily match the order of transmission due to congestion or the like. In the application that processes received packets, packets received in an order different from the order of transmission cannot be normally received.

Accordingly, such an operation is performed in which a transmission apparatus adds a sequence number according to an order of transmission to each of the packets to be transmitted, and the receiving apparatus rearranges the received packets in an order of the sequence numbers to pass the packets to the application.

It is known that a CPU (Central Processing Unit) performs rearrangement of the packets in the receiving apparatus. However, according to the recent spread of various types of network apparatuses, processing of the application has been more and more diversified. Further, according to the improvement in the high-speed communication infrastructure represented by an optical fiber communication network, high-speed processing is required in the side of the receiving apparatus.

Under such circumstances, performance of rearrangement of packets by the CPU causes interruption to the CPU every time the packet is received. This puts an enormous burden on the CPU which performs control of the whole receiving apparatus in addition to the processing of the application, resulting in the poor efficiency of the whole receiving apparatus.

In order to overcome such problems, various techniques have been proposed to achieve rearrangement of packets by hardware in place of the CPU.

FIG. 29 corresponds to FIG. 9 of Japanese Unexamined Patent Application Publication No. 2001-111608 with different reference symbols, and shows an interface on a side of a receiving apparatus to which the technique in this literature is applied. With reference to FIG. 29, a packet rearrangement technique disclosed in Japanese Unexamined Patent Application Publication No. 2001-111608 will be described.

An interface shown in FIG. 29 includes a rearrangement controller 1 and a rearrangement buffer 4. The rearrangement controller 1 includes a sequence number separation unit 2 and a ring counter for reading pointer 3.

In the rearrangement controller 1, the sequence number separation unit 2 separates the sequence number from a header of the packet that is received, to generate a writing pointer indicating the position in the rearrangement buffer 4 where the packet is written. The ring counter for reading pointer 3 generates a reading pointer indicating the position where the packet is read out for the rearrangement buffer 4. In the rearrangement buffer 4, packet data is written by a writing unit (not shown) in the position indicated by the writing pointer in a writing operation. Further, the rearrangement buffer 4 outputs packet data stored in the position indicated by the reading pointer by a reading unit (not shown) in a reading operation.

The numbers in the rearrangement buffer 4 indicate the addresses that store the packet data, and correspond to the values of the writing pointer and the reading pointer. The storage area of each address in the rearrangement buffer 4 includes an area to store the packet data and an area to store a store flag indicating whether the packet data is stored in the area.

The sequence number separation unit 2 in the rearrangement controller 1 generates the writing pointer in the order of the sequence numbers of the packets that are received, and a writing unit (not shown) writes the packet data in the address indicated by the writing pointer generated by the sequence number separation unit 2 and displays the store flag of the address.

In the reading operation, the reading unit generates a reading pointer using the ring counter for reading pointer 3, to search the store flag held in the area of the rearrangement buffer 4 indicated by the pointer. At this time, if the store flag is in an indication state, this means that packets are stored. Thus, the reading unit reads and outputs the packet data that is stored in the area. At the same time, the reading unit sets the store flag to non-indication and advances the count value of the ring counter for reading pointer 3 by one to search the storage area of the next packet. In this way, the packets are rearranged in the order of the sequence numbers or the order of transmission and are read out.

When the reading is performed when the state of the rearrangement buffer 4 is as shown in FIG. 30 (FIG. 10 in Japanese Unexamined Patent Application Publication No. 2001-111608), the packets are read out to the address number of 155. However, the packet which should be written in the address number 156, i.e., the packets written in the address number 155 and the address number 157 have not been arrived, whereby the reading unit continues to search the store flag and the reading operation is stopped.

In this case, the technique disclosed in Japanese Unexamined Patent Application Publication No. 2001-111608 measures time during which reading is stopped. When the measured time reaches a threshold, it is determined that the packet to be written in the address number 156 is lost. Then, the ring counter for reading pointer 3 is forcibly incremented by one, and the store flag of the address indicated by the reading pointer after the increment is checked and the packet data is read out.

FIG. 31 corresponds to FIG. 1 of Japanese Unexamined Patent Application Publication No. 2001-189755 with different reference symbols, and shows a communication system to which the technique in this literature is applied. With reference to FIG. 31, a packet rearrangement technique disclosed in Japanese Unexamined Patent Application Publication No. 2001-189755 will be described. Since a communication apparatus 10 and a communication apparatus 20 have the similar configurations in the system shown in FIG. 31, the illustration and description of each functional block of the communication apparatus 10 will be omitted. Further, for the communication apparatus 20, only functional blocks related to the packet rearrangement at the time of reception will be described in detail.

The communication apparatus 20 includes a packetizer circuit 21, a counter 22, a packet transmitting/receiving circuit 23, a packet assembler circuit 24, a reception buffer 25, a timer 26, a list 27, and an order rearranging unit 28. Among these functional blocks, the packet transmitting/receiving circuit 23, the packet assembler circuit 24, the reception buffer 25, the timer 26, the list 27, and the order rearranging unit 28 are related to packet rearrangement.

The packet transmitting/receiving circuit 23 receives packets from the communication apparatus 10 by way of a communication network 30 to pass the packets to the packet assembler circuit 24. The sequence numbers added by the communication apparatus 10 according to the order of transmission are added to headers of the received packets.

The packet assembler circuit 24 passes a sequence number Sc and the data of the packet from the packet transmitting/receiving circuit 23 to the order rearranging unit 28.

The reception buffer 25 is a buffer to allow data of packets to be output in the order in which they were transmitted. The application or the like retrieves data from the reception buffer 25 to achieve various processing. Further, the reception buffer 25 also stores a sequence number Sb of the packet which is transmitted last among the packets that have already been arrived.

The list 27 is a list (waiting list) which includes the sequence numbers of the packets that are expected to be arrived. The order rearranging unit 28 performs control of each functional block, rearrangement of packets, registration of the packets that are expected to arrive at the list 27 and the like described above.

FIGS. 32 and 33 correspond to flowcharts shown in FIGS. 2 and 3 of Japanese Unexamined Patent Application Publication No. 2001-189755 with different step numbers. Referring to FIGS. 32 and 33, processing of the order rearranging unit 28 will be described.

Upon receiving the packet data and a sequence number Sc from the packet assembler circuit 24, the order rearranging unit 28 compares the sequence number Sc with the sequence number Sb (sequence number of the packet which is transmitted last among the packets that have already been arrived) stored in the reception buffer 25 (S11, S13, and S15).

When Sc=Sb (S11: Y) as a result of the comparison, the order rearranging unit 28 determines that the newly received packet (packet of the sequence number Sc) is a repeated packet, and deletes (discards) the data from the reception buffer 25 (S12).

Further, when Sc=Sb+1 (S11: N, S13: Y), the order rearranging unit 28 regards the packet of the sequence number Sc and the packet of the sequence number Sb as consecutive packets and stores the packet of the sequence number Sc in the area next to the area in the reception buffer 25 in which the packet of the sequence number Sb is stored (S14).

Furthermore, when Sc<Sb (S11: N, S13: N, S15: Y), the order rearranging unit 28 searches the sequence number Sc from the list (S16).

When there is no sequence number Sc in the list 27 (S16: N), the order rearranging unit 28 discards the packet of the sequence number Sc (S17).

Further, when the sequence number Sc is hit in the list 27 (S16: Y) as a result of searching the list 27, the order rearranging unit 28 deletes the corresponding sequence number from the list 27 (S18), cancels (stops) the counting operation of the timer 26 that corresponds to the corresponding sequence number (S19), and inputs the data of the corresponding packet to a suitable position of the reception buffer 25 corresponding to the sequence number Sc (S20).

On the contrary, when Sc<Sb is not satisfied (S15: N) as a result of the comparison in Step S15, i.e., Sc>(Sb+1) is satisfied, the order rearranging unit 28 stores the packet of the sequence number Sc in the reception buffer 25 (S21). At the same time, in order to wait for the packets having the sequence numbers of Sb+2–Sc–1, the order rearranging unit 28 adds these sequence numbers to the list 27 of waiting packets (S22), to start the counting operation of the timer 26 for each of the sequence numbers of the waiting packets (S23). While the description of Step S22 (paragraph "0047") in the specification of Japanese Unexamined Patent Application Publication No. 2001-189755 states that the sequence numbers of "Sb+1–Sc–1" are added to the list 27, the sequence numbers are changed to "Sb+2–Sc–1" in this specification as shown in the flowchart in FIG. 32.

FIG. 33 shows processing of the order rearranging unit 28 when the timer 26 times out. After a predetermined period of time has elapsed after the order rearranging unit 28 starts the counting operation of the timer 26 and the timer 26 times out (S31), the order rearranging unit 28 searches the sequence number associated with the timer 26 from the list 27 (S32).

When the corresponding sequence number was found as a result of the search (S32: Y), the order rearranging unit 28 deletes the sequence number from the list 27 (S33), treats the corresponding packet as a missing packet, and ends the processing.

When the corresponding sequence number was not found as a result of the search (S32: N), the order rearranging unit 28 ends the processing.

According to the technique disclosed in Japanese Unexamined Patent Application Publication No. 2001-189755, it is possible to rearrange the packets in the order of transmission in the receiving side even when the order of reception is different from the order of transmission.

In communication apparatuses compliant with IEEE802.3 standard, communication protocols such as TCP/IP (Transmission Control Protocol/Internet Protocol), UDP/IP (User Datagram Protocol/Internet Protocol) and the like are used.

For example, in the case of the TCP/IP, while sequence numbers of packets become larger as the order of transmission becomes later, these values are not incremented by one according to the order of transmission. This will be described with reference to FIGS. 34-36 with the configuration of the TCP/IP packet.

FIG. 34 shows a format of a TCP/IP packet. As shown in FIG. 34, a TCP/IP packet 50 includes an IP header 60, a TCP header 70, and a payload 90 which is application data.

The IP header 60 is located in a network layer of an OSI (Open System Interconnection) reference model, and includes information for addressing an apparatus connected to the network and selecting a communication path in a plurality of networks connected to one another.

As shown in FIG. 35, the IP header 60 includes IP packet information 61 indicating the information such as a packet length, a transmission source IP address 62, and a destination IP address 63.

The TCP header 70 is located in a transport layer of the OSI reference model, and includes information regarding to which processing the payload 90 to be transferred should be passed.

As shown in FIG. 36, the TCP header 70 includes a transmission source port number 71 to identify a program of a transmission source, a destination port number 72 to identify a destination program, a sequence number 73 indicating the order of transmission, an acknowledgment number 74 indicating the sequence number to be received next, an offset 75 indicating the TCP header length, a reserved field 76 for future extension, a TCP flag 77 indicating the control bit, a window 78 indicating the size of the data that can be received in the receiving side, a checksum 79 indicating the checksum of the payload 90, and an urgent point 80 indicating the position where time-critical data is stored.

The initial value of the sequence number 73 (sequence number of the first packet) is determined by a random number when the connection between transmission apparatuses is established. After that, the sequence number which is a sum of the sequence number 73 of the packet that is immediately previously transmitted and the payload length is given to the packet that is currently transmitted. The payload length is a data length of the payload 90 of the TCP header 70 of the packet.

The acknowledgement number 74 is a sum of the sequence number 73 and the payload length. In summary, the acknowledgement number 74 is the sequence number of the packet which is to be transmitted next. When the sequence number 73 of the currently-received packet matches the acknowledgment number 74 of the immediately-previously-received packet, the currently-received packet and the immediately-previously-received packet are consecutive packets.

The transmission apparatus of the TCP/IP packet generates packets having the configurations shown in FIGS. 34-36 to transmit the packets in the transmission processing. If the packet received in the receiving side is a packet transmitted after being divided (hereinafter also referred to as a "divided packet"), the TCP header of the packet includes the sequence number 73 of the packet.

In the TCP protocol, the maximum length MSS (Maximum Segment Size) of the payload 90 is determined, and the application data is transmitted after being divided into the size of MSS or smaller.

The window 78 in the TCP header 70 indicates the size of the buffer of the transmission destination. The transmission apparatus is able to continuously transmit packets until when the number of pieces of data transmitted after being divided into the size of MSS and smaller becomes equal to the window size indicated by the window 78. When the number reaches the window size, the transmission apparatus temporarily stops transmitting the packets, and start transmission of the packets again after detecting the reception response from the receiving side.

As will be understood from the description above, in the case of the TCP/IP, the sequence number becomes larger as the order of transmission becomes later. However, the sequence number is not incremented by one according to the order of transmission. Further, since the payload length is not a fixed value although the maximum length MSS of the payload is determined, the increment value of the sequence number is not a fixed value.

SUMMARY

Consider now a case in which the techniques disclosed in Japanese Unexamined Patent Application Publication No. 2001-111608 and Japanese Unexamined Patent Application Publication No. 2001-189755 are applied to a receiving apparatus of a TCP/IP.

According to the technique disclosed in Japanese Unexamined Patent Application Publication No. 2001-111608, when a packet is written into the rearrangement buffer 4, a writing pointer is generated according to the sequence number and the packet is written in the address indicated by the writing pointer. For example, assume a case in which the packets are written to the address number of 155 in the rearrangement buffer 4 shown in FIG. 30 and packets are not written from the address number of 156. In this case, when the sequence number of the newly received packet is not a value obtained by adding 1 to the sequence number of the packet written in 155, it is required to determine to which address of 156 and the following addresses the newly received packet should be written.

When the sequence number is incremented by one, the newly received packet may be written in the address which is positioned later from 155 by the difference between the sequence number of the newly received packet and the sequence number written in the address number of 155. However, in the case of the TCP/IP packet, the sequence number is not incremented by one according to the order of transmission and the increment value is not fixed as well. Thus, it is impossible to determine the position to which the newly received packet should be written and to generate an appropriate writing pointer in the first place.

In order to solve these problems, the technique disclosed in Japanese Unexamined Patent Application Publication No. 2001-111608 is a technique which is based on the assumption that the sequence number is incremented by one according to the order of transmission. When this technique is applied to the receiving apparatus of the TCP/IP, the packets that are consecutively transmitted originally are written in the rearrangement buffer 4 with some intervals.

In this case, there are no packets to be written in the addresses that are skipped. In such a case, according to the technique disclosed in Japanese Unexamined Patent Application Publication No. 2001-111608, when the packets are read out, it is determined as a packet loss, and increments of reading pointers are forcibly performed.

This cannot achieve effective use of the rearrangement buffer 4. Further, since the occurrence of the packet loss generally causes interruption to the CPU, interruption frequently occurs, which causes degradation of processing efficiency of the receiving apparatus.

The technique disclosed in Japanese Unexamined Patent Application Publication No. 2001-189755 is also based on the assumption that the sequence number is incremented by one in the order of transmission. When the sequence number of the newly received packet and the maximum sequence number of the previously received packets are not consecutive, the numerical values between these two sequence numbers are predicted as sequence numbers of packets which will be received later and these values are registered in the list 27 (S15 in FIG. 30: No, S21-).

In the TCP/IP, such a prediction cannot be performed appropriately at first place. Accordingly, when the technique disclosed in Japanese Unexamined Patent Application Publication No. 2001-189755 is applied to the receiving apparatus of the TCP/IP, multiple sequence numbers that do not exist are registered in the list 27, which causes wasted processing including counting corresponding to these sequence numbers by the timer 26 and determination of timeout according to the counting result and causes degradation of processing efficiency of the receiving apparatus.

One aspect of the present invention is an alignment circuit on a side of receiving a packet to which a sequence number having a size according to an order of transmission is attached. The alignment circuit receives packet information including a sequence number of a target packet which is a currently-received packet, and includes an alignment buffer, a writing circuit, and a control circuit.

The alignment buffer includes a plurality of areas into which packet information is to be written, the plurality of areas being sequentially arranged.

The writing circuit receives a selection signal indicating one of the plurality of areas of the alignment buffer and writes the packet information of the target packet into the alignment buffer according to the selection signal.

The control circuit generates the selection signal for the target packet to supply the selection signal to the writing circuit.

More specifically, when a head area of the alignment buffer is an unwritten area which is an area where the packet information has not been written, the control circuit generates the selection signal indicating the head area.

Further, when the head area of the alignment buffer is a written area which is an area where the packet information has been written, the control circuit acquires the sequence number of the target packet from the packet information of the target packet, and performs a search of a boundary area which is a head area among each of written areas to which the packet information including sequence numbers larger than the acquired sequence number is written by sequentially performing comparison between the sequence number included in the packet information written in the written area and the sequence number of the target packet in an order from a head to a tail of the alignment buffer. When the boundary area could be detected as a result of the search, the control circuit generates the selection signal indicating the boundary area. Meanwhile, when the boundary area could not be detected even when the search reaches a written area in the tail, the control circuit generates the selection signal indicating a next area of a last written area.

The writing circuit shifts data stored in the respective areas by one area from an area indicated by the selection signal in a direction to the tail of the alignment buffer, and writes the packet information of the target packet into the area indicated by the selection signal.

An apparatus and a system replaced by the alignment circuit according to the above aspect, a receiving apparatus including the alignment circuit, a communication system including the receiving apparatus and the like are also effective as aspects of the present invention.

According to the technique of the present invention, even in an apparatus for receiving packets in which sequence numbers are not incremented by one according to the order of transmission and the order of reception is not guaranteed, it is possible to rearrange the received packets in the order of transmission in place of a CPU and to improve efficiency of the receiving apparatus.

BRIEF DESCRIPTION OF THE DRAWINGS

The above and other aspects, advantages and features will be more apparent from the following description of certain embodiments taken in conjunction with the accompanying drawings, in which:

FIG. 26 is a diagram showing an example of a storage aspect of packet information in a memory and an alignment buffer of the receiving apparatus according to the second embodiment of the present invention;

DETAILED DESCRIPTION

Hereinafter, with reference to the drawings, embodiments of the present invention will be described. For the sake of clarification of description, a part of the following description and the drawings are omitted or simplified as appropriate. Throughout the drawings, the same components are denoted by the same reference symbols, and overlapping description is omitted as appropriate. In the following description, each alignment circuit is installed in an apparatus for receiving packets. Further, while only rearrangement of packets at the time of reception is described regarding the receiving apparatus, the receiving apparatus may perform other operations than rearrangement of packets at the time of reception, and may have other functions than the receiving function.

Before describing specific embodiments of the present invention, the principle of the technique according to the present invention will be described first.

Figure 1:
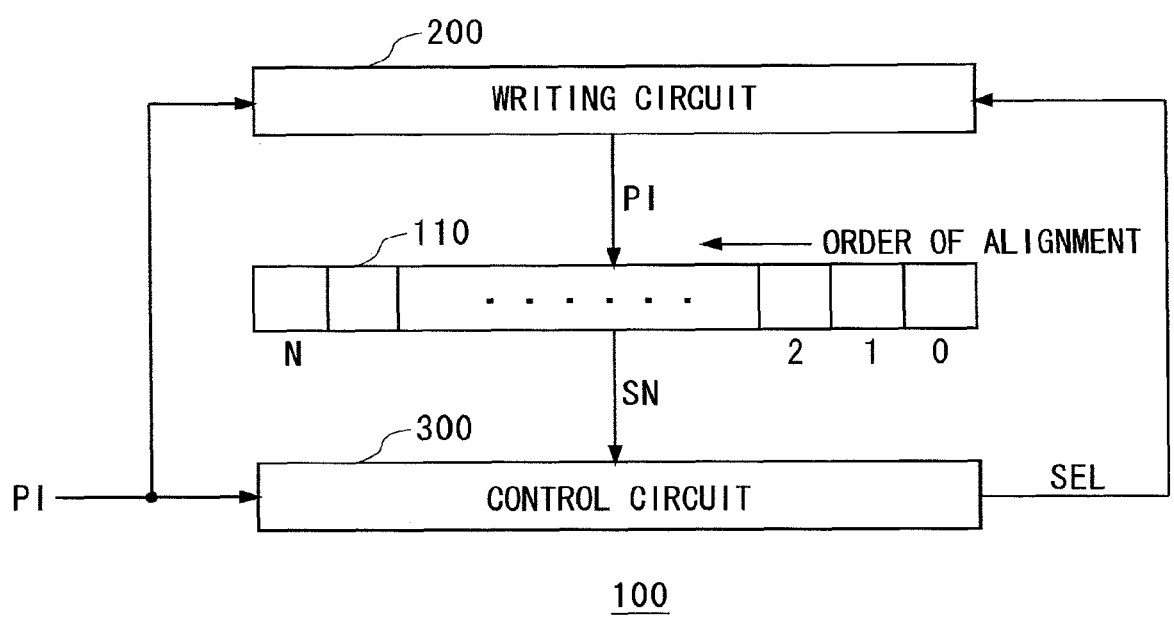
FIG. 1 is a diagram showing an alignment circuit for describing the principle according to the technique of the present invention.

An alignment circuit 100 shown in FIG. 1 is provided in an apparatus for receiving packets, and is to rearrange packets in an order of transmission. As shown in FIG. 1, the alignment circuit 100 receives packet information PI of a currently-received packet (hereinafter referred to as a "target packet"), and includes an alignment buffer 110, a writing circuit 200, and a control circuit 300. The packet information PI at least includes a sequence number SN of the target packet.

The alignment buffer 110 includes a plurality of ("N+1") areas arranged in the order of arrangement from a head area (area 0) to a tail area (area N). The packet information PI of the target packet is written in these areas by the writing circuit 200. The plurality of areas of the alignment buffer 110 may be a plurality of areas in one buffer, or may be a plurality of buffers arranged in the similar way as the order of arrangement as shown in FIG. 1.

The writing circuit 200 receives, from the control circuit 300, a selection signal SEL indicating one of the plurality of areas of the alignment buffer 110, and writes the packet information PI of the target packet in the alignment buffer 110 according to the selection signal SEL.

The control circuit 300 generates the selection signal SEL as follows.

When the packet information is not written in the head area (area 0) of the alignment buffer 110, the control circuit 300 generates the selection signal SEL indicating the head area. In the following description, the area in which no packet information is written is referred to as an "unwritten area". Meanwhile, the area in which the packet information has already been written is referred to as a "written area".

When the head area of the alignment buffer is a written area, the control circuit 300 extracts the sequence number SN from the packet information PI of the target packet to search a boundary area. The boundary area is the head area of each of written areas into which packet information including sequence numbers larger than the sequence number of the target packet are written.

The control circuit 300 sequentially compares the sequence number included in the packet information written in the written area with the sequence number of the target packet in the order from the head to the tail of the alignment buffer 110, to execute search of the boundary area. When the boundary area could be detected by the search, the control circuit 300 generates the selection signal SEL indicating the boundary area. Meanwhile, when the boundary area could not be detected even when the search reaches the last written area, the control circuit 300 generates the selection signal SEL indicating the next area of the last written area.

The writing circuit 200 shifts the data stored in each area by one area in the direction to the tail of the alignment buffer 110 from the area indicated by the selection signal SEL, and writes the packet information PI of the target packet in the written area of the start point.

Various methods that have already been known can be used to determine whether the area of the alignment buffer 110 is a written area or an unwritten area. For example, a store flag is provided in each area to indicate whether the packet information PI is written in the area and the store flag is on when the packet information PI is written in the area. Then, the control circuit 300 checks the store flag in the area, thereby being able to determine whether the area is a written area or an unwritten area.

Figure 2:
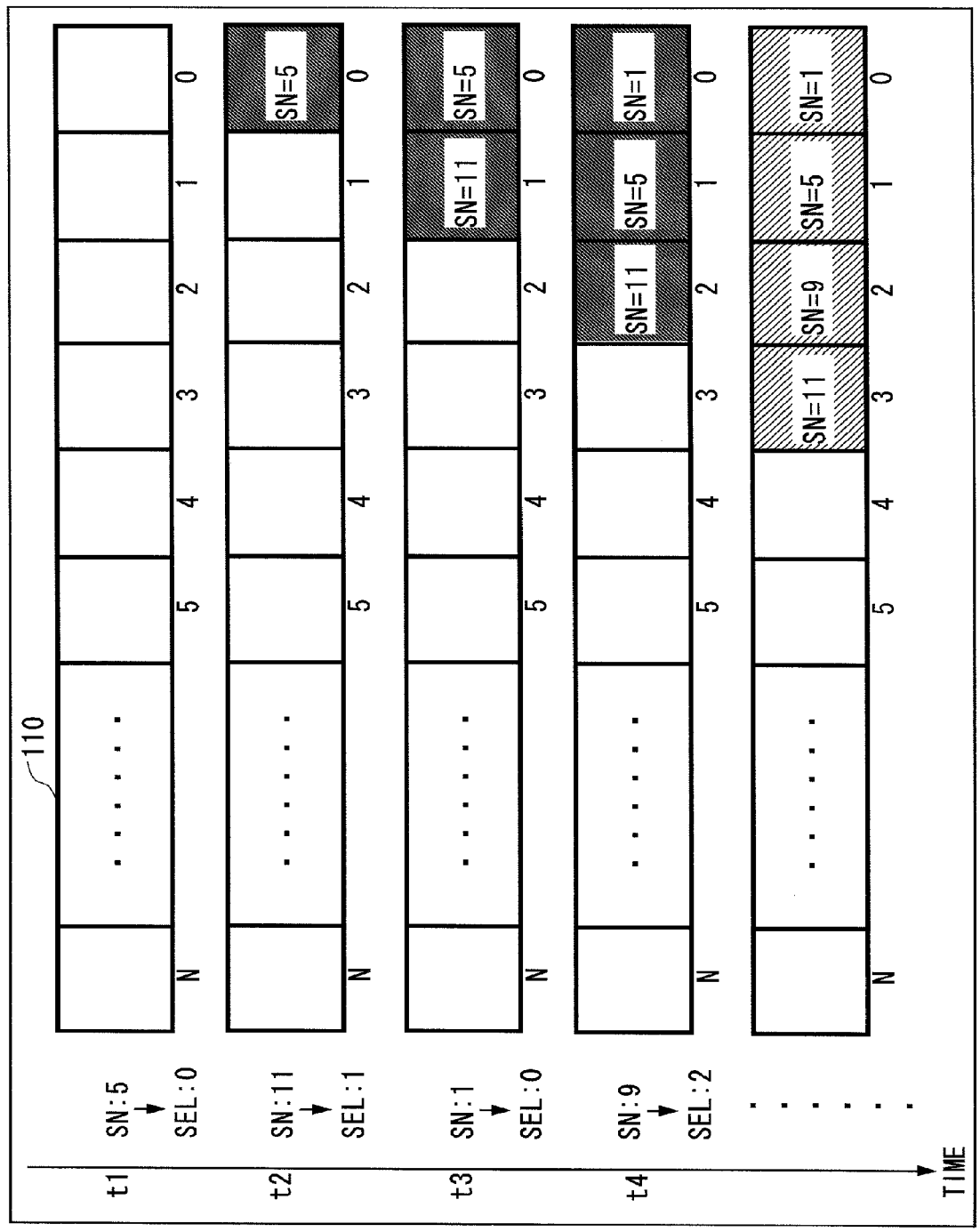
FIG. 2 is a diagram showing an example of state transitions in an alignment buffer according to reception of packets in the alignment circuit shown in FIG. 1.

Referring to FIG. 2, an example of state transitions in the alignment buffer 110 according to reception of packets in the alignment circuit 100 shown in FIG. 1 will be described.

In FIG. 2, among square frames indicating the areas of the alignment buffer 110, black areas indicate written areas and white areas indicate unwritten areas. Further, numbers under the alignment buffer 110 indicate orders of arrangement of the areas, and areas with smaller numbers are areas closer to the head. Further, a character in each of the written areas indicates the packet information PI written in the area. Further, the time axis indicates the order of receiving packets, and the order of reception becomes later as the time becomes later. The numbers in the left side of the time axis each indicate the timing of receiving the target packet, and the characters in the right side of the time axis each indicate the sequence number SN of the packet (target packet) received at the timing and the selection signal SEL generated by the control circuit 300 for the target packet. This description will be applied also to the following description of drawings.

As shown in FIG. 2, at timing t1, all the areas of the alignment buffer 110 are unwritten areas. At this time, the packet whose sequence number SN is "5" is received, and the packet information PI including the sequence number SN is input to the alignment circuit 100.

Since the area 0 which is the head of the alignment buffer 110 is an unwritten area, the control circuit 300 generates the selection signal SEL indicating the area 0 to output the signal to the writing circuit 200.

The writing circuit 200 shifts the data by one area in the direction to the area of the tail of the alignment buffer 110 from the area 0 indicating the selection signal SEL, and writes the packet information PI of the target packet ("5" indicating the sequence number SN in this example) in the area 0. In the shift operation, since no packet information is written in any of the areas, empty data is shifted.

At timing t2, the next packet whose sequence number SN is "11" is received, and the packet information PI is input to the alignment circuit 100. At this time, as shown in FIG. 2, the packet information PI (sequence number SN=5) is written in the area 0 of the alignment buffer 110, and the area 0 is a written area. Thus, the control circuit 300 first sequentially compares the sequence number SN written in each written area with the sequence number SN of the target packet in the order from the head to the tail of the alignment buffer 110, to search the boundary area.

At this time, since the written area is only the area 0 and the sequence number SN written in the area 0 is smaller than the sequence number SN(11) of the target packet, it is impossible to detect the boundary area, and the control circuit 300 generates the selection signal SEL indicating the next area (area 1) of the last written area (area 0 in this example) for the target packet.

The writing circuit 200 writes the packet information PI ("11" indicating the sequence number SN) of the target packet in the area 1 indicated by the selection signal SEL.

At timing t3, the next packet whose sequence number SN is "1" is received, and the packet information PI is input to the alignment circuit 100. At this time, as shown in FIG. 2, the packet information PI (sequence number SN=5) and the packet information PI (sequence number SN=11) are written in the area 0 and the area 1 of the alignment buffer 110, respectively, and the area 0 is a written area. Thus, the control circuit 300 first performs a search of the boundary area.

As a result of the search, the area 0 could be detected as a boundary area. Thus, the control circuit 300 generates the selection signal SEL indicating the area 0 which is the boundary area.

The writing circuit 200 shifts the data stored in each area by one area in the direction to the tail of the alignment buffer 110 from the area 0, and writes the packet information PI (sequence number SN=1) of the target packet in the written area which is the start point (area 0 in this example).

At timing t4, the next packet whose sequence number SN is "9" is received, and the packet information PI is input to the alignment circuit 100. At this time, as shown in FIG. 2, the packet information PI (sequence number SN=1), the packet information PI (sequence number SN=5), and the packet information PI (SN=11) are written in the area 0, the area 1, and the area 2 of the alignment buffer 110, respectively, and the area 0 is a written area. Thus, the control circuit 300 first performs a search of the boundary area.

As a result of the search, the area 2 is searched as a boundary area. Thus, the control circuit 300 generates the selection signal SEL indicating the area 2 which is the boundary area.

The writing circuit 200 shifts the data stored in each area by one area in the direction to the tail of the alignment buffer 110 from the area 2, and writes the packet information PI (sequence number SN=5) of the target packet in the written area which is the start point (area 2 in this example).

As a result of these operations, the packet information PI (sequence number SN=1), the packet information PI (sequence number SN=5), the packet information PI (sequence number SN=9), and the packet information PI (SN=11) are stored in the area 0-area 3 of the alignment buffer 110, respectively.

Figure 3:
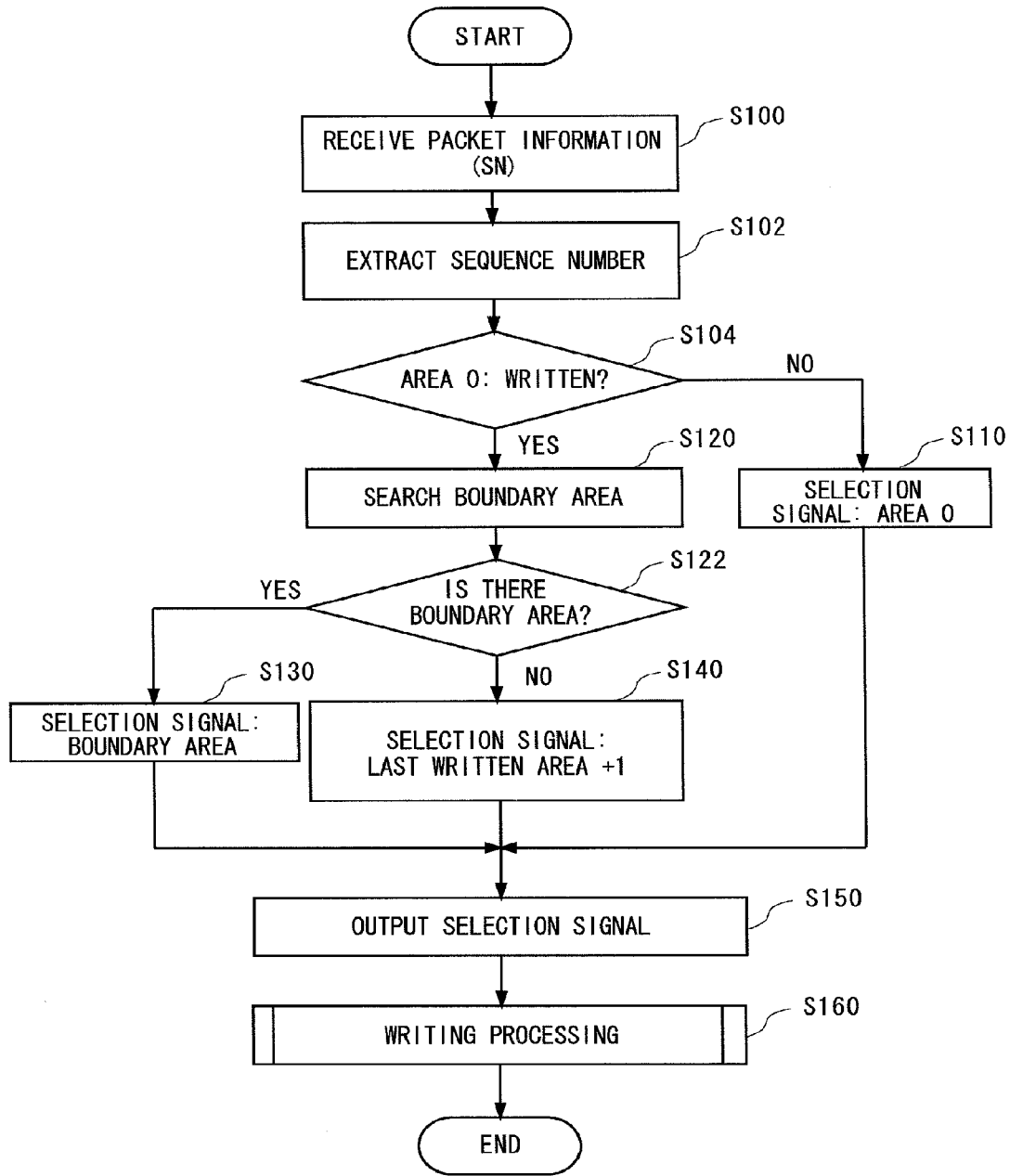
FIG. 3 is a flowchart showing processing of the alignment circuit shown in FIG. 1.

FIG. 3 is a flowchart showing processing of the alignment circuit 100, and shows a flow from reception of the packet information PI of the target packet to the operation in which the packet information PI of the target packet is written in the alignment buffer 110. In FIG. 3, Step S102-Step S150 are performed by the control circuit 300, and Step S160 is performed by the writing circuit 200.

Upon receiving the packet information (S100), the control circuit 300 extracts the sequence number SN from the packet information that is received (S102).

Then, the control circuit 300 checks whether the head area 0 of the alignment buffer 110 is a written area or an unwritten area (S104). When the area 0 is an unwritten area (S104: No), the control circuit 300 generates the selection signal SEL indicating the area 0 to output the selection signal SEL to the writing circuit 200 (S110, S150).

When the area 0 is a written area as a result of the check in Step S104 (S104: Yes), the control circuit 300 performs a search of the boundary area (S120). When the boundary area is found and could be detected as a result of the search in Step S120 (S122: Yes), the control circuit 300 generates the selection signal SEL indicating the boundary area to output the selection signal SEL to the writing circuit 200 (S130, S150).

When there is no boundary area and the boundary area could not be detected even after the search in Step S120 reaches the last written area (S122: No), the control circuit 300 generates the selection signal SEL indicating the next area of the last written area to output the selection signal SEL to the writing circuit 200 (S140, S150).

The writing circuit 200 receives the selection signal SEL and the packet information PI from the control circuit 300, to execute writing processing (S160).

Figure 4:
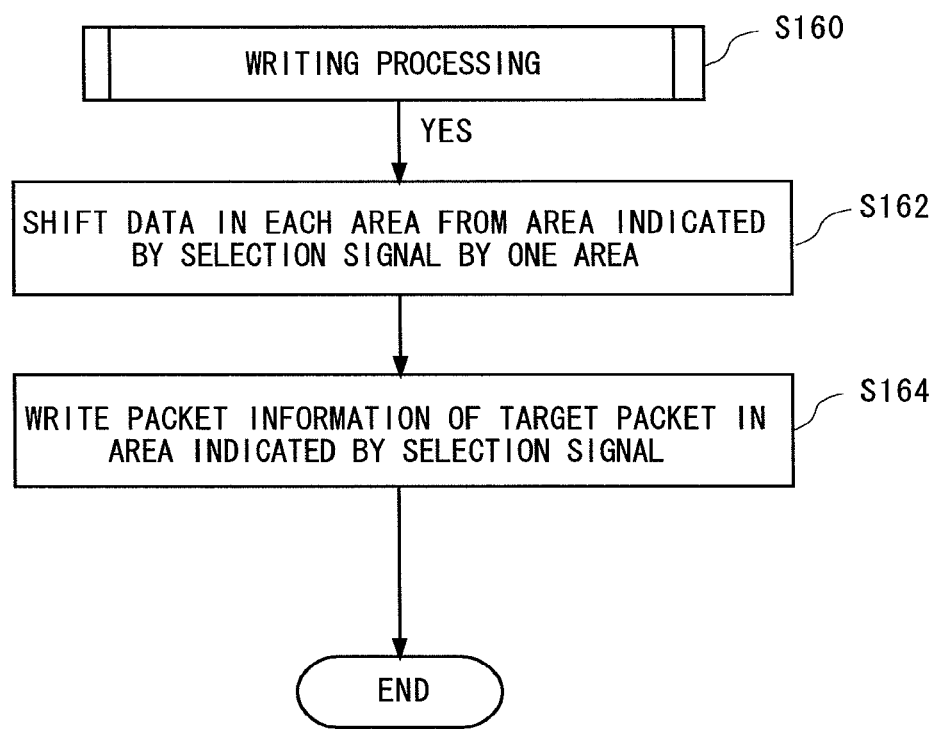
FIG. 4 is a flowchart showing writing processing in the flowchart shown in FIG. 3.

FIG. 4 is a flowchart showing writing processing in Step S160 shown in FIG. 3. The writing circuit 200 first shifts the data stored in each area by one area in the direction to the tail of the alignment buffer 110 from the area indicated by the selection signal SEL (S162).

The writing circuit 200 then writes the packet information PI of the target packet in the area indicated by the selection signal SEL (S164).

As will be understood from the description above, the alignment circuit 100 stores the packet information PI of each of the packets that are received from the head area of the alignment buffer 110 in ascending order of the sequence numbers with no intervals. Accordingly, when reading the received packets in the receiving apparatus including the alignment circuit 100, the packets corresponding to the packet information written in the respective areas are sequentially read out while incrementing the value by one from the head area of the alignment buffer 110, which makes the order of reading the packets equal to the order of transmission.

Various aspects may be possible when the received packets are read out.

For example, the alignment buffer 110 in the alignment circuit 100 may be used as a reception buffer and the received packet itself may be stored in the corresponding area of the alignment circuit 100 as the packet information PI. In this case, the packets may be read out from the head area of the alignment buffer 110.

In this case, the packet information PI is the packet itself. Thus, the control circuit 300 needs to analyze the header of the packet already stored in the alignment buffer 110 to extract the sequence number every time the selection signal SEL indicating the area storing a new target packet is generated.

Accordingly, it may be possible to store the packet information PI including the sequence number of the target packet and the payload of the packet together in the corresponding area of the alignment buffer 110. Accordingly, there is no need to analyze the header of the packet already stored in the alignment buffer 100 when the selection signal SEL for the new target packet is generated, which may improve efficiency.

Alternatively, for example, a reception buffer that temporarily stores packets may be provided separately from the alignment buffer 110, and packets stored in the reception buffer may be collectively transferred to a memory such as a RAM (Random Access Memory) used by the application by a DMA (Direct Memory Access). In the DMA transfer, the alignment buffer 110 may be referred to sequentially output the packets corresponding to the packet information written in the area while incrementing the value by one from the head area of the alignment buffer 110.

In this way, according to the alignment circuit 100 shown in FIG. 1, even in an apparatus for receiving packets in which sequence numbers do not increment by one according to the order of transmission and the order of reception is not guaranteed, it is possible to rearrange the received packets in the order of transmission in place of a CPU and to improve efficiency of the receiving apparatus.

Figure 5:
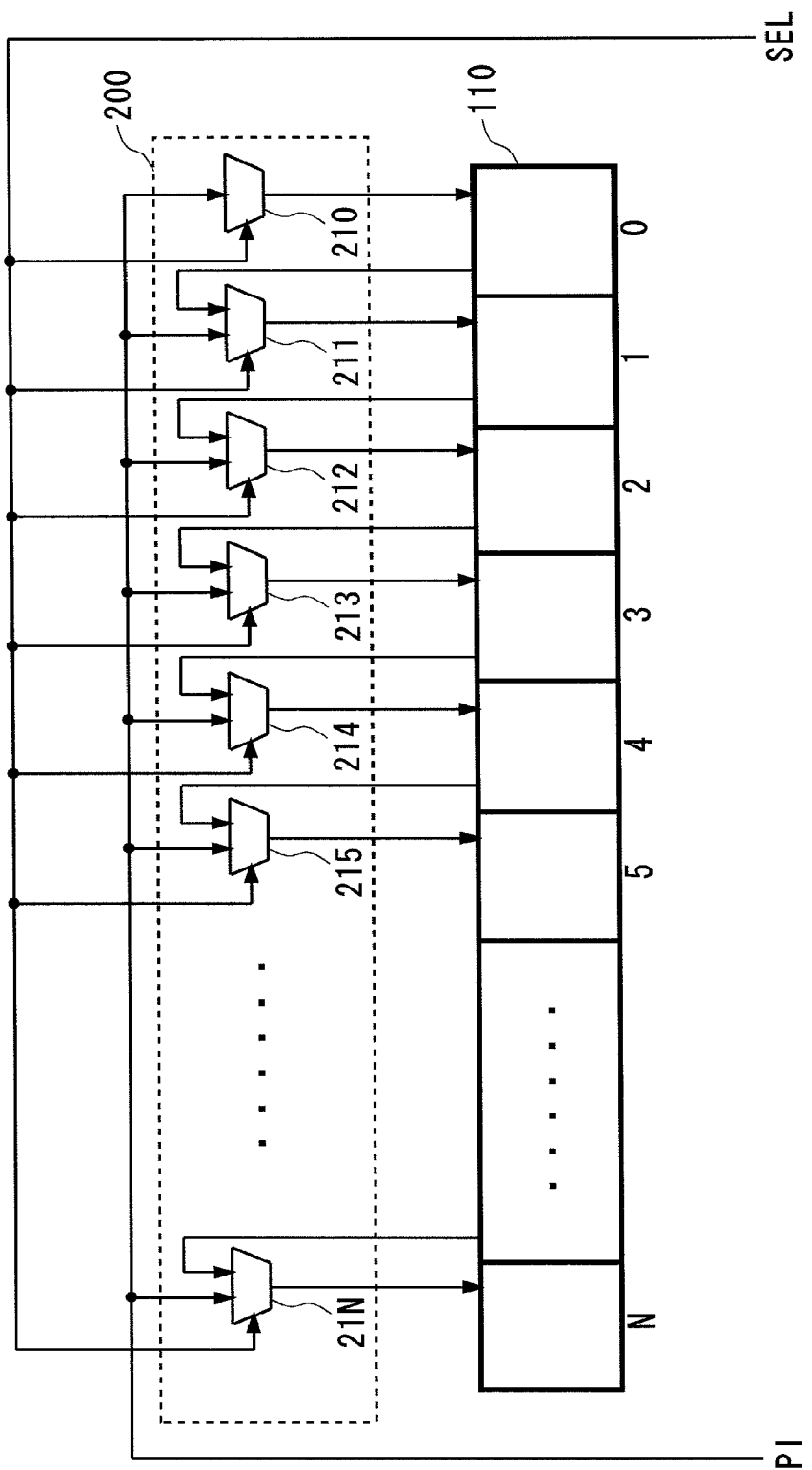
FIG. 5 is a diagram showing a configuration example of a writing circuit in the alignment circuit shown in FIG. 1.

Referring to FIG. 5, one configuration example of the writing circuit 200 in the alignment circuit 100 shown in FIG. 1 will be described.

In the example shown in FIG. 5, the writing circuit 200 includes N selection circuits (selection circuit 210-selection circuit 21N) that are provided for the respective areas of the alignment buffer 110 and are sequentially connected in stages. The packet information PI and the selection signal SEL are input to each of the selection circuits.

The selection circuits (selection circuit 210-selection circuit 21N) perform different operations according to the positional relation between the area corresponding to itself and the area indicated by the selection signal SEL.

More specifically, the selection circuits corresponding to the areas before the area indicated by the selection signal SEL perform no processing.

Further, the selection circuits corresponding to the areas after the area indicated by the selection signal each shift and store the data stored in the area corresponding to the selection circuit provided at the previous stage in the area corresponding to itself.

Further, the selection circuit corresponding to the area indicated by the selection signal writes the packet information PI of the target packet to the area.

The writing circuit 200 shown in FIG. 5 is one example which can simply achieve processing of the writing circuit 200 shown in FIG. 1. As a matter of course, the alignment circuit 100 including the writing circuit 200 is able to achieve the effects described in the alignment circuit 100 shown in FIG. 1.

As a result of intensive studies, the present inventors have established a method of efficiently searching the boundary area performed by the control circuit 300 (Step S120 in FIG. 3).

For example, when the packet information PI of the plurality of packets whose order of transmission is continuous is written in the respective areas from the head area (area 0) to another area M (M≥1) of the alignment buffer 110, the area into which the packet information PI of the new target packet is written should not be each area from the area 1 to the area (M−1) but should be the area 0, or any area of area M and the subsequent areas. Accordingly, the area 0 is first determined to be the area to be searched and the boundary area is searched for the area 0. In summary, it is determined whether the area 0 is the boundary area by comparing the sequence number SN included in the packet information PI written in the area 0 with the sequence number SN of the target packet. When it is determined that the area 0 is not the boundary area, the area M is determined to be the area to be searched and the search of the boundary area is performed for the area M, whereby it is possible to skip the search for each area from the area 1 to the area (M−1).

Figure 35:
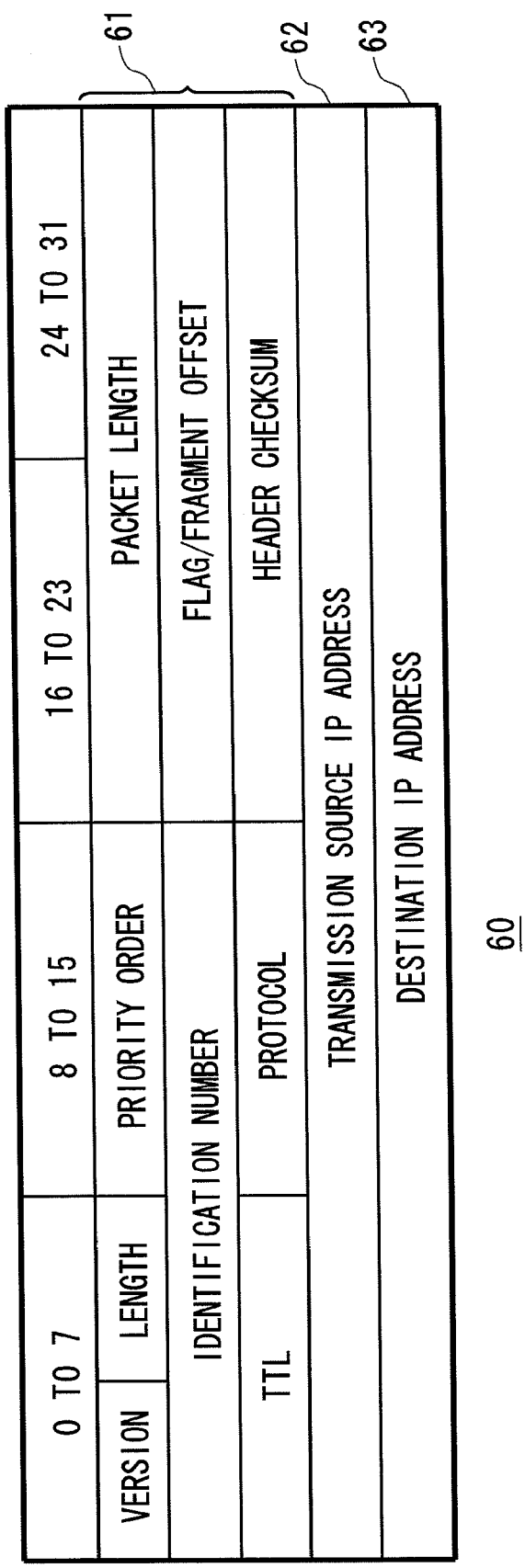
FIG. 35 is a diagram showing an IP header in the format shown in FIG. 34.

As described above, in the case of the TCP/IP packet, for example, the sequence number associated with each packet is an added value (hereinafter denoted by "W") obtained by adding the payload length and the sequence number of the packet transmitted just before the packet. In summary, for each packet that is previously received, the sequence number (the added value W stated above) of the packet which is to be transmitted next can be calculated from the payload length and the sequence number of the packet. The information indicating the total length of the packet (packet length in FIG. 35) is included in the header of the TCP/IP packet and the header length of the TCP header is a fixed length. Accordingly, by acquiring the IP header length (length in FIG. 35), the sequence number, and the packet length from the header of the TCP/IP packet, it is possible to calculate the sequence number of the packet which is to be transmitted next to the packet according to the following expression (1).

$$\text{Added value } W = \text{sequence number of packet} + \text{packet length} - IP \text{ header length} - TCP \text{ header length}$$

$$= \text{sequence number of packet which is to be transmitted next} \quad (1)$$

Figure 36:
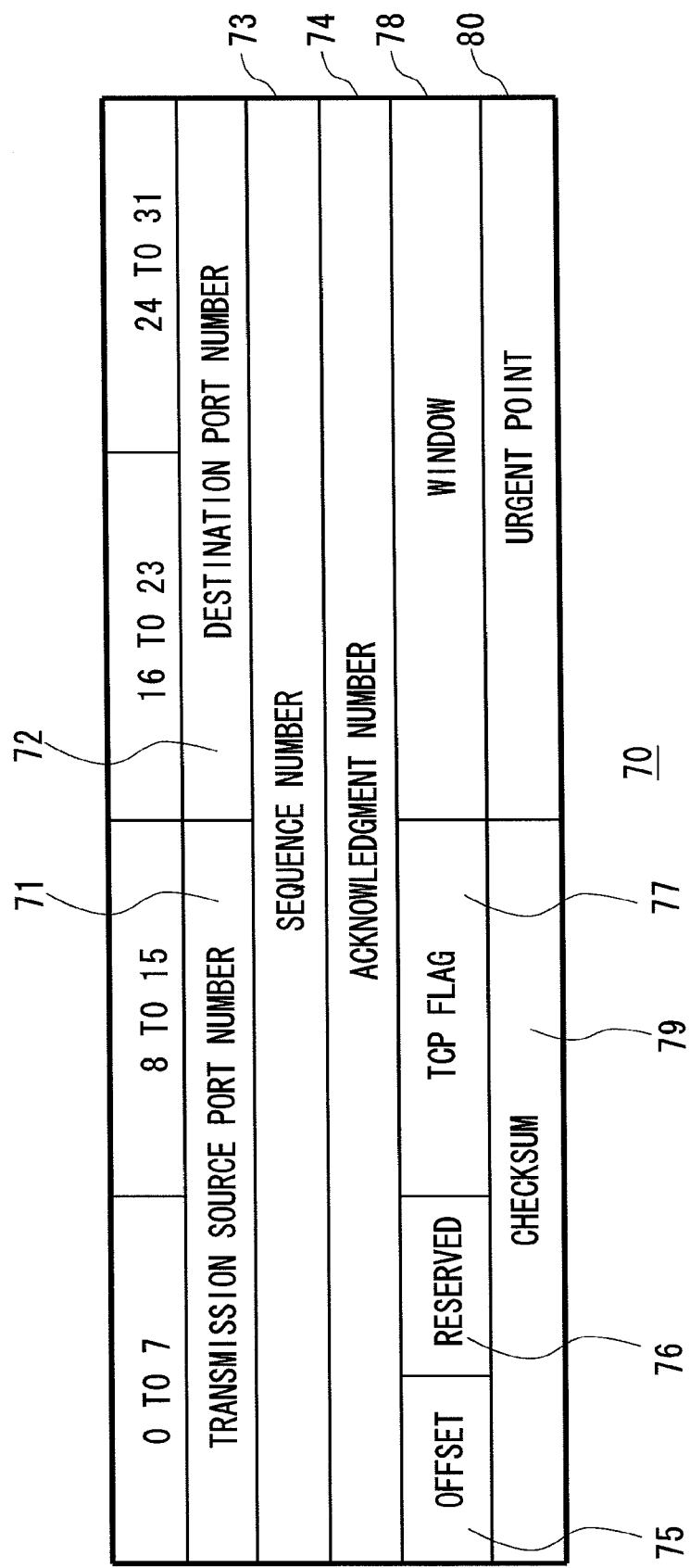
FIG. 36 is a diagram showing a TCP header in the format shown in FIG. 34.

Further, as described with reference to FIG. 36, the TCP header 70 includes an acknowledgement number 74 corresponding to the added value W described above.

Based on the description above, the method established by the present inventors in order to efficiently search the boundary area includes generation of the packet information PI and the selection signal SEL, and determination of the area to be searched as described below. For the sake of clarity, description will be made using the alignment circuit 100 shown in FIG. 1.

First, the packet information PI needs to include, in addition to the sequence number SN, one of the added value W of the packet and the payload length of the packet or a value with which the payload length can be calculated.

To add the added value W to the packet information PI, the added value W may be calculated according to expression (1), or the acknowledgement number 74 which is the same value as the added value W stated above may be read out from the header and may be directly used.

To add the payload length to the packet information PI, the payload length may be calculated according to expression (2).

$$\text{Payload length} = \text{packet length} - IP \text{ header length} - TCP \text{ header length} \quad (2)$$

In this case, when the added value W of the packet whose packet information PI is already stored in the alignment buffer 110 is required later, the payload length and the sequence number of the packet may be added.

To add the value other than the payload length with which the payload length can be calculated to the packet information PI, the packet length and the IP header length may be used, for example.

The TCP header length is fixed. Thus, in this case, when the added value W of the packet whose packet information PI is already stored in the alignment buffer 110 is required later, the sequence number of the packet, the packet length, and the IP header length are read out to calculate the added value W according to expression (1).

As described above, the sequence number SN of the packet, the added value W itself or the value with which the added value W can be calculated are included in each packet information PI already written in the alignment buffer 110.

The control circuit 300 determines the area to be searched at the time of the search of the boundary area performed when the head area of the alignment buffer of the alignment buffer 110 is the written area, and sets only each area determined to be the area to be searched to the search target.

The area to be searched is a group head area which is the head area of each of consecutive groups in the alignment buffer 110.

Further, the group head area is the area corresponding to one of the head area of the alignment buffer 110 and the written area which is other than the head area of the alignment buffer 110 and is the next area of the area to the tail of the immediately previous consecutive group.

Each of consecutive groups is only the group head area, or a plurality of written areas whose order of arrangement is continuous from the group head area, and includes the plurality of written areas in which the sequence number SN included in the packet information PI written in each of the areas from the second area of the plurality of written areas matches the added value W obtained from the packet information PI written in the area which is immediately before the area.

The search of the boundary area is not performed for all the areas to be searched. For example, since the search of the boundary area is ended when it is determined that the area A is the boundary area as a result of the search for the area to be searched (area A) which is before the area to be searched (area B), the search for the area B is not performed.

As stated above, when the packet information PI of the plurality of packets whose order of transmission is consecutive is stored in each area from the head area (area 0) of the alignment buffer 110 to another area M (M≥1), the sequence number SN included in the packet information PI written in each area from the area 1 to the area M matches the added value W obtained from the packet information PI written in the immediately previous area.

In this case, the control circuit 300 regards each area from the area 0 to the area M as one consecutive group, and searches the boundary area for the group head area (area 0). When it is determined that the area 0 is the boundary area as a result of the search, the search of the boundary area is ended. In this case, it is determined that the area 0 is the area to which the target packet should be written.

On the other hand, when it is determined that the area 0 is not the boundary area, the control circuit 300 checks whether the area (M+1) is a written area. When the area is an unwritten area, it is determined that there is no boundary area. Also in this case, the area 0 is determined as an area to which the target packet should be written.

When the area (M+1) is a written area, i.e., the area is the head area of the next consecutive group, the control circuit 300 searches the boundary area for the group head area (area (M+1)). The following processing is similar to that in the case in which the boundary area is searched for the area 0.

As described above, according to the method established by the present inventors, only the head area of each consecutive group is determined to be the area to be searched and only the area to be searched that is determined is searched. Accordingly, it is possible to reduce the number of areas in which the target packet and the sequence number SN are compared and to efficiently search the boundary area.

There are various possible methods to achieve determination of the area to be searched described above. Now, a method based on a "consecutive bit" (first method) and a method based on a "pointer" (second method) will be described. Again, the functional block of the alignment circuit 100 shown in FIG. 1 is used for description. It is assumed that the packet information PI includes the added value W.

<First Method: Method Based on Consecutive Bit>

In this method, the control circuit 300 adds a consecutive bit CB to the packet information PI (sequence number SN+added value W) of the target packet to output the packet information PI to the writing circuit 200. The consecutive bit CB includes a value indicating one of "match" and "mismatch". As an example, "1" indicates "match", and "0" indicates "mismatch".

When determining the area to be searched, the control circuit 300 determines each written area into which the packet information PI including the consecutive bit CB indicating "mismatch", i.e., the value of 0 is written as the area to be searched.

Further, when adding the consecutive bit CB to the packet information PI of the target packet, the control circuit 300 adds the value (1) indicating "match" to the consecutive bit CB when the area indicated by the selection signal SEL is other than the head area of the alignment buffer 110 and the sequence number SN of the target packet matches the added value W obtained from the packet information PI written in the area just before the area indicated by the selection signal SEL. In other cases, 0 is added to the consecutive bit CB.

Figure 6:
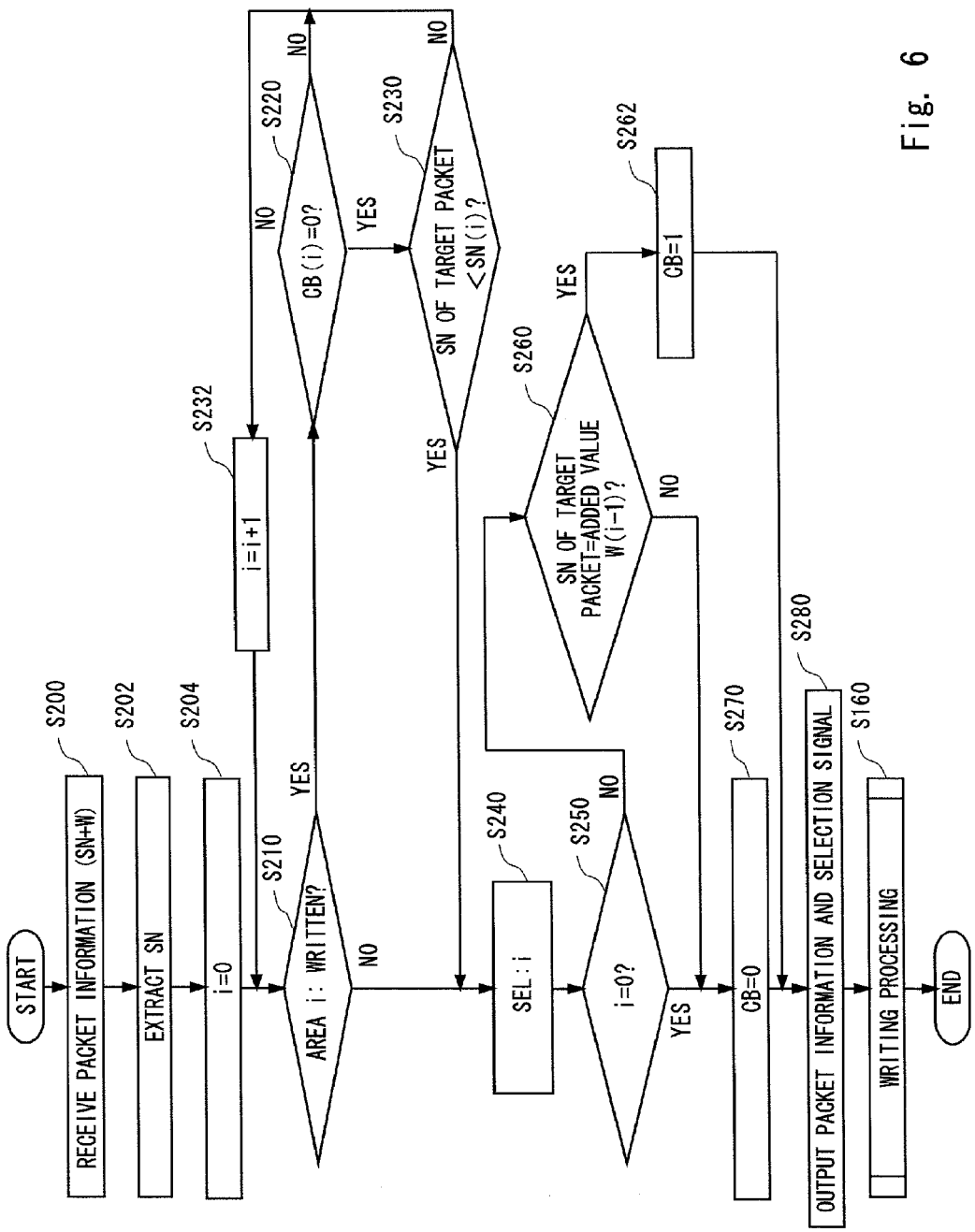
FIG. 6 is a flowchart showing processing of the alignment circuit shown in FIG. 1 when a method of determining an area to be searched based on a consecutive bit (first method) is used.

FIG. 6 is a flowchart showing processing of the alignment circuit 100 when the first method is applied, and shows a flow from the reception of the target packet to the operation in which the packet information PI of the target packet is written in the alignment buffer 110. In FIG. 6, Step S202-Step S280 are performed by the control circuit 300, and Step S160 is writing processing performed by the writing circuit 200 shown in FIG. 4.

As shown in FIG. 6, when the packet is received and the packet information PI of the packet is input to the alignment circuit 100 (S200), the control circuit 300 extracts the sequence number SN from the packet information PI (S202).

Then, the control circuit 300 checks whether the head data 0 of the alignment buffer 110 is a written area or an unwritten area (S204, S210). When the area 0 is an unwritten area (S210: No), the control circuit 300 generates the selection signal SEL indicating the area 0 (S240). Then, the control circuit 300 adds 0 to the consecutive bit CB of the target packet (S250: Yes, S270), to output the packet information PI including the added value W and the sequence number SN obtained in Step S202 and the consecutive bit CB, and the selection signal SEL generated in Step S220 to the writing circuit 200 (S280).

When the area 0 is the written area as a result of the check in Step S210 (S204, S210: Yes), the control circuit 300 starts searching the boundary area. Specifically, first, it is determined whether the area 0 is an area to be searched (S220). More specifically, it is checked whether the consecutive bit CB included in the packet information PI written in the area 0 is 1 or 0. As will be understood from the description below, since the consecutive bit CB included in the packet information PI written in the area 0 is always 0, the control circuit 300 regards the area 0 as the area to be searched, and compares the sequence number SN of the target packet with the sequence number SN(0) included in the packet information written in the area 0 (S220: Yes, S230).

When the sequence number SN of the target packet is smaller than SN(0) (S230: Yes), the control circuit 300 regards the area 0 as the boundary area, to generate the selection signal SEL indicating the area 0 (S240). Then, 0 is added to the consecutive bit CB of the target packet (S250: Yes, S270), and the packet information PI and the selection signal SEL are output to the writing circuit 200 (S280).

When the sequence number SN of the target packet is larger than SN(0) as a result of the comparison in Step S230 (S230: No), the control circuit 300 determines that the area 0 is not the boundary area, and performs processing from Step S210 for the next area (area 1) (S232, S210-).

For the area 1, the control circuit 300 first checks whether the area is a written area (S210).

When the area 1 is an unwritten area (S210: No), the control circuit 300 generates the selection signal SEL indicating the area 1 (S240), and further checks whether the sequence number SN of the target packet matches the added value W(0) included in the packet information PI written in the area 0 (S250: No, S260). When they are matched, the control circuit 300 adds 1 to the consecutive bit CB of the target packet (S260: Yes, S262), to output the packet information PI and the selection signal SEL to the writing circuit 200 (S280).

When they are not matched as a result of the check in Step S260 (S260: No), the control circuit 300 adds 0 to the consecutive bit CB of the target packet (S270), to output the packet information PI and the selection signal SEL to the writing circuit 200 (S280).

Going back to Step S210, a case will be described in which the area 1 is the written area (S210: Yes). In this case, the control circuit 300 first checks whether the area 1 is the area to be searched based on the consecutive bit CB included in the packet information PI written in the area 1 (S220). When the area 1 is the area to be searched, the following processing is the same to that in the case of the area 0 (S220: Yes, S230-).

When the consecutive bit CB included in the packet information PI written in the area 1 is 0, the control circuit 300 determines that the area 1 is not a boundary area, and performs processing from Step S210 for the next area (area 2) (S220: No, S232, S210-).

In this way, the determination of the area to be searched and the search for the area determined to be the area to be searched are repeated until when the boundary area is detected or the search for all the areas to be searched is completed. Then, when the boundary area is detected, the selection signal SEL indicating the boundary area is generated, and 1 or 0 is added to the consecutive bit CB included in the packet information PI of the target packet. Further, when the boundary area was not detected even when the search for all the areas to be searched is completed, the selection signal SEL indicating the next area of the last written area is generated, and 1 or 0 is added to the consecutive bit CB included in the packet information PI of the target packet.

Figure 7:
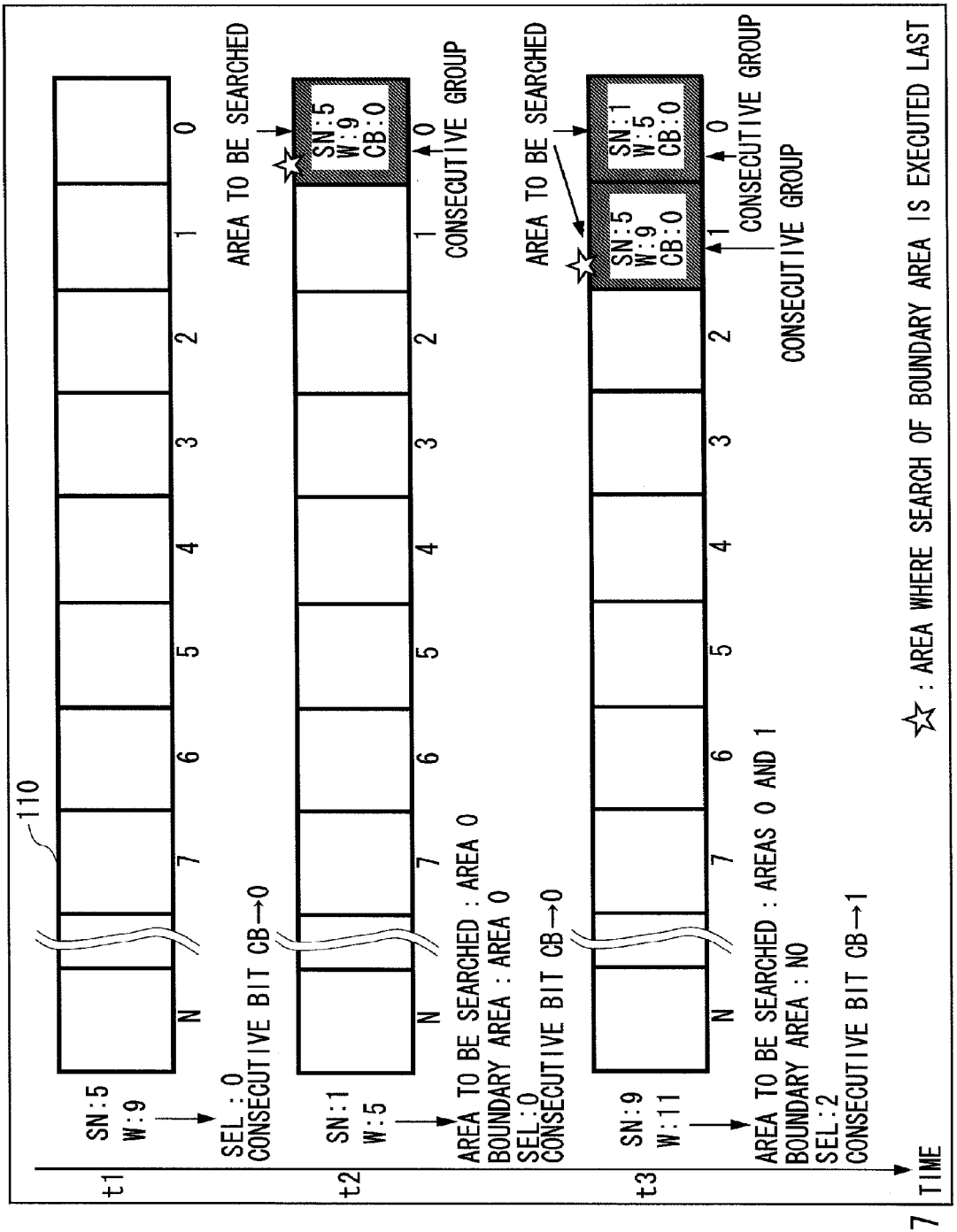
FIG. 7 is a diagram showing a specific example of processing of the alignment circuit shown in FIG. 1 when the method of determining the area to be searched based on the consecutive bit (first method) is used (No. 1)
Figure 8:
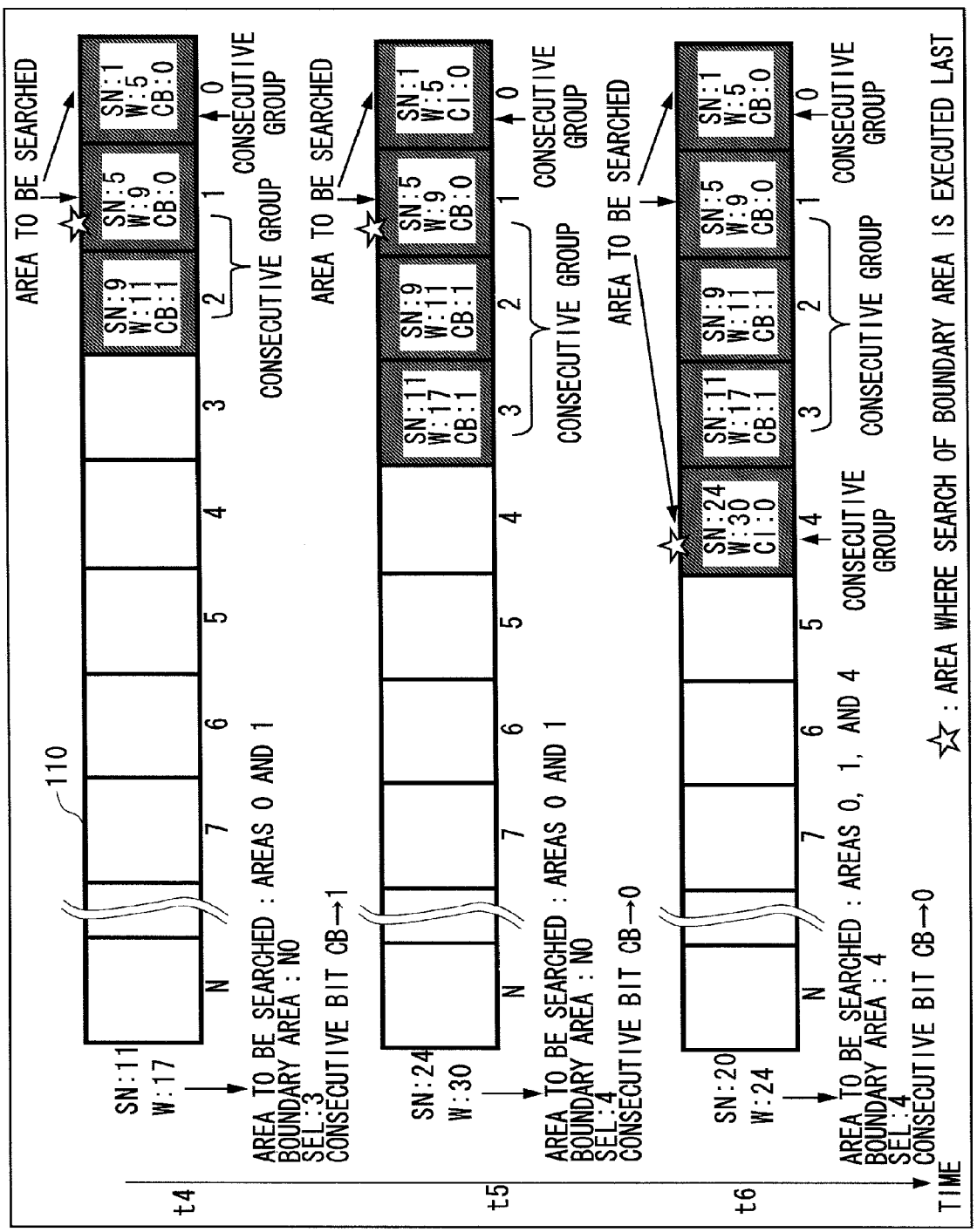
FIG. 8 is a diagram showing a specific example of processing of the alignment circuit shown in FIG. 1 when the method of determining the area to be searched based on the consecutive bit (first method) is used (No. 2)
Figure 9:
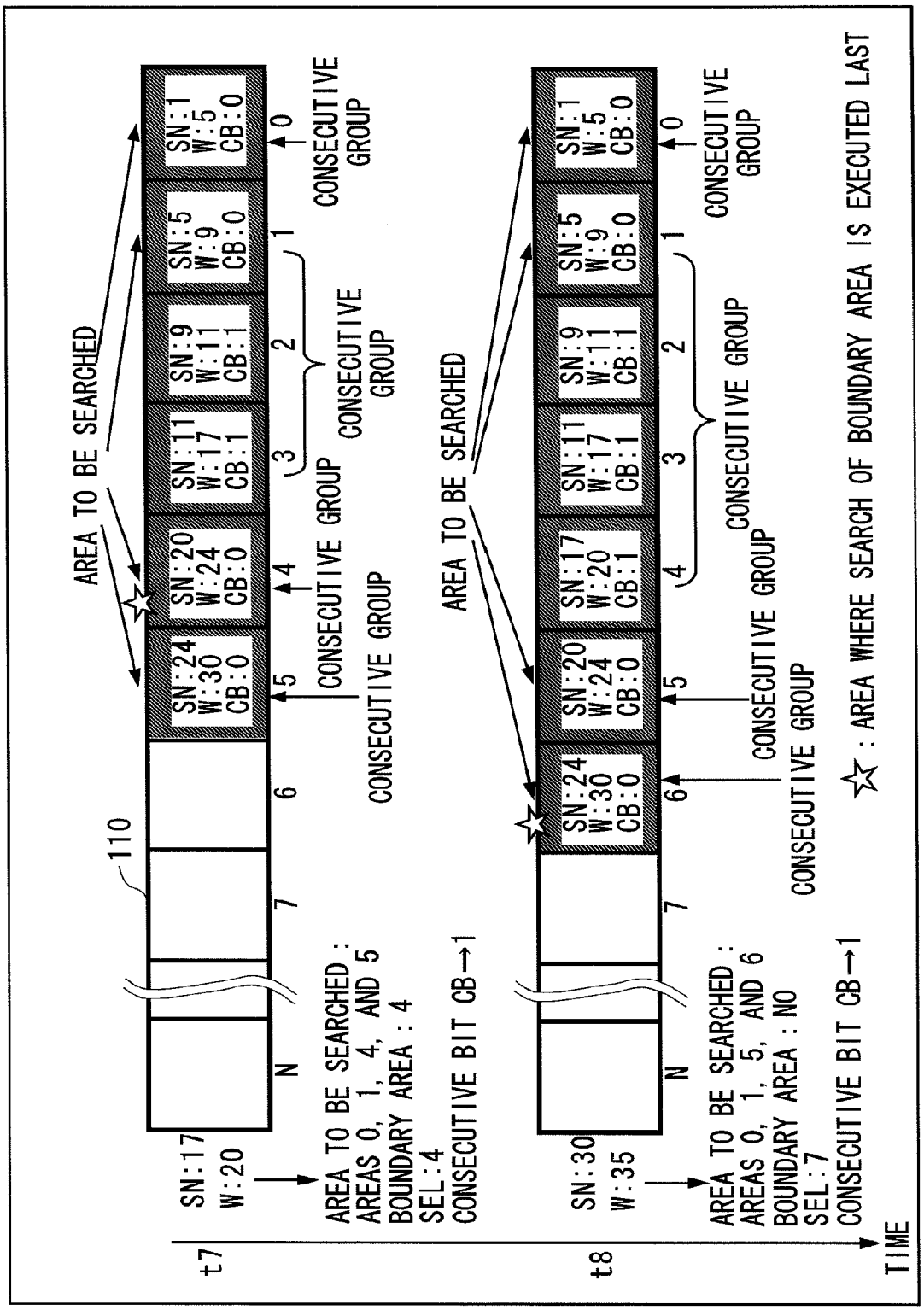
FIG. 9 is a diagram showing a specific example of processing of the alignment circuit shown in FIG. 1 when the method of determining the area to be searched based on the consecutive bit (first method) is used (No. 3)

Referring to FIGS. 7-9, a specific example of processing by the alignment circuit 100 to which the first method is applied will be described. Throughout the drawings, the asterisks indicate areas where the search of the boundary area was executed last.

In this example, assume that eight packets whose sequence numbers are 1, 5, 9, 11, 17, 20, 24, and 30 are transmitted. The packets with smaller sequence numbers are transmitted earlier. However, the sequence numbers in the order of arrival are "5, 1, 9, 11, 24, 20, 17, 30".

As shown in FIG. 7, at timing t1, the packet whose sequence number SN is 5 is received first, and its packet information PI is input to the alignment circuit 100. The control circuit 300 extracts the sequence number SN of the packet from the packet information PI. Since the area 0 of the alignment buffer 110 is an unwritten area, the control circuit 300 generates the selection signal SEL indicating the area 0 and adds 0 to the consecutive bit CB of the packet.

As a result, when the next packet (sequence number SN: 1) is arrived at timing t2, "5", "9", and "0" are written in the area 0 of the alignment buffer 110 as the sequence number SN, the added value W, and the consecutive bit CB included in the packet information PI, respectively.

At this time, since the area to be searched is only the area 0, and the sequence number SN written in the area 0 is larger than 1 which is the sequence number SN of the target packet, the control circuit 300 determines that the area 0 is the boundary area, to generate the selection signal SEL indicating the area 0. Further, 0 is added to the consecutive bit CB of the target packet.

As a result, when the packet whose sequence number SN is 9 is arrived at timing t3, "1", "5", and "0" are written in the area 0, and "5", "9", and "0" are written in the area 1 of the alignment buffer 110 as the sequence number SN, the added value W, and the consecutive bit CB, respectively.

At this time, both of the area 0 and the area 1 are areas to be searched. The control circuit 300 determines that there is no boundary area as a result of the search of the boundary area, to generate the selection signal SEL indicating the area 2. Further, since 9 which is the sequence number SN of the target packet matches 9 which is the added value W written in the area 1, the control circuit 300 adds 1 to the consecutive bit CB of the target packet.

As a result, when the packet whose sequence number SN is 11 is arrived at timing t4, as shown in FIG. 8, "1", "5", and "0" are written in the area 0, "5", "9", and "0" are written in the area 1, and "9", "11", and "1" are written in the area 2 of the alignment buffer 110 as the sequence number SN, the added value W, and the consecutive bit CB, respectively.

At this time, only the area 0 and the area 1 are areas to be searched. As a result of the search of the boundary area, the control circuit 300 determines that there is no boundary area, to generate the selection signal SEL indicating the area 3. Further, since 11 which is the sequence number SN of the target packet matches 11 which is the added value W written in the area 2, the control circuit 300 adds 1 to the consecutive bit CB of the target packet.

As a result, when the packet whose sequence number SN is 24 is arrived at timing t5, "11", "17", and "1" are further written in the area 3 of the alignment buffer 110 as the sequence number SN, the added value W, and the consecutive bit CB.

In this case as well, only the area 0 and the area 1 are areas to be searched. The control circuit 300 determines that there is no boundary area as a result of the search of the boundary area, to generate the selection signal SEL indicating the area 4. Further, since 24 which is the sequence number SN of the target packet does not match 17 which is the added value W written in the area 3, the control circuit 300 adds 0 to the consecutive bit CB of the target packet.

As a result, when the packet whose sequence number SN is 20 is arrived at timing t6, "24", "30", and "0" are further written in the area 4 of the alignment buffer 110 as the sequence number SN, the added value W, and the consecutive bit CB.

At this time, only the area 0, the area 1, and the area 4 are areas to be searched. The control circuit 300 determines that the area 4 is the boundary area as a result of the search of the boundary area, to generate the selection signal SEL indicating the area 4. Further, since 20 which is the sequence number SN of the target packet does not match 17 which is the added value W written in the area 4, the control circuit 300 adds 0 to the consecutive bit CB of the target packet.

As a result, as shown in FIG. 9, when the packet whose sequence number SN is 17 is arrived at timing t7, "24", "30", and "0" written in the area 4 of the alignment buffer 110 as the sequence number SN, the added value W, and the consecutive bit CB are shifted to the area 5, and "20", "24", and "0" are written in the area 4 as the sequence number SN, the added value W, and the consecutive bit CB.

At this time, the area 0, the area 1, the area 4, and the area 5 are areas to be searched. The control circuit 300 determines that the area 4 is the boundary area as a result of the search of the boundary area to the area 4, to generate the selection signal SEL indicating the area 4. Further, since 17 which is the sequence number SN of the target packet matches 17 which is the added value W written in the area 3, the control circuit 300 adds 1 to the consecutive bit CB of the target packet.

As a result, when the packet whose sequence number SN is 30 is arrived at timing t8, the information written in the area 4 and the area 5 of the alignment buffer 110 as the sequence number SN, the added value W, and the consecutive bit CB is shifted to the area 5 and the area 6, respectively, and "17", "20", and "1" are written in the area 4 as the sequence number SN, the added value W, and the consecutive bit CB.

At this time, the area 0, the area 1, the area 4, the area 5, and the area 6 are areas to be searched. The control circuit 300 determines that there is no boundary area as a result of the search of the boundary area to the area 6, to generate the selection signal SEL indicating the area 7. Further, since 30 which is the sequence number SN of the target packet matches 30 which is the added value W written in the area 6, the control circuit 300 adds 1 to the consecutive bit CB of the target packet.

For example, at timing t6 shown in FIG. 8, while the area 0-area 4 of the alignment buffer 110 are written areas, the search of the boundary area, i.e., comparison between the sequence number SN written in the area and the sequence number SN of the target packet is performed only on the area 0, the area 1, and the area 4, and the area 2 and the area 3 are skipped.

In this way, according to the first method, it is determined at the search of the boundary area whether the area is the area to be searched based on the consecutive bit included in the packet information PI written in each area for each written area, and only the area determined to be the area to be searched is searched. As a result, the efficiency of searching the boundary area can be improved.

<Second Method: Method Based on Pointer>

In this method, a pointer storage circuit (not shown) that stores one or more pointers P generated by the control circuit is further included. When determining the area to be searched, the control circuit 300 determines the written area indicated by each pointer P stored in the pointer storage circuit is determined to be the area to be searched.

Further, the control circuit 300 performs pointer generation/change processing instead of adding the consecutive bit CB to the packet information PI for the target packet.

The pointer generation/change processing performed by the control circuit 300 is specifically as follows.

<<Case 1: The Area Indicated by the Selection Signal SEL is an Unwritten Area>>

In this case 1, the control circuit 300 does not generate a pointer when the area indicated by the selection signal SEL is other than the head area of the alignment buffer 110 and the sequence number SN of the target packet matches the added value W obtained from the packet information PI written in the immediately previous area (case 1A).

In the case 1B which does not correspond to the case 1A stated above, the control circuit 300 generates a pointer indicating the area indicated by the selection signal SEL.

<<Case 2: The Area Indicated by the Selection Signal SEL is a Written Area>>

In this case 2, the control circuit 300 first changes (shifts) all the pointers each indicating any area from the area indicated by the selection signal SEL to indicate the next area of the area that is currently indicated.

The pointer is not generated when the area indicated by the selection signal SEL is other than the head area of the alignment buffer 110 and the sequence number SN of the target packet matches the added value W obtained by the packet information PI written in the area just before the area indicated by the selection signal SEL (case 2A).

Meanwhile, in the case 2B which does not correspond to the case 2A stated above, the pointer indicating the area indicated by the selection signal SEL is generated.

Figure 10:
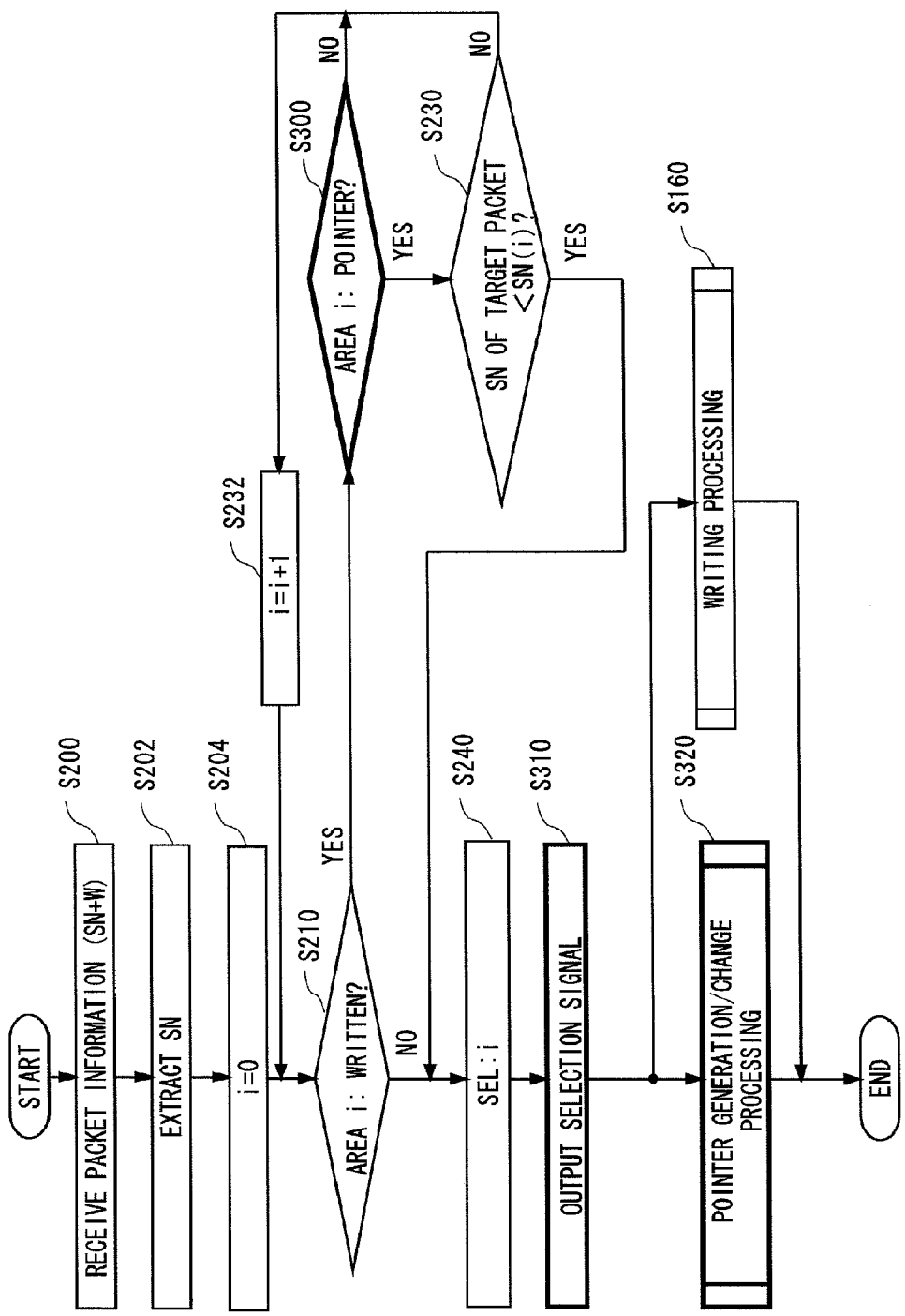
FIG. 10 is a flowchart showing processing of the alignment circuit shown in FIG. 1 when a method of determining the area to be searched based on a pointer (second method) is used.

FIG. 10 is a flowchart showing processing of the alignment circuit 100 when the second method is applied, and shows a flow from the reception of the target packet to the operation in which the packet information PI of the target packet is written in the alignment buffer 110. In FIG. 10, Step S202-Step S320 are performed by the control circuit 300, and Step S160 is performed by the writing circuit 200 shown in FIG. 4.

As shown in FIG. 10, processing in Step S222 in the flowchart shown in FIG. 6 (determination of the area to be searched based on the consecutive bit CB) corresponds to Step S300. In Step S300, the control circuit 300 determines whether the area i is the area to be searched based on the determination whether there is a pointer indicating the area i.

Further, since the packet information PI is output to the writing circuit 200 without passing through the control circuit 300, in Step S310, the control circuit 300 outputs only the selection signal SEL to the writing circuit 200.

Further, processing of adding the consecutive bit CB in the flowchart in FIG. 6 (Step S250-S270) is changed to pointer generation/change processing in Step S320 in FIG. 10.

Other configurations are similar to those in the flowchart in FIG. 6.

Referring to a flowchart in FIG. 11, pointer generation/change processing in Step S320 of FIG. 10 will be described.

In the pointer generation/change processing, the control circuit 300 first checks whether the area (area i) indicated by the selection signal SEL is a written area (S322). When the area i is an unwritten area (S322: No), i.e., in the case 1 stated above, the following processing is performed.

When the area i is other than the head area of the alignment buffer 110 and the sequence number SN of the target packet matches the added value W(W(i-1)) obtained from the packet information PI written in the area just before the area i (case 1A) (S324: No, S330: Yes), no pointer is generated.

Meanwhile, in another case (case 1B) (S324: Yes, or S324: No, S330: No), the control circuit 300 generates the pointer indicating the area i (S326).

When the area i is a written area (S322: Yes), i.e., the case 2 stated above, the control circuit 300 performs the following processing.

The control circuit 300 first shifts all the pointers each indicating any area from the area i to indicate the next area of the area that is currently indicated (S340).

When the area i is other than the head area of the alignment buffer 110 and the sequence number SN of the target packet matches the added value W(W(i−1)) obtained from the packet information PI written in the area just before the area i (case 2A) (S342: No, S350: Yes), no pointer is generated.

Meanwhile, in another case (case 2B) (S342: Yes, or S342: No, S350: No), the pointer indicating the area i is generated (S326).

According to this second method as well, the determination of the area to be searched and the search for the area determined to be the area to be searched are repeated until when the boundary area is detected or the search for all the areas to be searched is completed. When the boundary area is detected, generation of the selection signal SEL indicating the boundary area and pointer generation/change processing are performed. Further, when the boundary area was not detected even when the search for all the areas to be searched is completed, generation of the selection signal SEL indicating the next area of the last written area and the pointer generation/change processing are performed.

Figure 12:
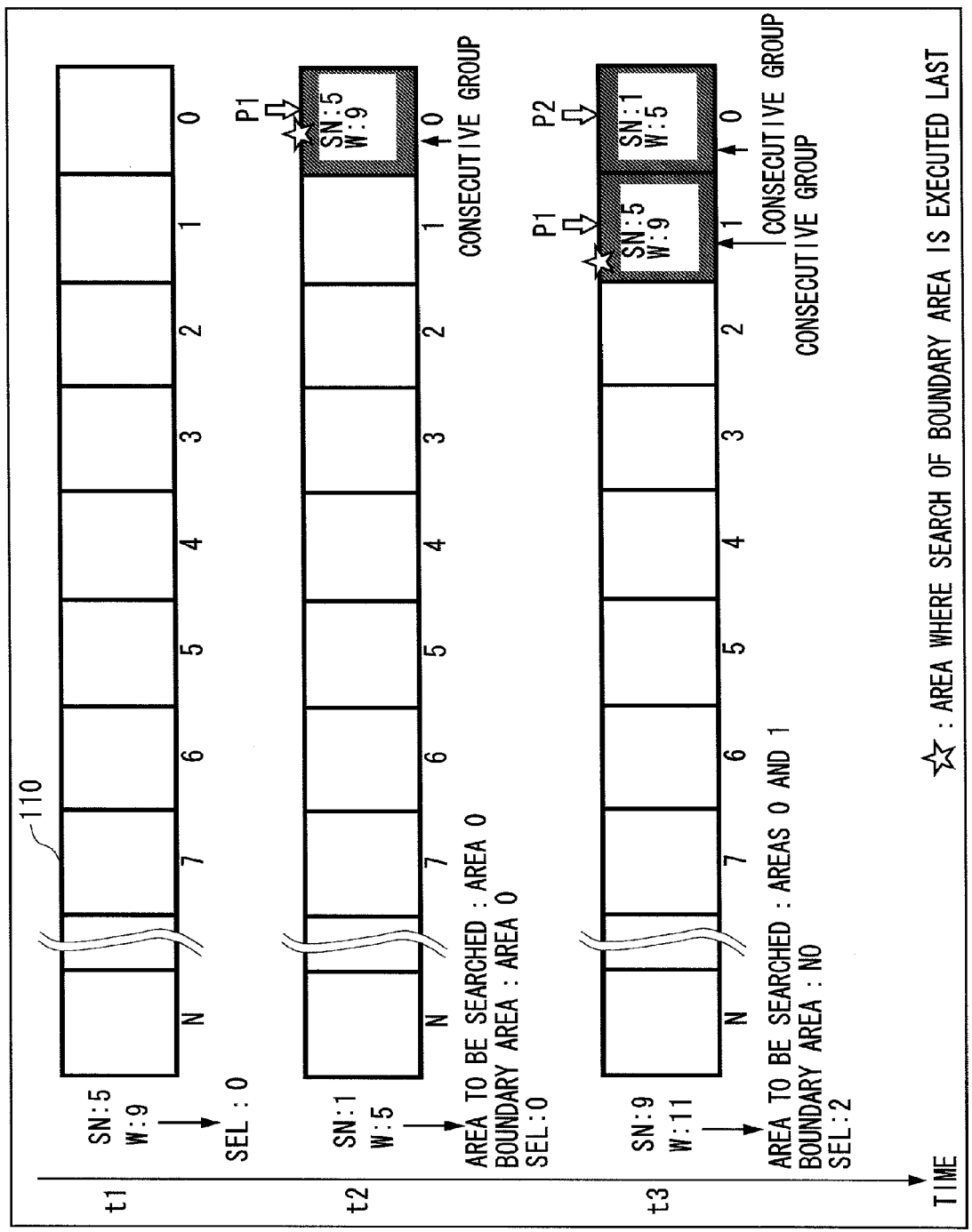
FIG. 12 is a diagram showing a specific example of processing of the alignment circuit shown in FIG. 1 when the method of determining the area to be searched based on the pointer (second method) is used (No. 1)
Figure 13:
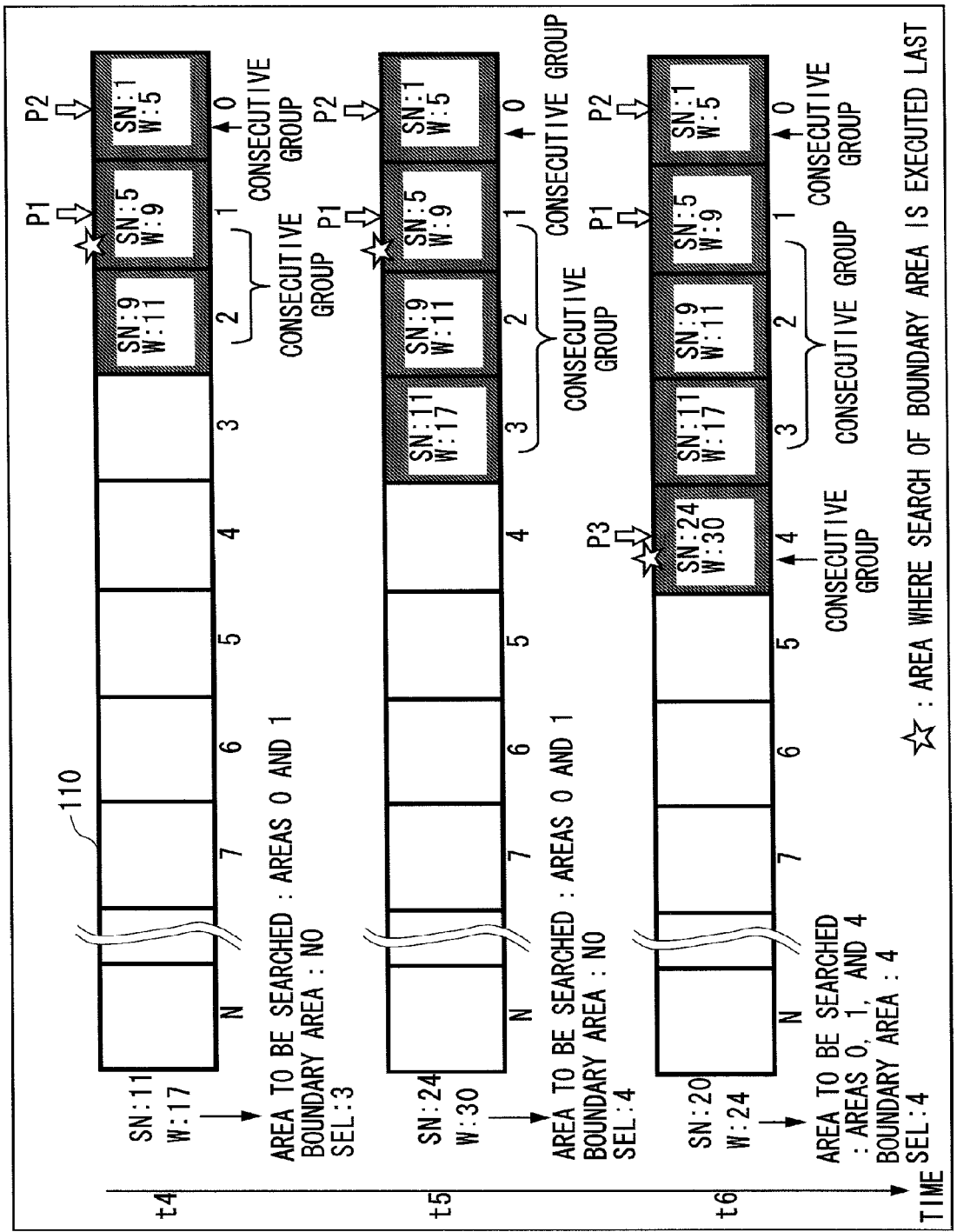
FIG. 13 is a diagram showing a specific example of processing of the alignment circuit shown in FIG. 1 when the method of determining the area to be searched based on the pointer (second method) is used (No. 2)
Figure 14:
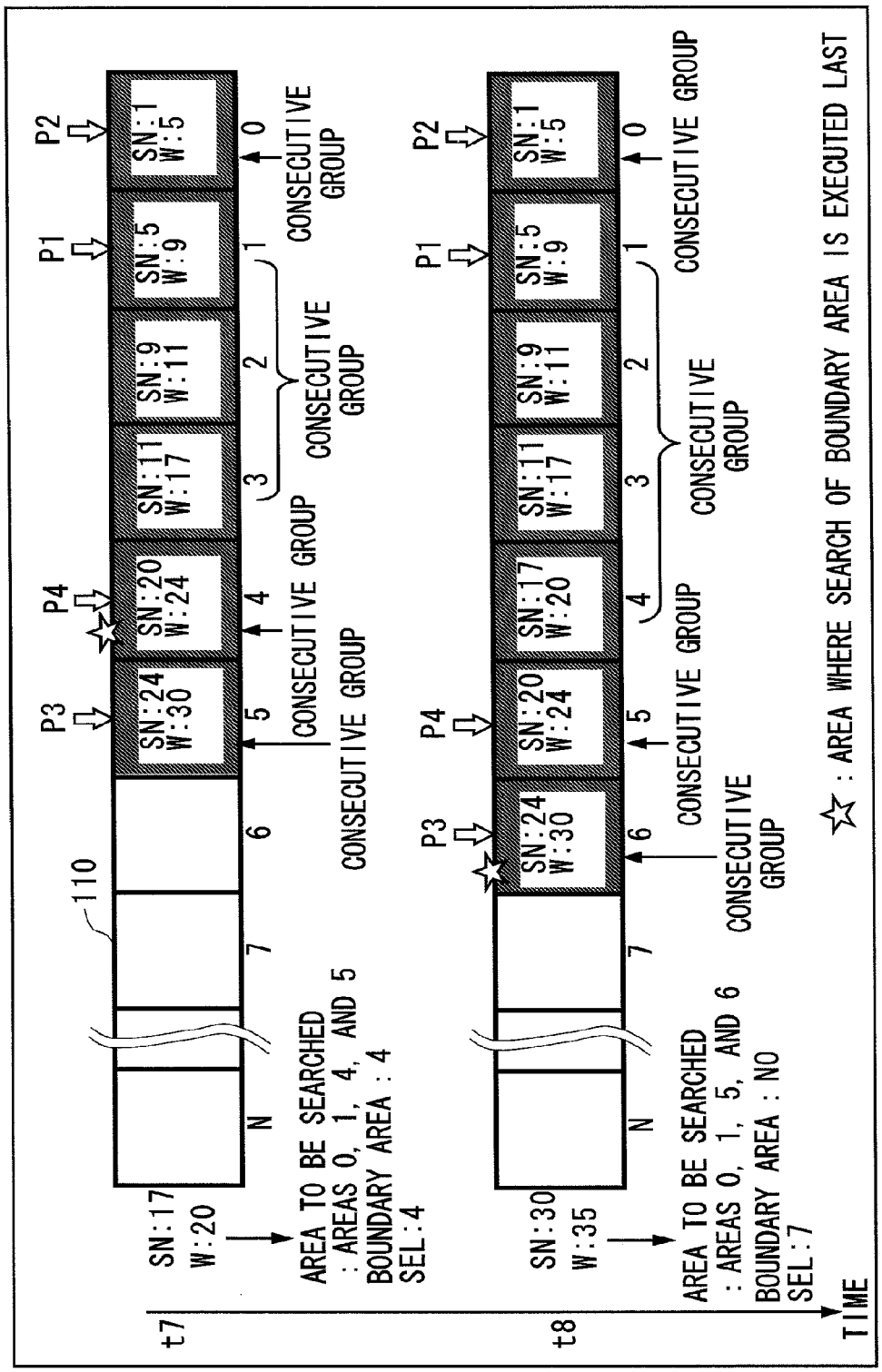
FIG. 14 is a diagram showing a specific example of processing of the alignment circuit shown in FIG. 1 when the method of determining the area to be searched based on the pointer (second method) is used (No. 3)

Referring to FIGS. 12-14, specific examples of processing by the alignment circuit 100 to which the second method is applied will be described.

Also in this example, eight packets whose sequence numbers are 1, 5, 9, 11, 17, 20, 24, and 30 are transmitted, and the sequence numbers in the order of arrival are "5, 1, 9, 11, 24, 20, 17, 30".

As shown in FIG. 12, the packet whose sequence number SN is 5 is first received at timing t1, and its packet information PI is input to the alignment circuit 100. The control circuit 300 extracts the sequence number SN of the packet. Since the area 0 of the alignment buffer 110 is an unwritten area, the control circuit 300 generates the selection signal SEL indicating the area 0 and the pointer (pointer P1) indicating the area 0 to store them in the pointer storage circuit.

As a result, when the packet whose sequence number SN is 1 is arrived at timing t2, "5" and "9" are written in the area 0 of the alignment buffer 110 as the sequence number SN and the added value W included in the packet information PI, respectively. Further, the pointer P1 indicating the area 0 is stored in the pointer storage circuit.

At this time, since the area to be searched is only the area 0 indicated by the pointer P1 and the sequence number SN written in the area 0 is larger than 1 of the sequence number SN of the target packet, the control circuit 300 determines that the area 0 is the boundary area. Then, the control circuit 300 generates the selection signal SEL indicating the area 0, shifts the pointer P1 as shown in the area 1, to generate a new pointer (pointer P2) indicating the area 0.

As a result, when the packet whose sequence number SN is 9 is arrived at timing t3, "1" and "5" are written in the area 0, and "5" and "9" are written in the area 1 of the alignment buffer 110 as the sequence number SN and the added value W, respectively. Further, the pointer P2 and the pointer P1 respectively indicating the area 0 and the area 1 are stored in the pointer storage circuit.

At this time, both of the area 0 and the area 1 are areas to be searched. The control circuit 300 determines that there is no boundary area as a result of the search of the boundary area, to generate the selection signal SEL indicating the area 2. Further, since 9 which is the sequence number SN of the target packet matches 9 which is the added value W written in the area 1, the control circuit 300 performs neither change of the pointers that have already existed nor generation of new pointers.

As a result, as shown in FIG. 13, when the packet whose sequence number SN is 11 is arrived at timing t4, "1" and "5" are written in the area 0, "5" and "9" are written in the area 1, and "9" and "11" are written in the area 2 of the alignment buffer 110 as the sequence number SN and the added value W. Further, the pointer P2 and the pointer P1 respectively indicating the area 0 and the area 1 are stored in the pointer storage circuit.

At this time, only the area 0 and the area 1 are areas to be searched. The control circuit 300 determines that there is no boundary area as a result of the search of the boundary area, to generate the selection signal SEL indicating the area 3. Further, since 11 which is the sequence number SN of the target packet matches 11 which is the added value W written in the area 2, the control circuit 300 performs neither change of the pointers that have already existed nor generation of new pointers.

As a result, when the packet whose sequence number SN is 24 is arrived at timing t5, "11" and "17" are further written in the area 3 of the alignment buffer 110 as the sequence number SN and the added value W, and the pointer P2 and the pointer P1 respectively indicating the area 0 and the area 1 remain to be stored in the pointer storage circuit.

In this case as well, only the area 0 and the area 1 are areas to be searched. The control circuit 300 determines that there is no boundary area as a result of the search of the boundary area, to generate the selection signal SEL indicating the area 4. Further, since 24 which is the sequence number SN of the target packet does not match 17 which is the added value W written in the area 3, the control circuit 300 generates a new pointer (pointer P3) indicating the area 4 to store the new pointer in the pointer storage circuit.

As a result, when the packet whose sequence number SN is 20 is arrived at timing t6, "24" and "30" are further written in the area 4 of the alignment buffer 110 as the sequence number SN and the added value W, and the pointer P3 indicating the area 4 is added to the pointer storage circuit.

At this time, only the area 0, the area 1, and the area 4 are areas to be searched. The control circuit 300 determines that the area 4 is the boundary area as a result of the search of the boundary area, to generate the selection signal SEL indicating the area 4. Further, since 20 which is the sequence number SN of the target packet does not match 17 which is the added value W written in the area 4, the control circuit 300 shifts the pointer P3 indicating the area 4 as shown in the area 5, to generate a new pointer (pointer P4) indicating the area 4 to store the new pointer in the pointer storage circuit.

As a result, as shown in FIG. 14, when the packet whose sequence number SN is 17 is arrived at timing t7, "24" and "30" written in the area 4 of the alignment buffer 110 as the sequence number SN and the added value W are shifted to the area 5, and "20" and "24" are written in the area 4 as the sequence number SN and the added value W. Further, the pointer P2, the pointer P1, the pointer P4, and the pointer P3 respectively indicating the area 0, the area 1, the area 4, and the area 5 are stored in the pointer storage circuit.

At this time, the area 0, the area 1, the area 4, and the area 5 are areas to be searched. The control circuit 300 determines that the area 4 is the boundary area as a result of the search of the boundary area to the area 4, to generate the selection signal SEL indicating the area 4. Further, since 17 which is the sequence number SN of the target packet matches 17 which is the added value W written in the area 3, the control circuit 300 shifts the pointer P4 and the pointer P3 indicating the area 4 and the area 5 as shown in the area 5 and the area 6, respectively. In this case, the control circuit 300 generates no new pointers.

As a result, when the packet whose sequence number SN is 30 is arrived at timing t8, the information written in the area 4 and the area 5 of the alignment buffer 110 as the sequence number SN and the added value W are respectively shifted to the area 5 and the area 6, and "17" and "20" are written in the area 4 as the sequence number SN and the added value W. Further, the pointer P2, the pointer P1, the pointer P4, and the pointer P3 respectively indicating the area 0, the area 1, the area 5, and the area 6 are stored in the pointer storage circuit.

At this time, the area 0, the area 1, the area 5, and the area 6 are areas to be searched. The control circuit 300 determines that there is no boundary area as a result of the search of the boundary area to the area 6, to generate the selection signal SEL indicating the area 7. Further, since 30 which is the sequence number SN of the target packet matches 30 which is the added value W written in the area 6, the control circuit 300 performs neither change of the pointers that have already existed nor generation of new pointers.

According to the second method based on a pointer, it is possible to obtain the same effects as in the first method based on the consecutive bit.

By the way, at timing t3 of FIGS. 7 and 12, although the sequence number SN included in the packet information PI stored in the area 1 matches the added value W included in the packet information PI stored in the area 0, the area 1 is determined as another consecutive group as the area 0, and both of the area 0 and the area 1 are areas to be searched.

This situation is similar in all the following timings, and the area 1 which should not be searched is always determined to be the area to be searched. The same thing is applied also to the area 5 at timing t7 and the area 5 and the area 6 at timing t8 in FIGS. 9 and 14.

In order to solve this problem and to improve the efficiency of searching the boundary area, the present inventors have conceived the following method. This method is obtained by improving the second method based on a pointer, and is hereinafter called a "third method".

The third method is the same to the second method described above except the pointer generation/change processing. The pointer generation/change processing according to the third method will now be described.

Figure 11:
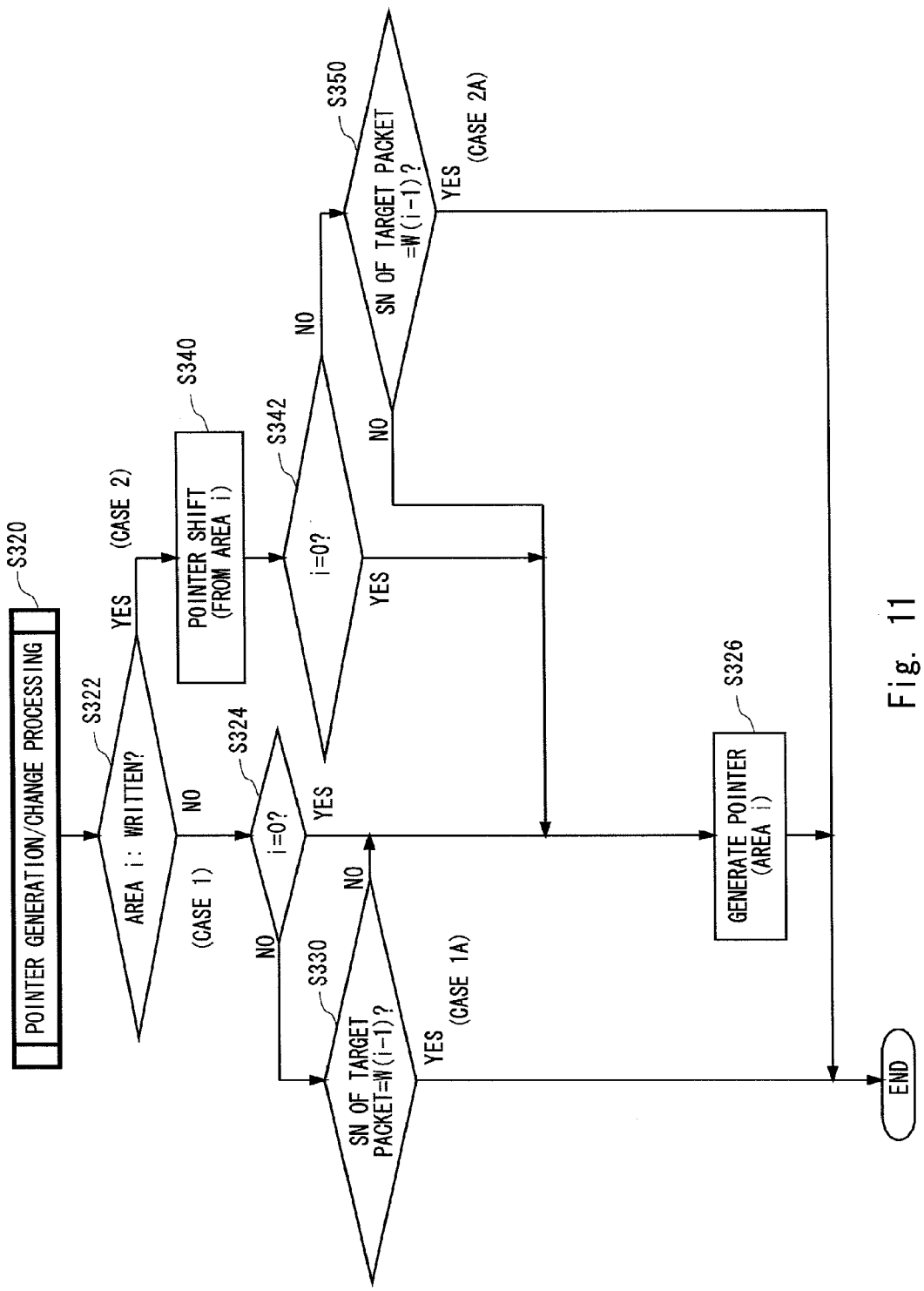
FIG. 11 is a flowchart showing pointer generation/change processing in the flowchart shown in FIG. 10.
Figure 15:
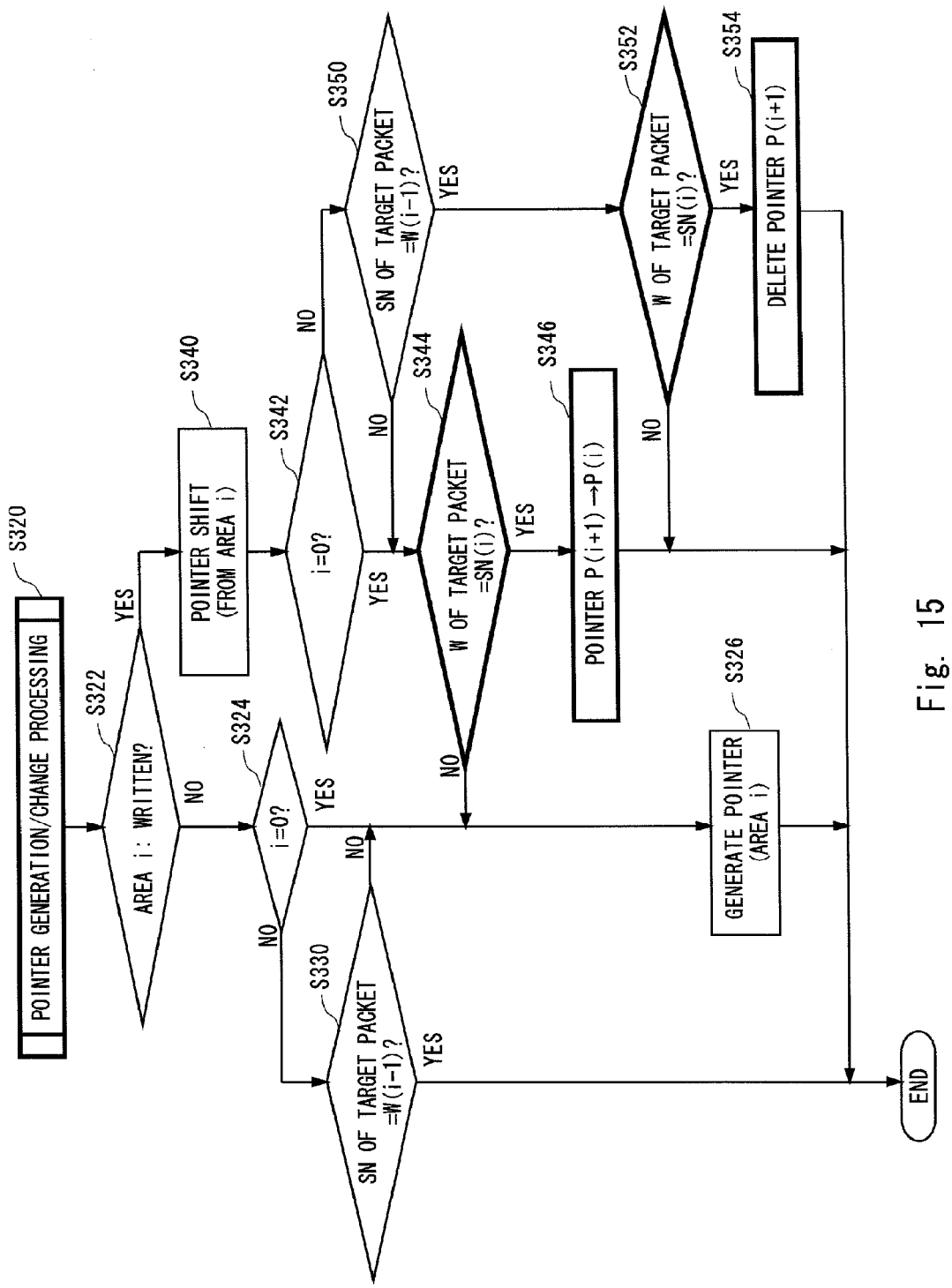
FIG. 15 is a flowchart showing pointer generation/change processing performed by the alignment circuit shown in FIG. 1 when a method obtained by improving the second method of determining the area to be searched based on the pointer (third method) is used.

FIG. 15 is a flowchart showing the pointer generation/change processing according to the third method, and is a flow of the pointer generation/change processing performed in Step S320 in FIG. 10 in place of the pointer generation/change processing shown in FIG. 11. In FIG. 15, the steps identical to those shown in FIG. 11 are denoted by the same step numbers, and description of these steps will be omitted.

As shown in FIG. 15, in the pointer generation/change processing according to the third method, when the area (area i) indicated by the selection signal SEL is the written area other than the head data of the alignment buffer 110 and the sequence number SN of the target packet matches the added value W (W(i−1)) obtained from the packet information PI written in the area just before the area i (case 2A) (S322: Yes, S340, S342: No, S350: Yes), it is further checked whether the sequence number SN included in the packet information PI written in the area i matches the added value W of the target packet (S352). The pointer (P(i+1)) indicating the next area of the area indicated by the selection signal SEL is deleted (S354) only when they are matched (S352: Yes). When they are not matched (S352: No), as is similar to the second method, further change of the pointers that have already existed or generation of new pointers are not performed.

The pointer P(i+1) deleted in Step S354 indicates the area and is shifted to indicate the area (111) in Step S340.

Further, according to the third method, also in the case 2B (S322: Yes, S340, S342: Yes, or S322: Yes, S340, S342: No, S350: No), the control circuit 300 further checks whether the sequence number SN included in the packet information PI written in the area i matches the added value W of the target packet (S344). The control circuit 300 changes the pointer (P(i+1)) indicating the next area of the area indicated by the selection signal SEL to indicate the area i (S346) only when they are matched (S344: Yes). When they are not matched (S344: No), a pointer indicating the area i is generated in the same way as in the second method.

In this case as well, the pointer P(i+1) changed in Step S346 indicates the area i, and is shifted to indicate the area (i+1) in Step S340.

Figure 16:
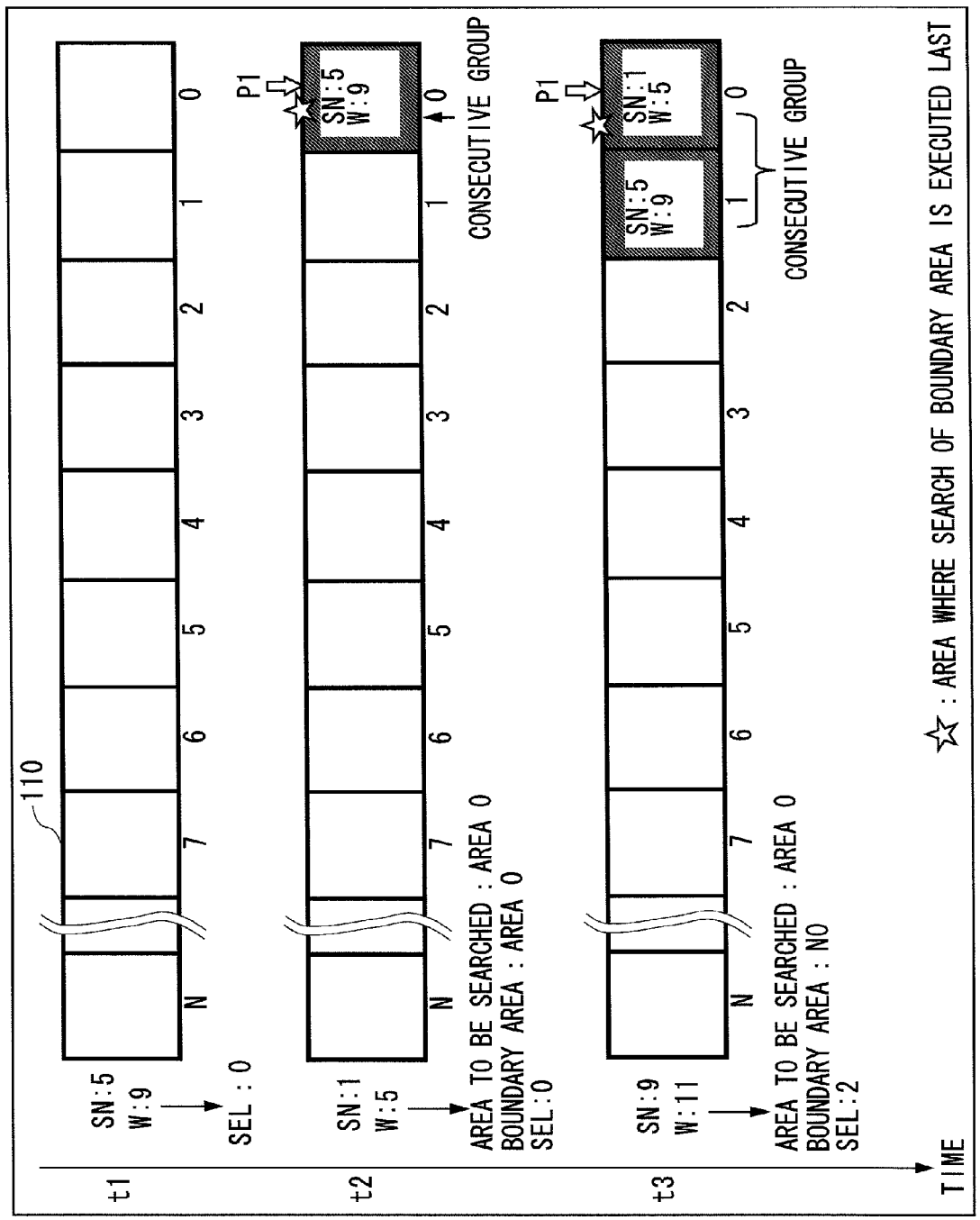
FIG. 16 is a diagram showing a specific example of processing of the alignment circuit shown in FIG. 1 when the third method is used (No. 1)
Figure 17:
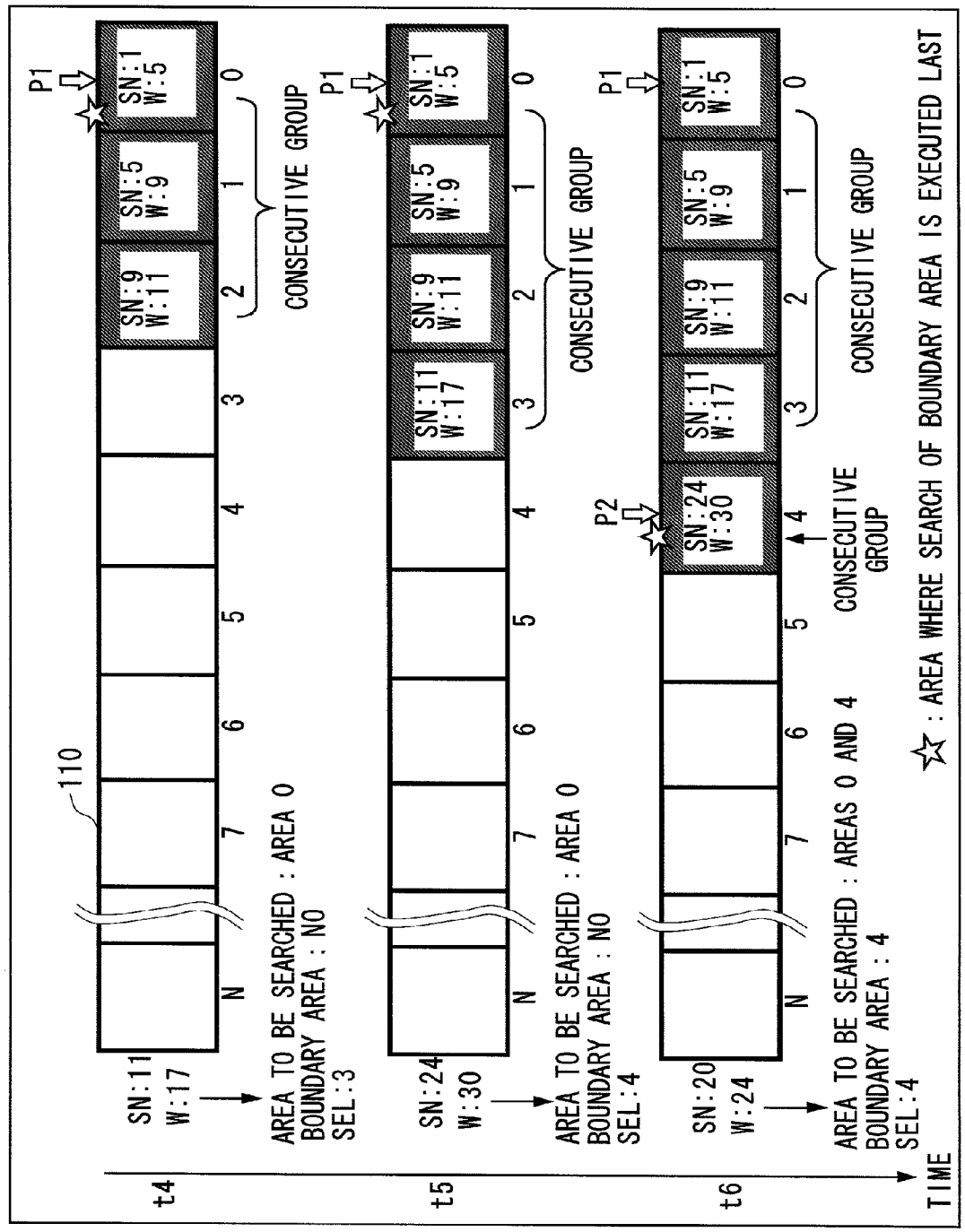
FIG. 17 is a diagram showing a specific example of processing of the alignment circuit shown in FIG. 1 when the third method is used (No. 2)

Referring to FIGS. 16 and 17, specific examples of processing by the alignment circuit 100 to which the third method is applied will be described.

Also in this example, eight packets whose sequence numbers are 1, 5, 9, 11, 17, 20, 24, and 30 are transmitted, and the sequence numbers in the order of arrival are "5, 1, 9, 11, 24, 20, 17, and 30".

As shown in FIG. 16, first, at timing t1, the packet whose sequence number SN is 5 is received, and its packet information PI is input to the alignment circuit 100. The control circuit 300 acquires the sequence number SN and the added value W of the packet. Since the area 0 of the alignment buffer 110 is an unwritten area, the control circuit 300 generates the selection signal SEL indicating the area 0 and stores the pointer (pointer P1) indicating the area 0 in the pointer storage circuit.

As a result, when the packet whose sequence number SN is 1 is arrived at timing t2, "5" and "9" are written in the area 0 of the alignment buffer 110 as the sequence number SN and the added value W included in the packet information PI. Further, the pointer P1 indicating the area 0 is stored in the pointer storage circuit.

At this time, since the area to be searched is only the area 0 indicated by the pointer P1 and the sequence number SN written in the area 0 is larger than 1 which is the sequence number SN of the target packet, the control circuit 300 determines that the area 0 is a boundary area to generate the selection signal SEL indicating the area 0. At this time, since 5 which is the sequence number SN written in the area 0 matches 5 which is the added value W of the target packet although the control circuit 300 shifts the pointer P1 as shown in the area 1, the control circuit 300 returns the pointer P1 to indicate the area 0.

As a result, when the packet whose sequence number SN is 9 is arrived at timing t3, "1" and "5" are written in the area 0, and "5" and "9" are written in the area 1 of the alignment buffer 110 as the sequence number SN and the added value W. Further, only the pointer P1 indicating the area 0 is stored in the pointer storage circuit.

Thus, only the area 0 is the area to be searched. The control circuit 300 determines that there is no boundary area as a result of the search of the boundary area, to generate the selection signal SEL indicating the next area 2 of the last written area (area 1). Further, since 9 which is the sequence number SN of the target packet matches 9 which is the added value W written in the area 1, the control circuit 300 performs neither change of the pointers that have already existed nor generation of new pointers.

As a result, as shown in FIG. 17, when the packet whose sequence number SN is 11 is arrived at timing t4, "1" and "5" are written in the area 0, "5" and "9" are written in the area 1, and "9" and "11" are written in the area 2 of the alignment buffer 110 as the sequence number SN and the added value W. Further, only the pointer P1 indicating the area 0 remains to be stored in the pointer storage circuit.

Thus, only the area 0 is the area to be searched. The control circuit 300 determines that there is no boundary area as a result of the search of the boundary area, to generate the selection signal SEL indicating the area 3. Further, since 11 which is the sequence number SN of the target packet matches 11 which is the added value W written in the area 2, the control circuit 300 performs neither change of the pointers that have already existed nor generation of new pointers.

As a result, when the packet whose sequence number SN is 24 is arrived at timing t5, "11" and "17" are further written in the area 3 of the alignment buffer 110 as the sequence number SN and the added value W, and only the pointer P1 indicating the area 0 remains to be stored in the pointer storage circuit.

Also in this case, only the area 0 is the area to be searched. The control circuit 300 determines that there is no boundary area as a result of the search of the boundary area, to generate the selection signal SEL indicating the area 4. Further, since 24 which is the sequence number SN of the target packet does not match 17 which is the added value W written in the area 3, the control circuit 300 generates a new pointer (pointer P2) indicating the area 4 to store the new pointer in the pointer storage circuit.

As a result, when the packet whose sequence number SN is 20 is arrived at timing t6, "24" and "30" are further written in the area 4 of the alignment buffer 110 as the sequence number SN and the added value W, and the pointer P1 indicating the area 0 and the pointer P2 indicating the area 4 are stored in the pointer storage circuit.

Thus, the area 0 and the area 4 are areas to be searched. The control circuit 300 determines that the area 4 is the boundary area as a result of the search of the boundary area to generate the selection signal SEL indicating the area 4. Further, although 20 which is the sequence number SN of the target packet does not match 17 which is the added value W written in the area 4, the sequence number written in the area 5 matches the added value W of the target packet. Accordingly, after shifting the pointer P2 to indicate the area 5 once, the control circuit 300 returns the pointer P2 to indicate the area 4.

Figure 18:
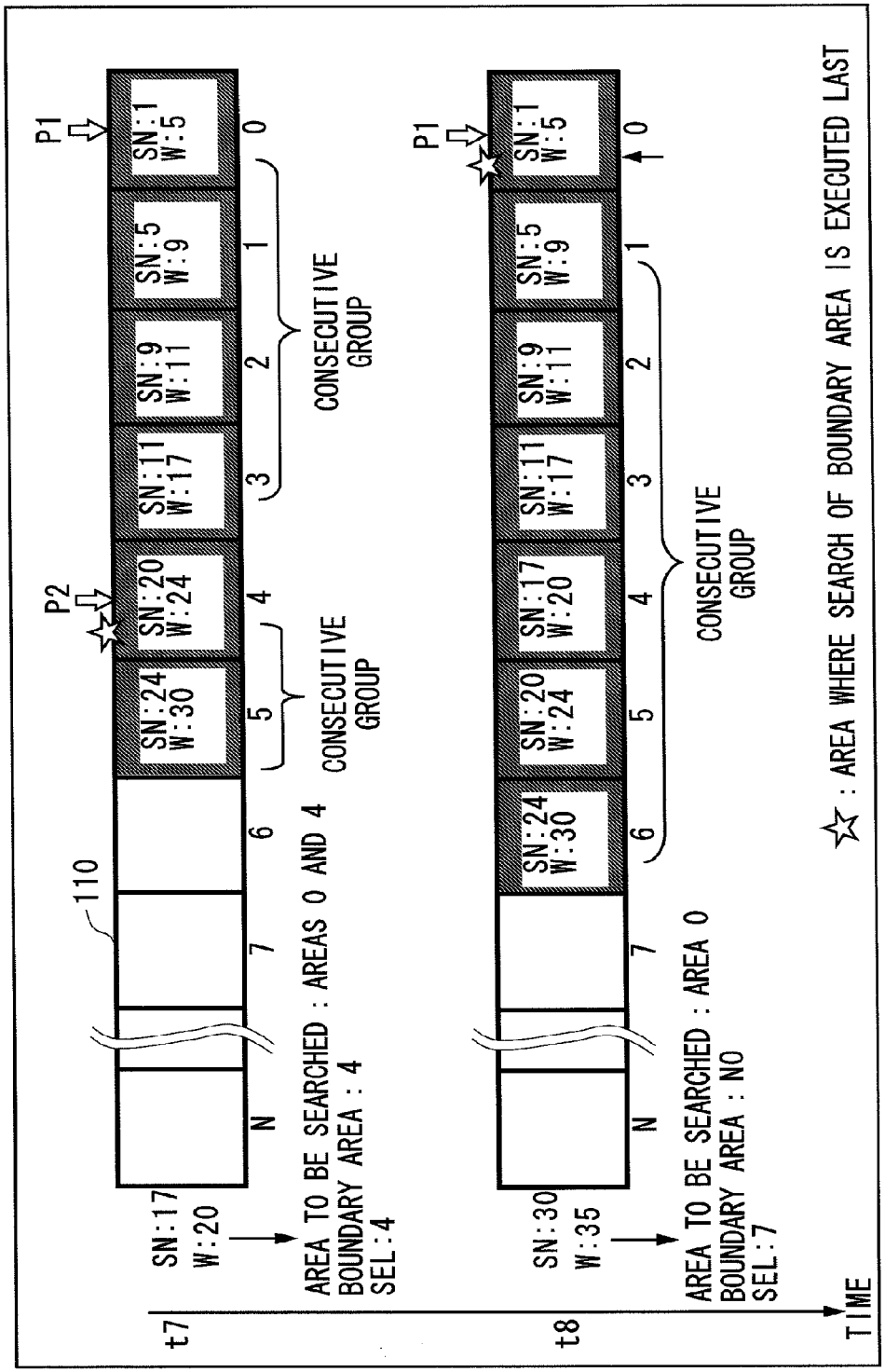
FIG. 18 is a diagram showing a specific example of processing of the alignment circuit shown in FIG. 1 when the third method is used (No. 3)

As a result, as shown in FIG. 18, at timing t7, when the packet whose sequence number SN is 17 is arrived, "24" and "30" written in the area 4 of the alignment buffer 110 as the sequence number SN and the added value W are shifted to the area 5, and "20", "24" are written in the area 4 as the sequence number SN and the added value W. Further, the pointer P1 and the pointer P2 respectively indicating the area 0 and the area 4 are stored in the pointer storage circuit.

At this time, the area 0 and the area 4 are areas to be searched. The control circuit 300 determines that the area 4 is the boundary area as a result of performing the search of the boundary area for the area 4 subsequent to the area 0, to generate the selection signal SEL indicating the area 4. Further, since 17 which is the sequence number SN of the target packet matches 17 which is the added value W written in the area 3 and the sequence number SN written in the area 4 further matches the added value W of the target packet, the control circuit 300 shifts the pointer P2 to indicate the area 5 and then deletes the pointer P2.

As a result, at timing t8, when the packet whose sequence number SN is 30 is arrived, information written in the area 4 and the area 5 of the alignment buffer 110 as the sequence number SN and the added value W are respectively shifted to the area 5 and the area 6, and "17" and "20" are written in the area 4 as the sequence number SN and the added value W. Further, only the pointer P1 indicating the area 0 is stored in the pointer storage circuit.

Thus, only the area 0 is the area to be searched. The control circuit 300 determines that there is no boundary area as a result of performing the search of the boundary area for the area 0, to generate the selection signal SEL indicating the next area 7 of the last written area. Further, since 30 which is the sequence number SN of the target packet matches 30 which is the added value W written in the area 6, the control circuit 300 performs neither change of the pointers that have already existed nor generation of new pointers.

As will be understood from the description above, according to the third method, the control circuit 300 further compares the added value W of the target packet with the sequence number SN written in the area indicated by the selection signal SEL in the pointer generation/change processing, and performs (or does not perform) shifting and generation of pointers according to the comparison results. Accordingly, it is possible to further narrow the area to be searched compared to the first method and the second method, which makes it possible to further improve the efficiency of processing of searching the boundary area.

The technical idea according to the third method may also be applied to the first method. In this case, it is required to change the consecutive bit CB included in the packet information PI that has already been written in the alignment buffer 110.

Based on the technical principle of the present invention described above, embodiments of the present invention will be described.

First Embodiment

Figure 19:
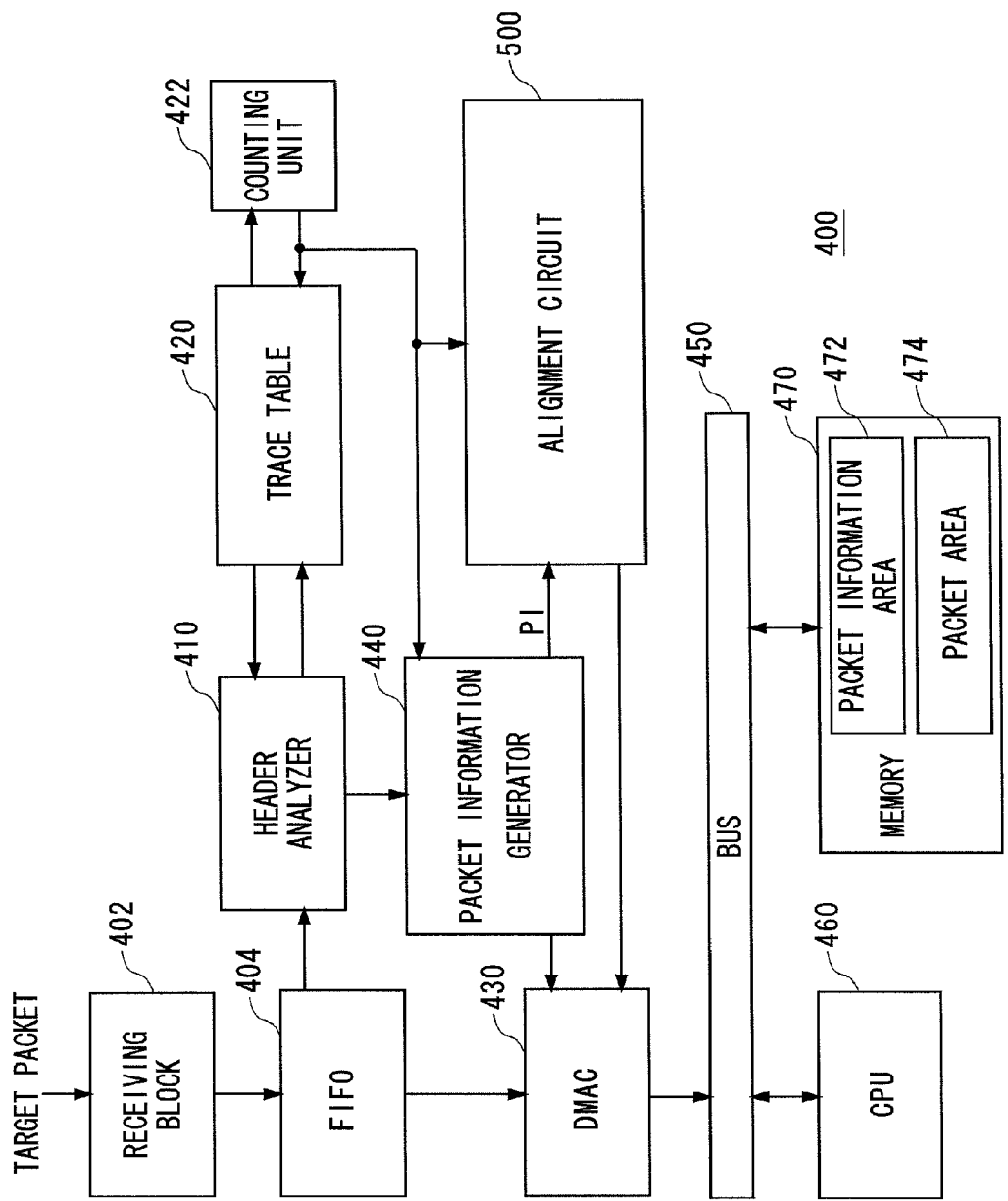
FIG. 19 is a diagram showing a receiving apparatus according to a first embodiment of the present invention.

FIG. 19 is a diagram showing a receiving apparatus 400 according to a first embodiment of the present invention. The receiving apparatus 400 includes a receiving block 402, a FIFO (First In First Out) 404, a header analyzer 410, a trace table 420, a counting unit 422, a DMAC 430, a packet information generator 440, a bus 450, a CPU 460, a memory 470, and an alignment circuit 500.

The receiving block 402 receives a packet (target packet) that is currently arrived to transfer the packet to the FIFO 404.

The FIFO 404 is a reception buffer. The FIFO 404 temporarily stores the target packet from the receiving block 402 to output the target packet to the header analyzer 410, the DMAC 430, and the packet information generator 440.

The header analyzer 410 sequentially performs extraction of headers for packets stored in the FIFO 404, and outputs the headers that are extracted to the packet information generator 440. Further, the header analyzer 410 checks whether there is a sequence number in each of the headers that are extracted, and outputs the result of the check to the packet information generator 440 as well. Further, when the sequence number is included in the header of the target packet, the header analyzer 410 determines whether connection information (described below) included in the header is stored in the trace table 420. When the connection information is not stored as a result of the determination, the header analyzer 410 outputs the connection information of the target packet to the trace table 420.

Figure 20:
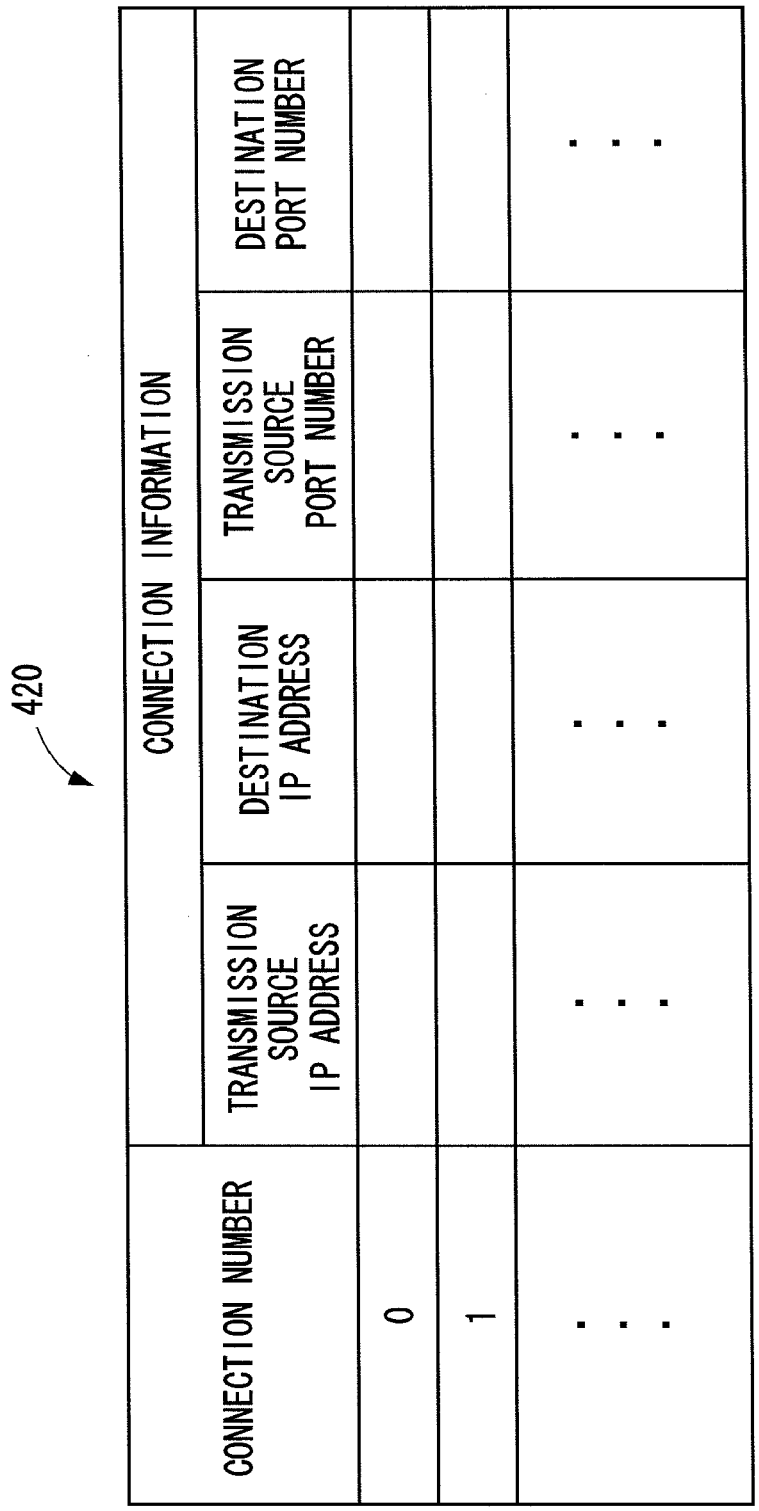
FIG. 20 is a diagram showing an example of connection information stored in a trace table in the receiving apparatus shown in FIG. 19.

The trace table 420 includes an area to store the connection information whose number corresponds to the number of corresponding connections, and manages the connection information for each connection. FIG. 20 shows an example of the connection information stored in the trace table 420. As shown in FIG. 20, a transmission source IP address, a destination IP address, a transmission source port number, and a destination port number are stored in the trace table 420 as the connection information for each connection.

When the trace table 420 does not store the connection information that matches the connection information transferred from the header analyzer 410, the trace table 420 stores the connection information as new connection information, and outputs a request to start a timer (not shown) corresponding to the connection to the counting unit 422.

Further, upon receiving a timer expiration signal from the counting unit 422, the trace table 420 deletes the connection information corresponding to the timer expiration signal from the trace table 420.

The counting unit 422 includes a timer and a received data number counter (not shown) for each of connection information managed by the trace table 420. Upon receiving a start request from the trace table 420, the counting unit 422 starts the count of the timer and the received data number counter. When the count value of the timer or the received data number counter reaches a predetermined threshold, the counting unit 422 outputs an expiration signal of the trace table 420 for the corresponding connection, and initializes the timer or the received data number counter.

The packet information generator 440 generates packet information PT including a sequence number SN from header information from the header analyzer 410.

Further, when there is no sequence number as a result of checking the header analyzer 410 indicating the presence or absence of the sequence number, the packet information generator 440 determines that the target packet is not a divided packet, and outputs the packet information PI that is generated to the DMAC 430. On the other hand, when there is a sequence number, the packet information generator 440 outputs the packet information PI that is generated to the alignment circuit 500.

The alignment circuits 500 whose number corresponds to the number of corresponding connections are installed. For the sake of clarity, only one alignment circuit 500 is illustrated and described.

The alignment circuit 500 receives the packet information PI of the corresponding connection from the packet information generator 440, rearranges the packet information PI in ascending order of sequence numbers, and temporarily stores the packet information PI.

Further, the timer expiration signal regarding the connection is also input to the alignment circuit 500 from the counting unit 422. Upon receiving this signal, the alignment circuit 500 outputs all the packet information PI that are temporarily stored to the DMAC 430, and initializes all the packet information PI that are being stored.

The alignment circuit 500 will be described later in detail.

The DMAC 430 is a DMA controller that performs DMA transfer, and transfers each packet from the FIFO 404 to the memory 470 by way of the bus 450. Further, the DMAC 430 also transfers the packet information PI having no sequence number generated by the packet information generator 440 to the memory 470 by way of the bus 450. Furthermore, the DMAC 430 also transfers the packet information PI from the alignment circuit 500 to the memory 470 by way of the bus 450.

The bus 450 relays the access to the memory 470 by the DMAC 430 and the CPU 460.

The CPU 460 is a central processing unit that performs the whole control of the receiving apparatus 400, and is connected to the memory 470 and the DMAC 430 via the bus 450. The data transmission/reception among the CPU 460, the DMAC 430, and the memory 470 are similar to those of the similar components in a typical information processing apparatus, and the detailed description will be omitted here.

The memory 470 is a RAM (Random Access Memory), for example, and is accessed by the DMAC 430 and the CPU 460 via the bus 450.

The memory 470 includes a packet information area 472 and a packet area 474. The packet information PI transferred from the DMAC 430 is stored in the packet area 474, and the packet area 474 stores packets transferred from the DMAC 430.

Figure 21:
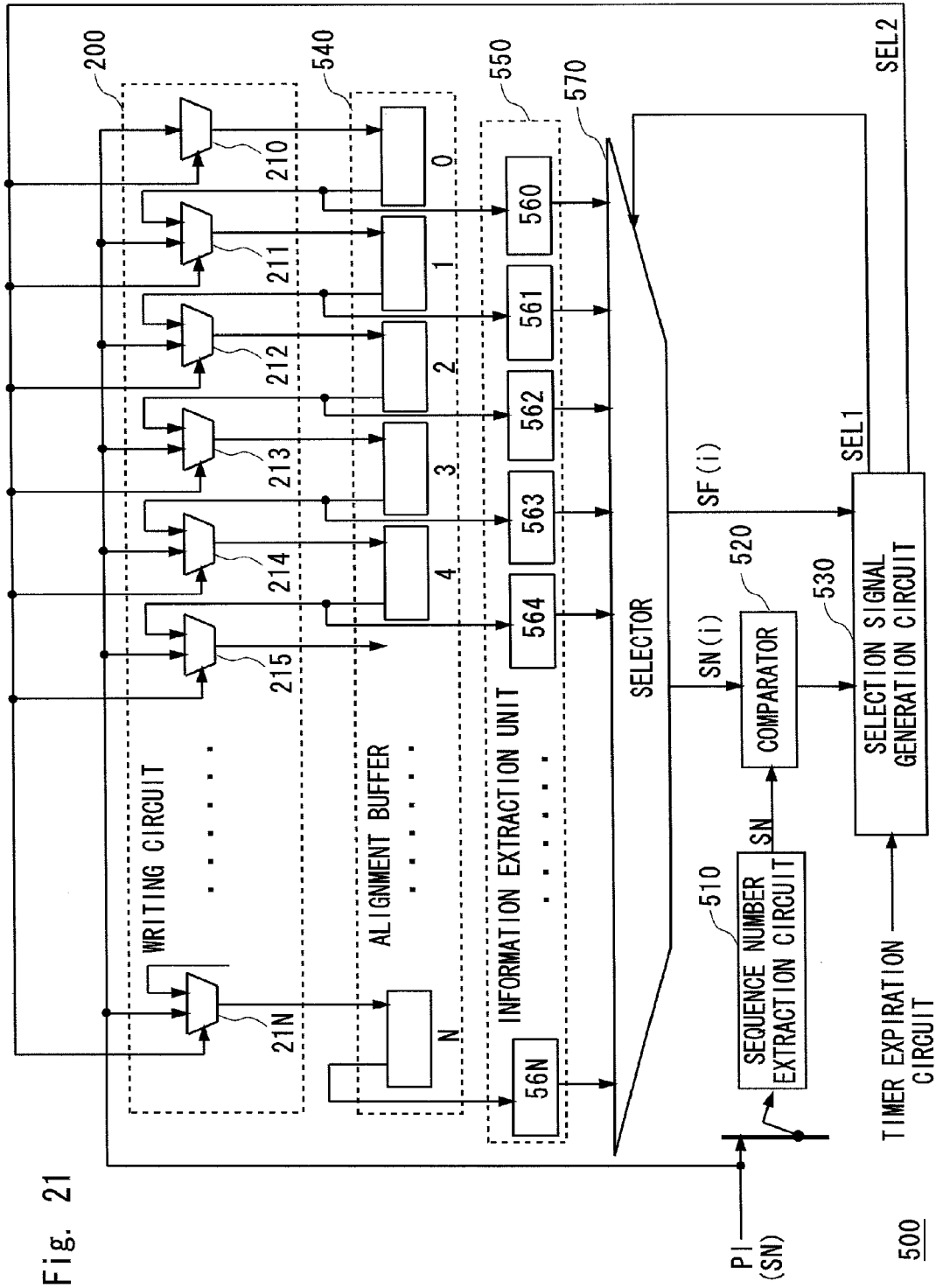
FIG. 21 is a diagram showing an alignment circuit in the receiving apparatus shown in FIG. 19.

With reference to FIG. 21, the alignment circuit 500 will be described.

As shown in FIG. 21, the alignment circuit 500 includes a sequence number extraction circuit 510, a comparator 520, a selection signal generation circuit 530, a writing circuit 200, an alignment buffer 540, an information extraction unit 550, and a selector 570. In the alignment circuit 500, other blocks except the writing circuit 200 and the alignment buffer 540 forms a control circuit.

The packet information PI from the packet information generator 440 is input to the sequence number extraction circuit 510 and the writing circuit 200.

The sequence number extraction circuit 510 extracts the sequence number SN of the target packet from the packet information PI to output the sequence number SN to the comparator 520.

The selection signal generation circuit 530 generates a first selection signal SEL1 to output the first selection signal SEL1 to the selector 570, and generates a second selection signal SEL2 to output the second selection signal SEL2 to the writing circuit 200. The first selection signal SEL1 and the second selection signal SEL2 are signals each indicating one of a plurality of buffers (buffer 0-buffer N) in the alignment buffer 540. Further, the second selection signal SEL2 is also able to indicate "initialization".

The writing circuit 200 is the writing circuit 200 (FIG. 5) explained in the description of the principle of the present invention, and writes the packet information PI to the alignment buffer 540 according to the second selection signal SEL2. Upon receiving the second selection signal SEL2 indicating the "initialization", the writing circuit 200 initializes all the data that are stored.

The alignment buffer 540 includes buffers corresponding to the respective selection circuits in the writing circuit 200, and each buffer is connected to the corresponding selection circuit and the corresponding information extraction circuit in the information extraction unit 550 described later.

The information extraction unit 550 includes information extraction circuits (information extraction circuit 560-information extraction circuit 56N) corresponding to the respective buffers in the alignment buffer 540. When the packet information PI is written in the corresponding buffer (including a case in which the packet information PI is updated), each of the information extraction circuits reads out the packet information PI written in the buffer, extracts the sequence number SN and a store flag SF that will be described later, and holds them until when the packet information PT is written in the buffer next time or initialized.

The selector 570 is connected to each of the information extraction circuits of the information extraction unit 550. Then, the selector 570 selects the storage flag SF and the sequence number SN extracted by the information extraction circuit corresponding to the buffer indicated by the first selection signal SEL1 from the selection signal generation circuit 530 to output the sequence number SN and the storage flag SF that are selected to the comparator 520 and the selection signal generation circuit 530, respectively.

The comparator 520 compares the magnitude relation of the sequence number SN from the selector 570 with the sequence number SN (sequence number of the target packet) from the sequence number extraction circuit 510, to output the result to the selection signal generation circuit 530.

The selection signal generation circuit 530 generates the first selection signal SEL1 indicating the next buffer of the buffer indicated by the previous first selection signal SEL1 to output the first selection signal SEL1 to the selector 570, or generates the second selection signal SEL2 to output the second selection signal SEL2 to the writing circuit 200 based on the result of comparison from the comparator 520.

Figure 22:
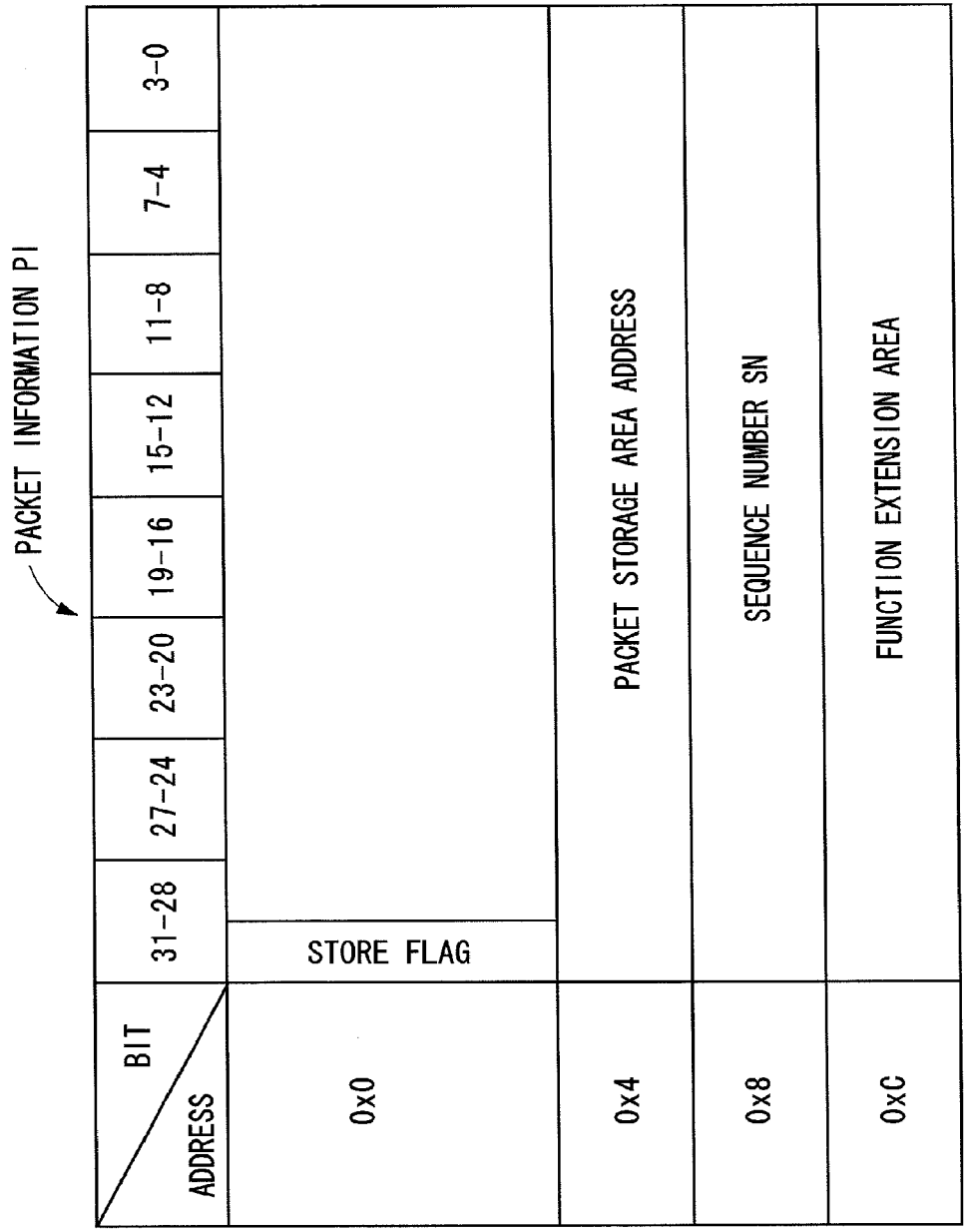
FIG. 22 is a diagram showing an example of a storage aspect of packet information in a memory and an alignment buffer of the receiving apparatus shown in FIG. 19.

FIG. 22 is a diagram showing an example of the storage aspect of the packet information PI in the packet information area 472 of the memory 470 and each buffer in the alignment buffer 540. As shown in FIG. 22, the store flag indicating the presence or absence of the packet information, the address of the packet corresponding to the packet information stored in the packet area 474, and the sequence number SN are stored as the packet information PI in the packet information area 472 and each buffer. A function extension field for future function extension is also included. Each buffer of the alignment buffer 540 stores only one piece of packet information PI, and the packet information area 472 stores a plurality of pieces of packet information PI.

Figure 23:
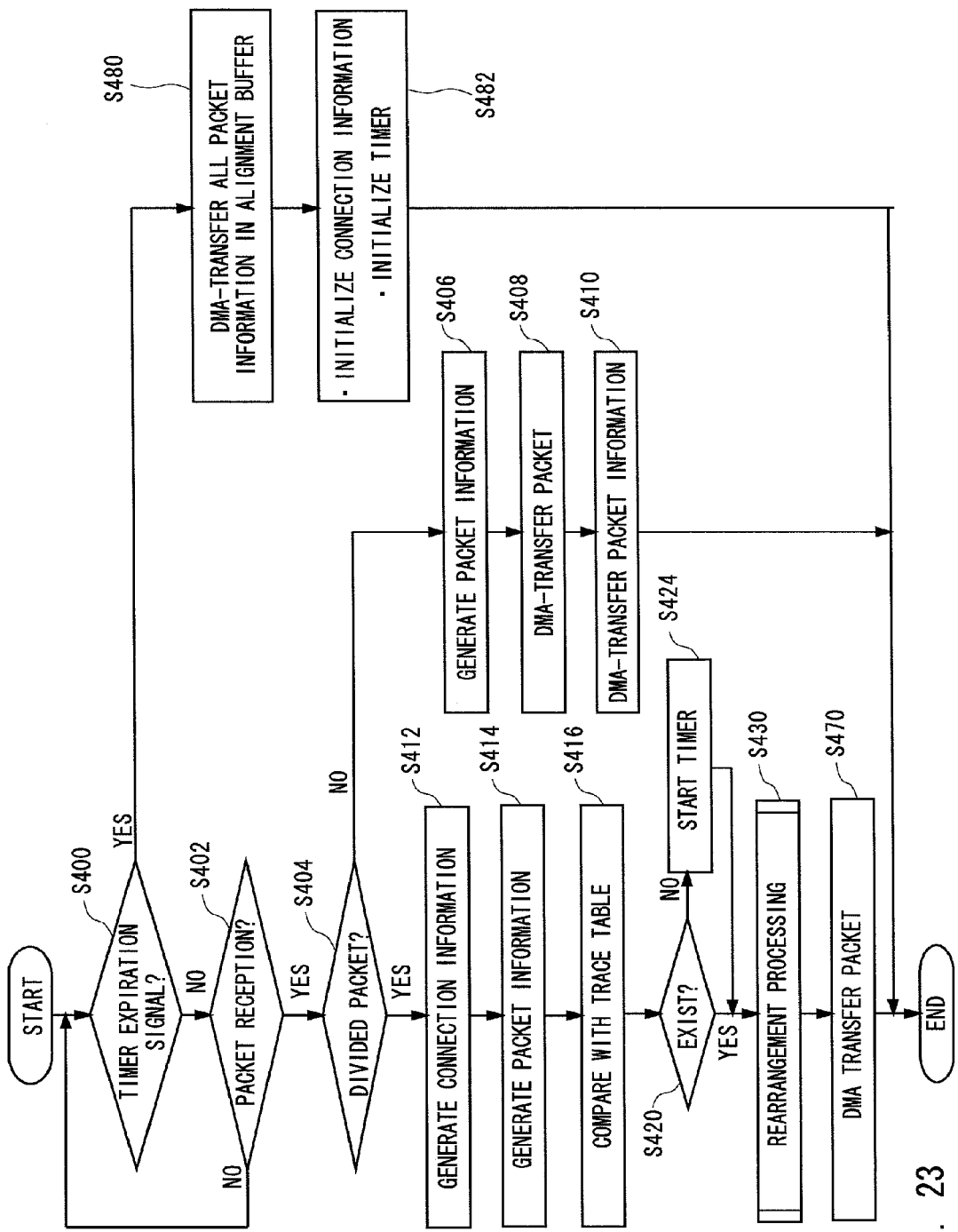
FIG. 23 is a flowchart showing a process flow of the receiving apparatus shown in FIG. 19.

FIG. 23 is a flowchart showing a process flow of the header analyzer 410, the trace table 420, the DMAC 430, the packet information generator 440, and the alignment circuit 500 in the receiving apparatus 400.

When the header analyzer 410 does not receive the timer expiration signal of the connection from the counting unit 422 and receives the target packet (S400: No, S402: Yes), the header analyzer 410 analyzes the header of the target packet from the FIFO 404, and determines whether the target packet is a divided packet based on the presence or absence of the sequence number SN (S404). The timer expiration signal is output from the counting unit 422 when the time during which the packet information PI remains in the alignment buffer 540 corresponding to the connection times out or the number of pieces of remaining data overflows.

The header analyzer 410 outputs the result of determination in Step S404 and the header to the packet information generator 440. When the target packet is not a divided packet (S404: No), the packet information generator 440 generates the packet information PI based on the header from the header analyzer 410 to output the packet information PI to the DMAC 430, and the DMAC 430 DMA-transfers the packet corresponding to the packet information PI to the packet area 474, and DMA-transfers the packet information PI to the packet information area 472 (S406, S408, and S410).

On the contrary, when the target packet is a divided packet (S404: Yes), the header analyzer 410 generates connection information including the transmission source IP address, the destination IP address, the transmission source port number, and the destination port number, and the packet information generator 440 generates the packet information PI to output the packet information PI to the alignment circuit 500 (S412, S414).

The header analyzer 410 compares the connection information generated in Step S412 with each connection information stored in the trace table 420 (S416).

If there is connection information of the target packet in the trace table 420 (S420: Yes), the header analyzer 410 ends processing for the target packet. Meanwhile, if there is no connection information of the target packet in the trace table 420 (S420: No), the header analyzer 410 outputs the connection information generated in step 412 to the trace table 420. In this way, the trace table 420 determines that the packet of the new connection has been received, and causes the counting unit 422 to start the timer corresponding to the connection (S424).

Upon receiving the packet information PI from the packet information generator 440, the alignment circuit 500 performs rearrangement processing (S430). Further, the DMAC 430 DMA-transfers the packet to the packet area 474 (S470).

When the timer expiration signal is output from the counting unit 422 (S400: Yes), the DMAC 430 DMA-transfers all the packet information PI in the alignment buffer 540 of the alignment circuit 500 to the packet information area 472 (S480). Further, the trace table 420 initializes the timer and the connection information corresponding to the connection (S482).

Figure 24:
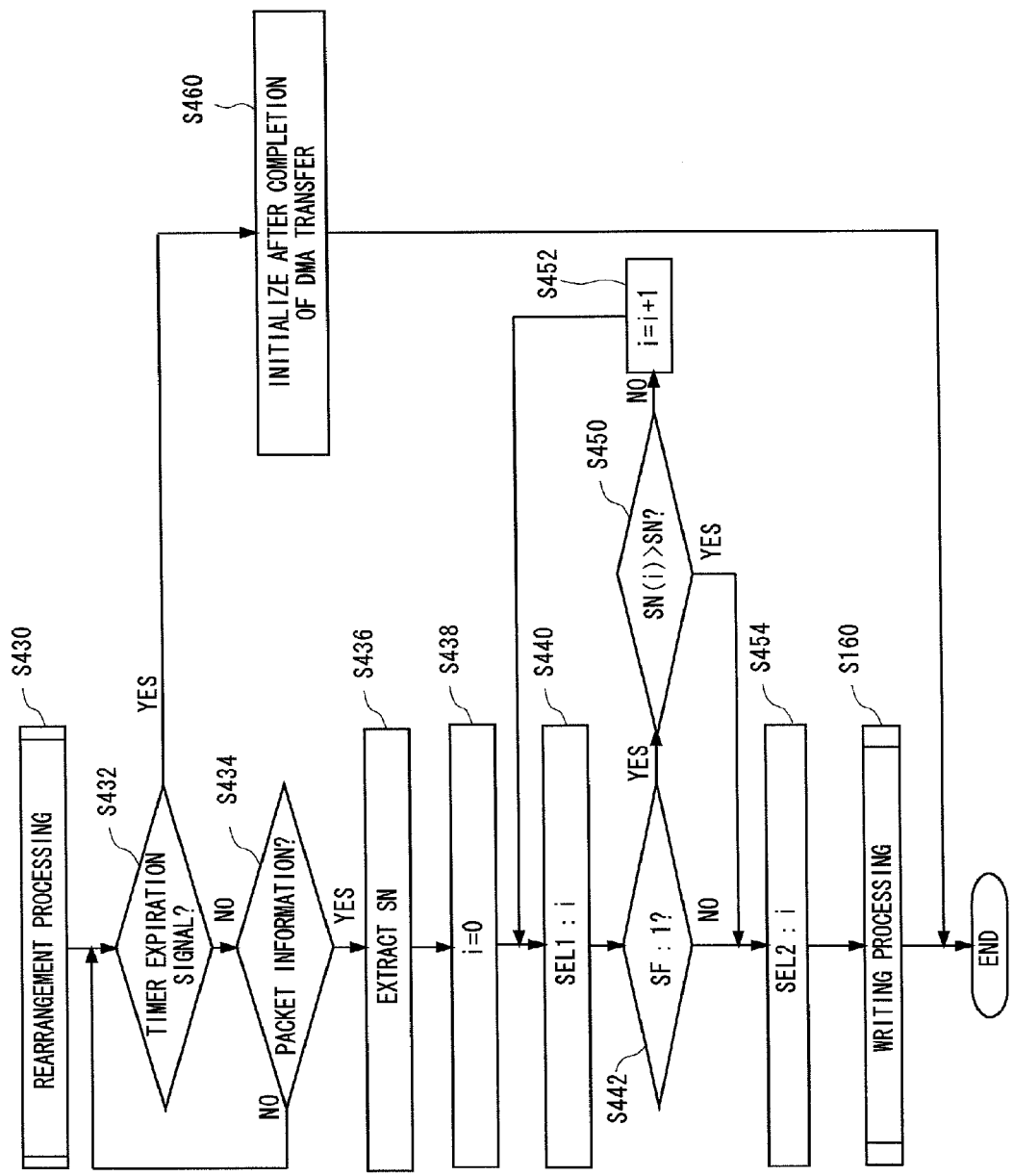
FIG. 24 is a flowchart showing a flow of writing processing in FIG. 23.

FIG. 24 is a flowchart showing rearrangement processing of Step S430 in FIG. 23. When the sequence number extraction circuit 510 does not receive the timer expiration signal and receives the packet information PI from the packet information generator 440 (S432: No, S434: Yes), the sequence number extraction circuit 510 generates the sequence number SN from the packet information PI to output the sequence number SN to the comparator 520 (S436), and the selection signal generation circuit 530 generates the first selection signal SEL1 indicating the buffer 0 to output the first selection signal SEL1 to the selector 570 (S438, S440). The selector 570 selects the sequence number SN(0) and the store flag SF(0) held in the information extraction circuit 560 corresponding to the buffer 0 in the information extraction unit 550 to output the sequence number SN(0) and the store flag SF (0) to the comparator 520 and the selection signal generation circuit 530, respectively.

When the store flag SF(0) is 0, i.e., the buffer 0 is an unwritten buffer (hereinafter also referred to as an "unwritten area") (S442: No), the selection signal generation circuit 530 generates the second selection signal SEL2 indicating the buffer 0 to output the second selection signal SEL2 to the writing circuit 200 (S454). Upon receiving the second selection signal SEL2, the writing circuit 200 performs writing processing of Step S160. The writing processing of Step S160 is as shown in FIG. 4. The packet information PI of the target packet is written in the buffer 0.

On the other hand, in Step S442, when the store flag SF(0) is 1, i.e., the buffer 0 is a written buffer (hereinafter also referred to as a "written area") (S442: Yes), the selection signal generation circuit 530 starts searching the buffer which is a boundary (boundary area), and checks the result of comparing the sequence number SN(0) stored in the buffer 0 with the sequence number SN of the target packet obtained from the sequence number extraction circuit 510 by the comparator 520 (S450).

When the sequence number SN(0) written in the buffer 0 is larger than the sequence number SN of the target packet, the selection signal generation circuit 530 determines that the buffer 0 is a boundary area. Then, the selection signal generation circuit 530 generates the second selection signal SEL2 indicating the buffer 0 to output the second selection signal SEL2 to the writing circuit 200 (S450: Yes, S454). In accordance therewith, the writing processing of the packet information by the writing circuit 200 is performed. At this time, the data stored in each buffer from the buffer 0 is shifted to the next buffer, and the packet information PI of the target packet is written in the buffer 0.

Further, each of the information extraction circuits of the information extraction unit 550 reads out the packet information PI in the corresponding buffer to extract the sequence number SN and the store flag SF, and updates the data that is held therein.

In Step S450, when the sequence number SN(0) written in the buffer 0 is smaller than the sequence number SN of the target packet, the selection signal generation circuit 530 determines that the buffer 0 is not a boundary area. Then, the selection signal generation circuit 530 generates the first selection signal SEL1 indicating the next buffer (buffer 1) to output the first selection signal SEL1 to the selector 570 (S450: No, S452, S440). Then, the search of the boundary area for the area 1 is performed (S442-).

These processing are repeated until when the boundary area is detected and the search for the last written area is performed, and the packet information PI is written in the unwritten area in the alignment buffer 540 or in any one of the written areas. When the packet information PI is written in the unwritten area, the unwritten area is the buffer in the head of the alignment buffer 540 or the next area of the last written area. Further, when the packet information PI is written in the written area, the sequence number SN stored in the written area is definitely larger than the sequence number SN of the target packet. Further, the sequence number SN smaller than the sequence number SN of the target packet is definitely written in the area just before the area to which the packet information PI of the target packet is written.

Upon receiving the timer expiration signal (S432: Yes), the selection signal generation circuit 530 outputs the second selection signal SEL2 indicating the initialization of each buffer in the alignment buffer 540 to the writing circuit 200 after completion of the DMA transfer of all the packet information PI written in the alignment buffer 540. Accordingly, each buffer in the alignment buffer 540 and each information extraction circuit in the information extraction unit 550 are initialized (S460).

The alignment circuit 100 according to this embodiment is a specified example of the principle of the present invention, and is able to achieve the effects described in the description of the principle of the present invention.

Second Embodiment

Figure 25:
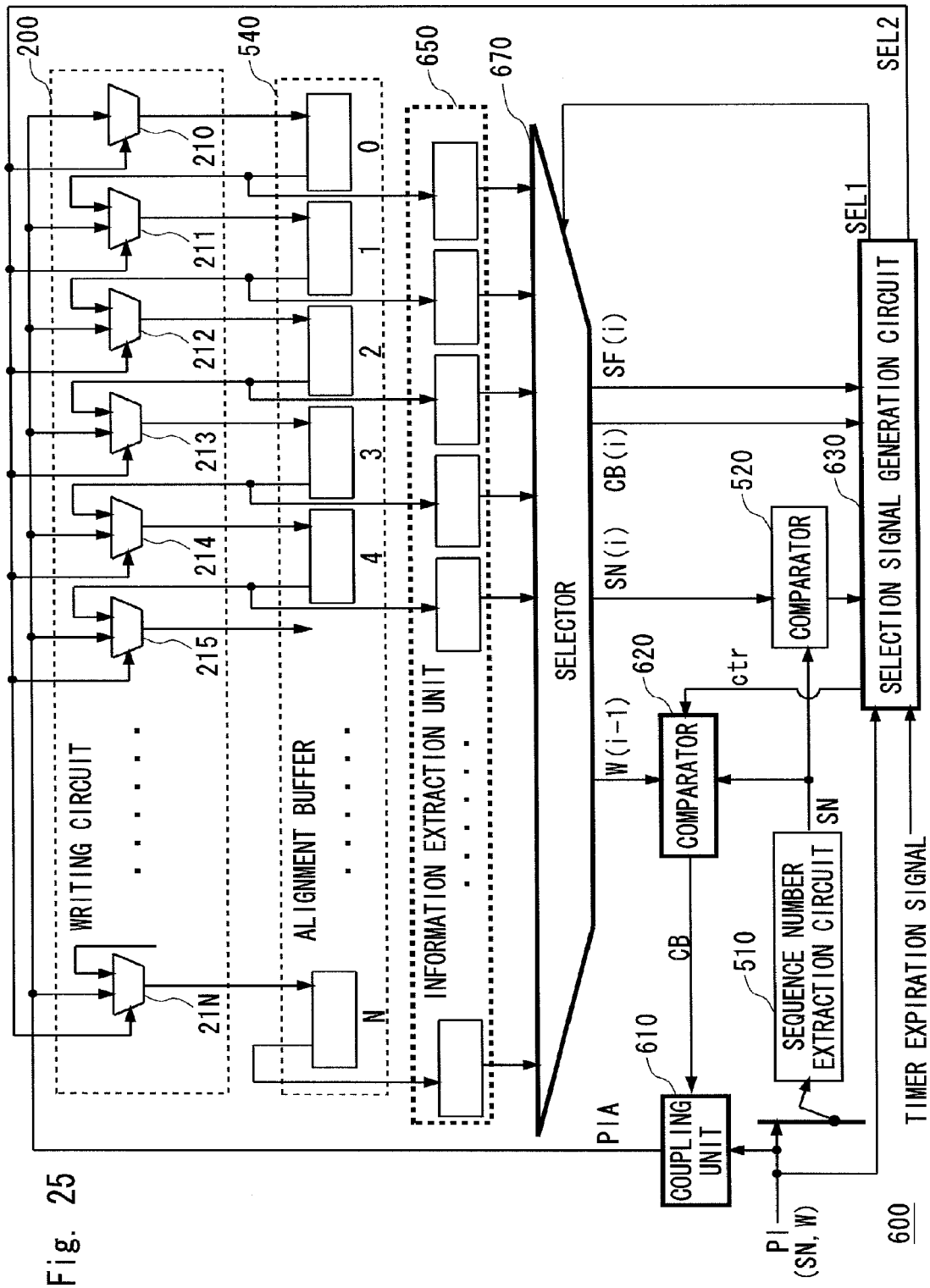
FIG. 25 is a diagram showing an alignment circuit in a receiving apparatus according to a second embodiment of the present invention.

A second embodiment of the present invention is also a receiving apparatus. This receiving apparatus is similar to the receiving apparatus 400 shown in FIG. 19 except that the packet information PI generated by the packet information generator 440 includes an added value W (sequence number of the packet that is transmitted next) and an alignment circuit 600 shown in FIG. 25 is provided in place of the alignment circuit 500 shown in FIG. 21. Thus, only the alignment circuit 600 will be described. In the alignment circuit 600, the circuits that perform the same functions as the circuits in the alignment circuit 500 are denoted by the same reference symbols in FIG. 21, and description of these circuits will be omitted.

In the alignment circuit 600, the first method based on the consecutive bit CB for efficiently achieving the search of the boundary area is applied. As shown in FIG. 25, the alignment circuit 600 is similar to the alignment circuit 500 except that a selection signal generation circuit 630, an information extraction unit 650, and a selector 670 are different from the selection signal generation circuit 530, the information extraction unit 550, and the selector 570 in the alignment circuit 500, respectively, and a coupling unit 610 and a comparator 620 are further provided.

The coupling unit 610 couples the packet information P1 from the packet information generator 440 and the consecutive bit CB from the comparator 620 to output the resulting packet information PIA to the writing circuit 200. Accordingly, in the second embodiment, the storage aspects of the packet information in the alignment buffer 540 and the packet information area 472 of the memory 470 are as shown in FIG. 26.

As shown in FIG. 26, the packet information PIA further includes the consecutive bit CB and the added value W in addition to the store flag and the sequence number SN. Note that the added value W is added to the packet information PI by the packet information generator 440, as described above.

Referring back to FIG. 25, description will be made.

In the information extraction unit 650, each of the information extraction circuits further extracts the added value W and the consecutive bit CB from the packet information PIA written in the corresponding buffer in addition to the sequence number SN and the store flag SF. Other configurations are similar to those of the information extraction unit 550.

The selector 670 outputs the store flag SF and the sequence number SN extracted by the information extraction circuit corresponding to the buffer indicated by the first selection signal SEL1 to the comparator 520 and the selection signal generation circuit 630, respectively. At the same time, the selector 670 further outputs the consecutive bit CB extracted by the information extraction circuit corresponding to the buffer indicated by the first selection signal SEL1 to the selection signal generation circuit 630, and outputs the added value W extracted by the information extraction circuit corresponding to the buffer just before the buffer indicated by the first selection signal SEL1 to the comparator 620.

The selection signal generation circuit 630 executes searching of a boundary area only when the consecutive bit CB from the selector 670 is 0, and skips searching of the area when the consecutive bit CB is 1. Further, when outputting the second selection signal SEL2, the selection signal generation circuit 630 outputs a comparison control signal ctr indicating the comparison instruction to the comparator 620 when the buffer indicated by the second selection signal SEL2 is other than the buffer (buffer 0) of the head of the alignment buffer 540. Other configurations are similar to those of the selection signal generation circuit 530.

Upon receiving the comparison control signal ctr from the selection signal generation circuit 630, the comparator 620 checks whether the sequence number SN of the target packet matches the added value W from the selector 670, and outputs 1 as the consecutive bit CB only when they are matched. At this time, the added value W from the selector 670 is the added value W stored in the buffer just before the buffer to which the target packet is written.

Upon receiving the consecutive bit CB from the comparator 620, the coupling unit 610 couples the consecutive bit CB to the packet information PI to generate the packet information PIA. When there is no output of the consecutive bit CB from the comparator 620, i.e., when the consecutive bit CB is 0, the coupling unit 610 determines that the consecutive bit CB is 0 and couples the consecutive bit CB to the packet information PI.

The first method for improving the efficiency of the boundary area based on the consecutive bit CB has been described above in detail, and thus further detailed description will be omitted here.

As a matter of course, the alignment circuit 600 in the receiving apparatus according to the second embodiment is a specified example of the first method. Accordingly, it is possible to obtain the same effects as in the first method.

Third Embodiment

Figure 27:
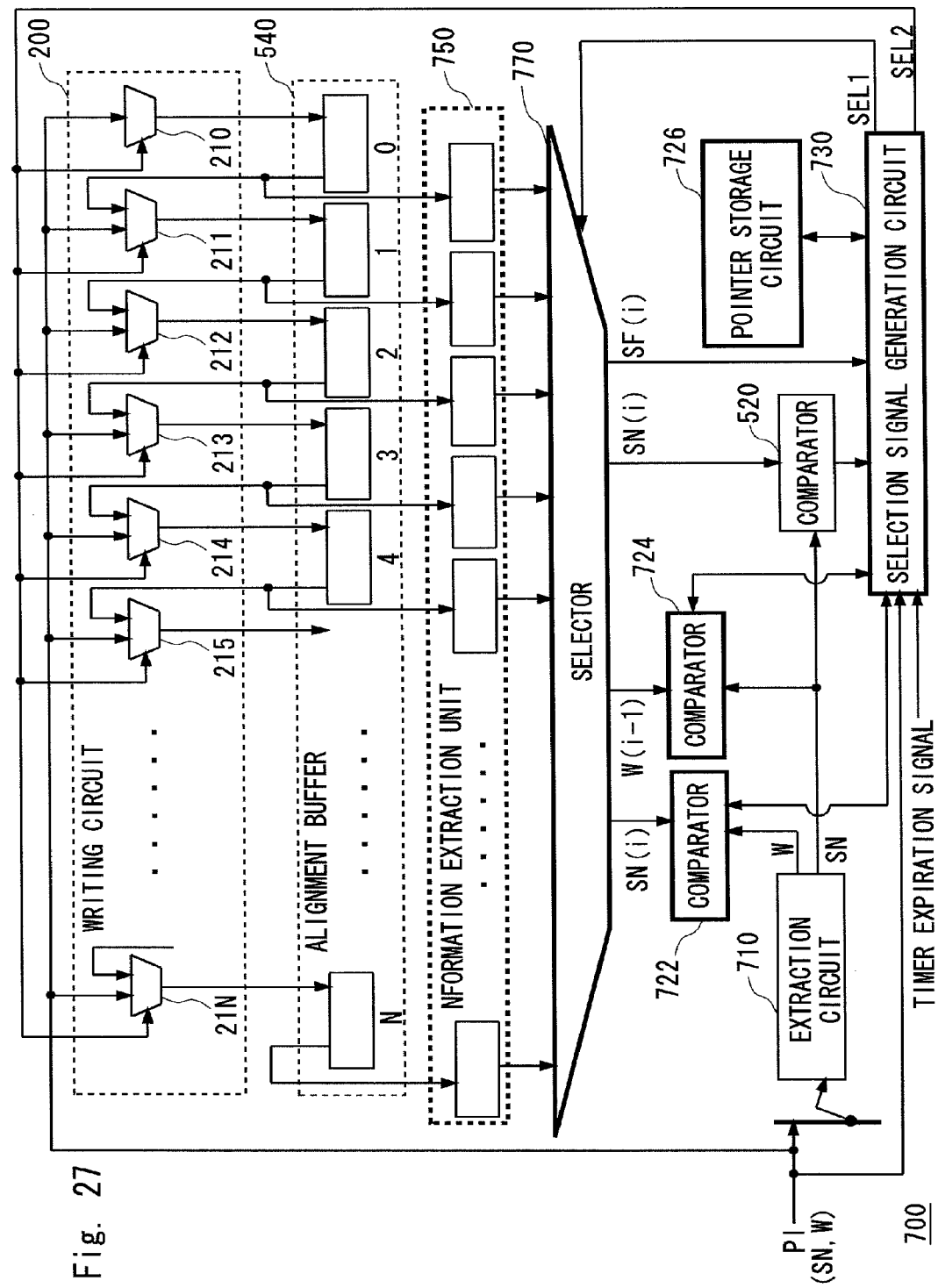
FIG. 27 is a diagram showing an alignment circuit in a receiving apparatus according to a third embodiment of the present invention.

A third embodiment of the present invention is a receiving apparatus as well. This receiving apparatus is similar to the receiving apparatus 400 shown in FIG. 19 except that the packet information PI generated by the packet information generator 440 includes an added value W (sequence number of the packet that is transmitted next) and an alignment circuit 700 shown in FIG. 27 is provided in place of the alignment circuit 500 shown in FIG. 21. Thus, only the alignment circuit 700 will be described. In the alignment circuit 700, the circuits that perform the same functions as the circuits in the alignment circuit 500 are denoted by the same reference symbols in FIG. 21, and description of these circuits will be omitted.

In the alignment circuit 700, the third method based on a pointer in order to effectively perform the search of the boundary area is applied. As shown in FIG. 27, the alignment circuit 700 is the same to the alignment circuit 500 except that a comparator 722, a comparator 724, and a pointer storage circuit 726 are further provided, and an extraction circuit 710, a selection signal generation circuit 730, an information extraction unit 750, and a selector 770 are different from the selection signal generation circuit 530, the information extraction unit 550, and the selector 570 in the alignment circuit 500, respectively.

Figure 28:
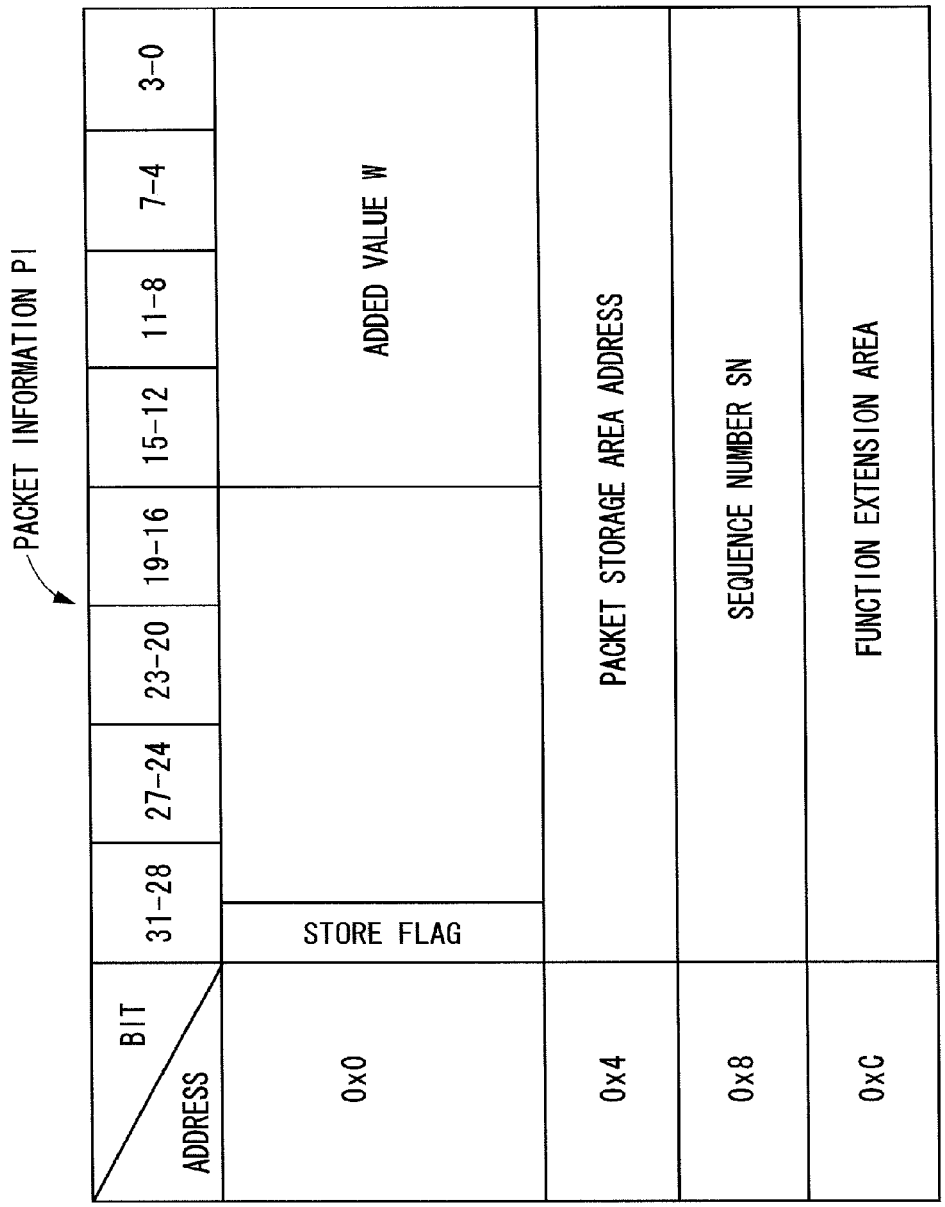
FIG. 28 is a diagram showing an example of a storage aspect of packet information in a memory and an alignment buffer of the receiving apparatus according to the third embodiment of the present invention.
Figure 29:
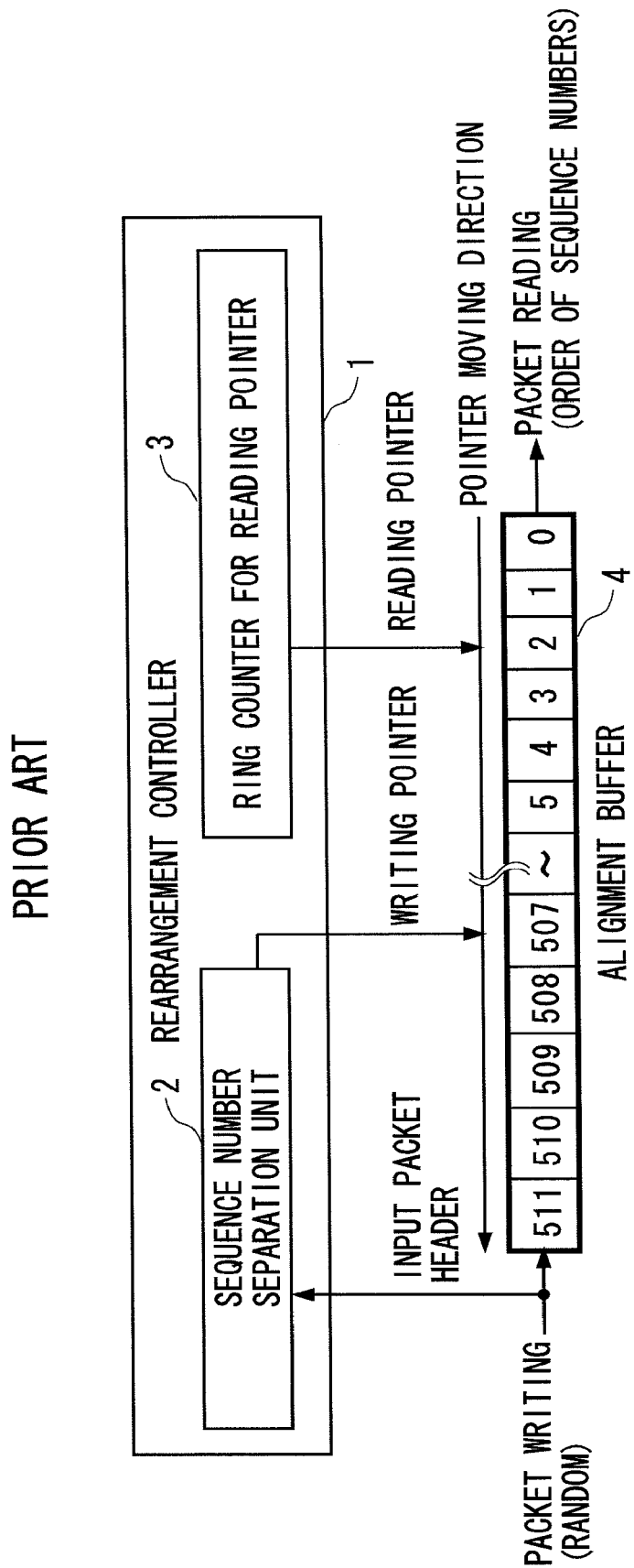
FIG. 29 is a diagram corresponding to FIG. 9 of Japanese Unexamined Patent Application Publication No. 2001-111608.
Figure 30:
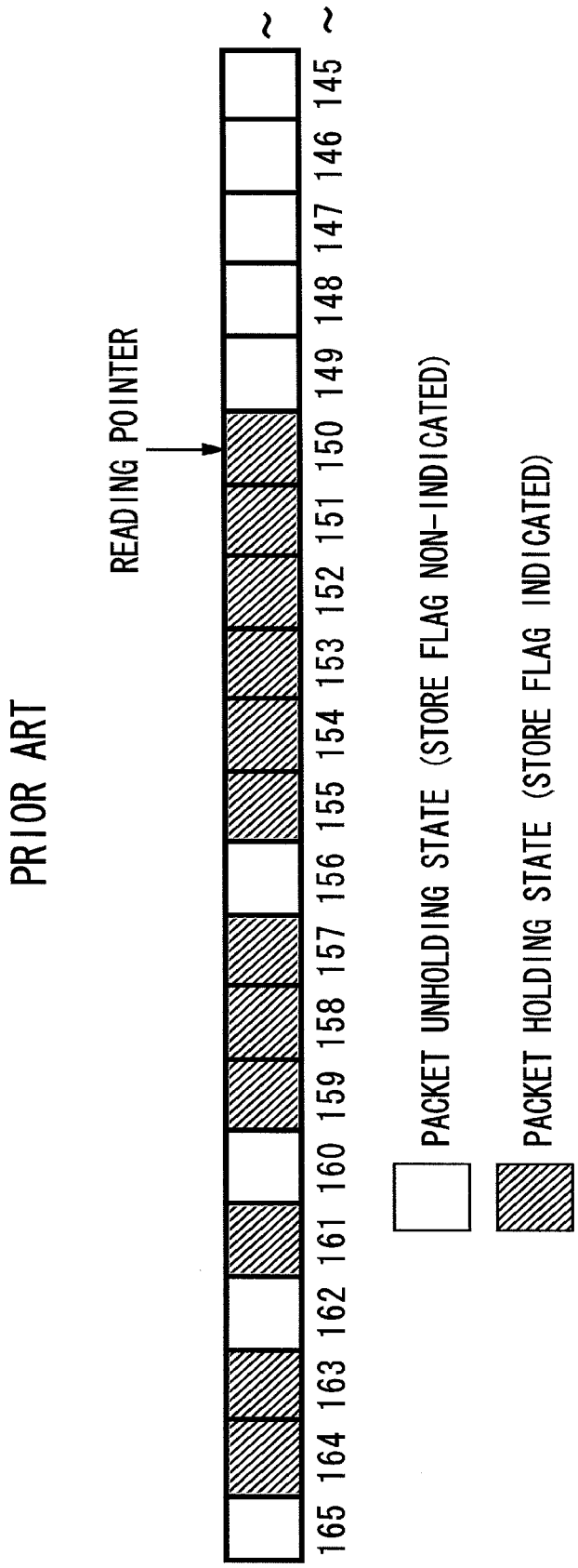
FIG. 30 is a diagram corresponding to FIG. 10 of Japanese Unexamined Patent Application Publication No. 2001-111608.
Figure 31:
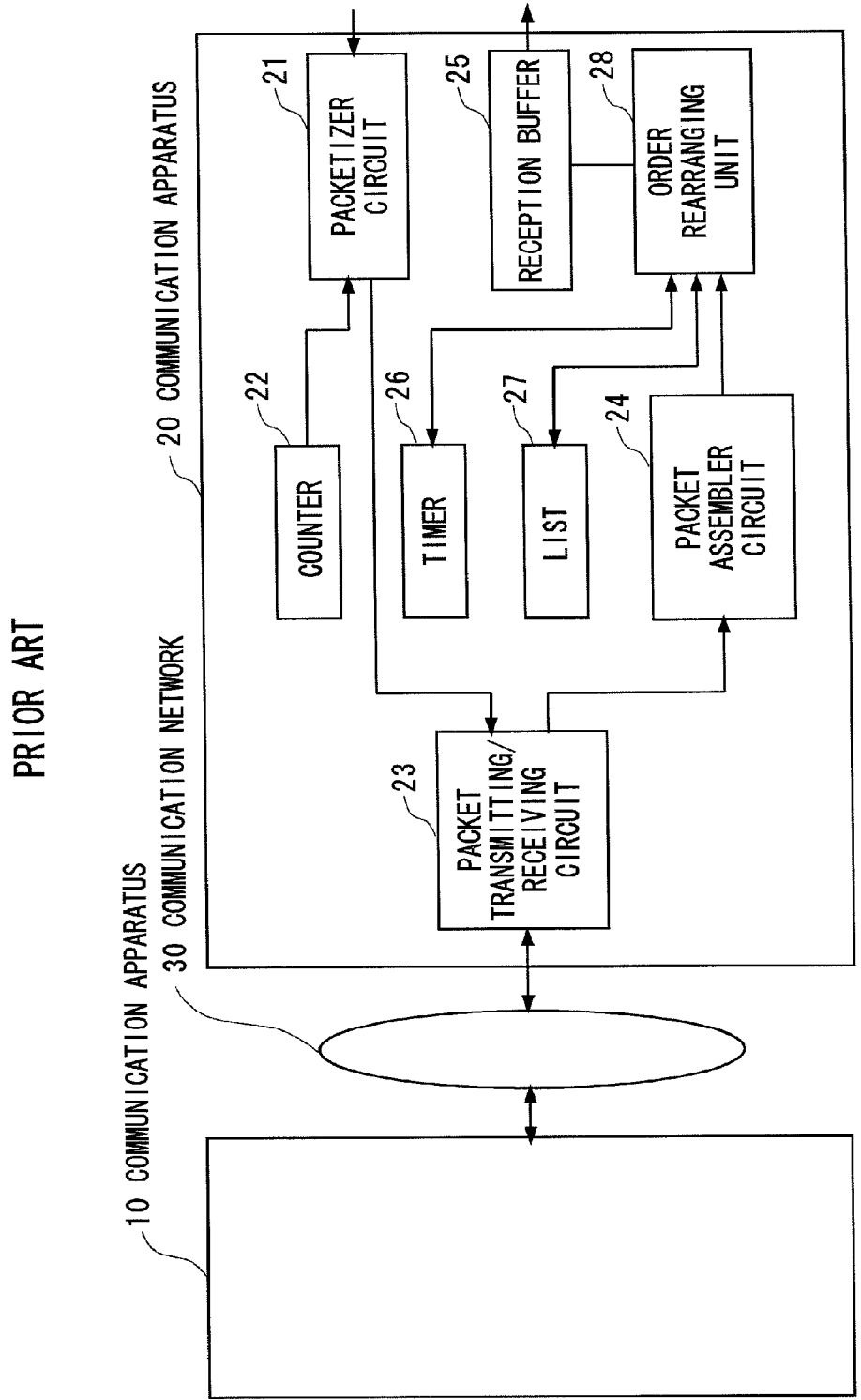
FIG. 31 is a diagram corresponding to FIG. 1 of Japanese Unexamined Patent Application Publication No. 2001-189755.
Figure 32:
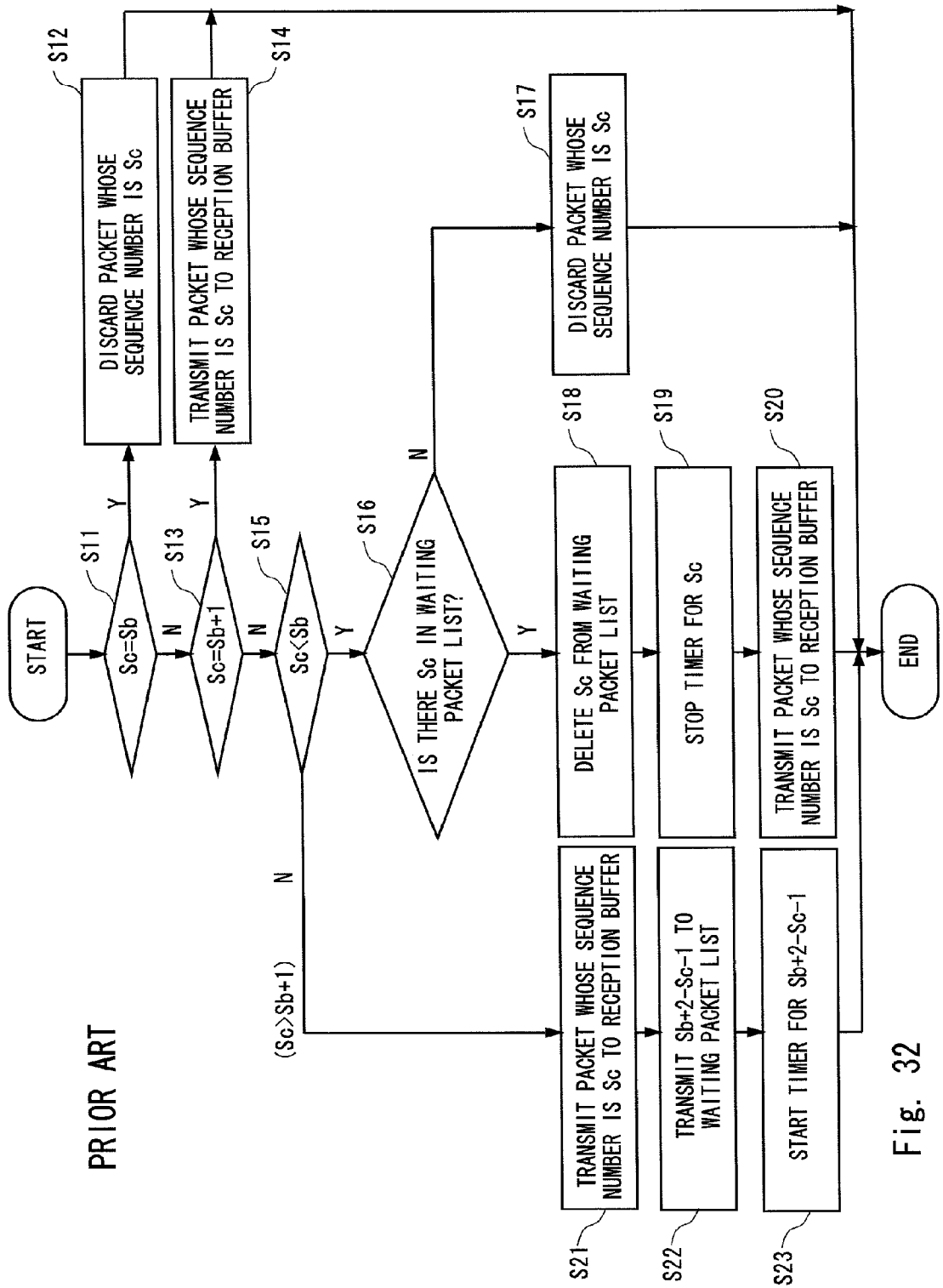
FIG. 32 is a diagram corresponding to FIG. 2 of Japanese Unexamined Patent Application Publication No. 2001-189755.
Figure 33:
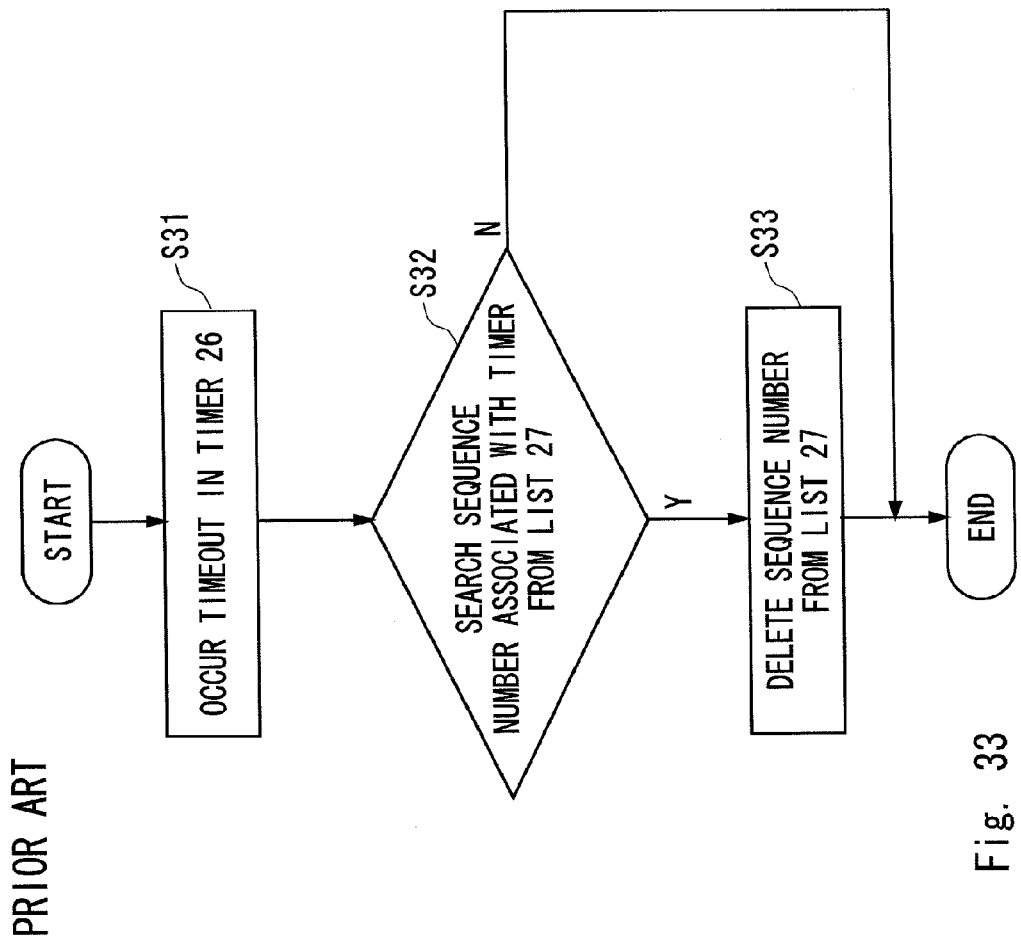
FIG. 33 is a diagram corresponding to FIG. 3 of Japanese Unexamined Patent Application Publication No. 2001-189755.
Figure 34:
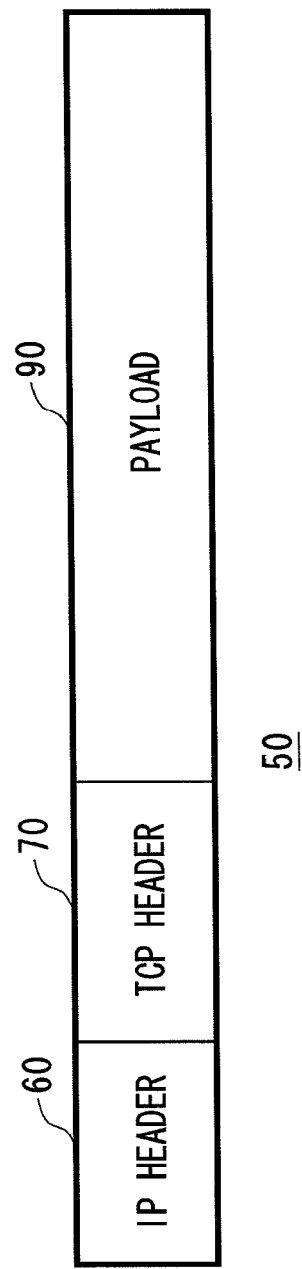
FIG. 34 is a diagram showing a format of a TCP/IP packet.

FIG. 28 shows an example of the storage aspect of the packet information in the packet information area 472 of the memory 470 and the alignment buffer 540 according to the third embodiment. As shown in FIG. 28, the added value W is included in the packet information PI in addition to the store flag and the sequence number SN. The added value W is, as described above, added to the packet information PI by the packet information generator 440.

Referring back to FIG. 27, description will be continued.

The extraction circuit 710 extracts the sequence number SN from the packet information PI from the packet information generator 440 to output the sequence number SN to the comparator 520 and the comparator 724. Further, the extraction circuit 710 extracts the added value W from the packet information PI to output the added value W to the comparator 722.

In the information extraction unit 750, each of the information extraction circuits further extracts the added value W from the packet information PI written in the corresponding buffer in addition to the sequence number SN and the store flag SF. Other configurations are similar to those of the information extraction unit 550.

The selector 770 outputs the sequence number SN and the store flag SF extracted by the information extraction circuit corresponding to the buffer indicated by the first selection signal SEL1 to the comparator 520 and the selection signal generation circuit 730, respectively, and further outputs the added value W extracted by the information extraction circuit corresponding to the buffer which is just before the buffer indicated by the first selection signal SEL1 to the comparator 724. Further, the selector 770 outputs the sequence number SN output to the comparator 520 to the comparator 722 as well.

The selection signal generation circuit 730 sets only the buffers indicated by the respective pointers stored in the pointer storage circuit 726 to the areas to be searched when the search of the boundary area is performed, and skips the search of the buffers that are not indicated by the pointers. Further, when outputting the second selection signal SEL2, the selection signal generation circuit 730 outputs a comparison control signal indicating a comparison instruction to the comparator 724 when the buffer indicated by the second selection signal SEL2 is other than the buffer (buffer 0) of the head of the alignment buffer 540, and outputs a comparison control signal indicating a comparison instruction to the comparator 724 when the buffer indicated by the second selection signal SEL2 is a written area. Further, the selection signal generation circuit 730 performs pointer generation/change processing (e.g., generating pointers to store them in the pointer storage circuit 726, shifting the pointers that have already existed) according to the comparison results in the comparator 722 and the comparator 724. Other configurations are similar to those of the selection signal generation circuit 530.

Upon receiving the comparison control signal from the selection signal generation circuit 730, the comparator 724 checks whether the sequence number SN of the target packet matches the added value W from the selector 770, and sends back the comparison result to the selection signal generation circuit 730. In this case, the added value W from the selector 770 is the added value W stored in the buffer just before the buffer to which the target packet is written. In summary, the comparison result of the comparator 724 indicates whether the packet information PI written in the buffer just before the buffer to which the packet information PI of the target packet is written is the packet information PI of the packet transmitted just before the target packet.

Upon receiving the comparison control signal from the selection signal generation circuit 730, the comparator 722 compares the sequence number SN from the selector 770 with the added value W from the extraction circuit 710, to send back the comparison result to the selection signal generation circuit 730. In this case, the added value W from the extraction circuit 710 corresponds to the sequence number of the packet transmitted next to the target packet, and the sequence number SN from the selector 770 is the one that is written in the area indicated by the second selection signal SEL2 and is stored in the next buffer of the buffer to which the packet information PI is written after the packet information PI of the target packet is written.

In short, the comparison result in the comparator 722 indicates whether the packet information PI stored in the next buffer of this buffer after the packet information PI of the target packet is written is the packet information PI of the packet that is transmitted just after the target packet.

The pointer generation/change processing according to the comparison results in the comparator 722 and the comparator 724 has been described in detail in the third method, and thus further detailed description will be omitted here.

As a matter of course, the alignment circuit 700 in the receiving apparatus according to the third embodiment is a specified example of the third method. Accordingly, it is possible to obtain the same effects as in the third method.

Since the second method based on a pointer can be easily specified from the description above, specified examples of the second method will be omitted here.

While the invention has been described in terms of several embodiments, those skilled in the art will recognize that the invention can be practiced with various modifications within the spirit and scope of the appended claims and the invention is not limited to the examples described above.

For example, while the added value W is directly added to the packet information PI in the second embodiment and the third embodiment, a payload length or a packet length may be used instead as long as the added value W can be calculated.

The receiving apparatus in each embodiment described above performs rearrangement of packet information by the alignment circuit 500 and DMA-transfers the packet information separately from the packet. However, for example, the alignment buffer 540 in the alignment circuit 500 may be used as a reception buffer to rearrange the order of storage of packets themselves in the order of transmission, and each packet may be DMA-transferred to the memory 470 after the rearrangement.

Further, the scope of the claims is not limited by the embodiments described above.

Furthermore, it is noted that, Applicant's intent is to encompass equivalents of all claim elements, even if amended later during prosecution.

Furthermore, the embodiments described above can be combined as desirable by one of ordinary skill in the art.

What is claimed is:

1. An alignment circuit for a plurality of packet information comprising:
    a buffer that includes N (N is an integer of two or more) areas; and
    a writing circuit that writes the plurality of packet information into the areas of the buffer in a sequence number order,
    wherein each of the plurality of packet information has a sequence number and an acknowledgment number indicating the sequence number of a successive packet information,
    wherein when the alignment circuit receives a packet information of which the sequence number is lower than the sequence number of the packet information written in an M-th (M<N) area of the buffer and is the same number as the acknowledgement number of the packet information written in an (M−1)-th area of the buffer, the writing circuit inserts the received packet information in the M-th area of the buffer and writes consecutive group information in the buffer,
    wherein the consecutive group information indicates that the packet information in the (M−1)-th area and the packet information in the M-th area are consecutive packet information.

2. The alignment circuit according to claim 1, wherein the writing circuit inserts the received packet information in an area not having the consecutive group information.

3. The alignment circuit according to claim 1, wherein the writing circuit inserts the consecutive group information in the M-th area of the buffer.

4. The alignment circuit according to claim 3, further comprising a control circuit that determines the M-th area to insert the received packet information,
    wherein the control circuit determines the M-th area by searching an area which does not have the consecutive group information and in which the packet information having a sequence number larger than the sequence number of the received packet information is written.

* * * * *